(12) United States Patent  
Klidas et al.

(10) Patent No.: US 10,987,626 B2  
(45) Date of Patent: Apr. 27, 2021

(54) SYSTEM AND METHOD FOR REDUCING LIQUID DISCHARGE FROM ONE OR MORE DEVICES

(71) Applicant: BABCOCK & WILCOX POWER GENERATION GROUP, INC., Barberton, OH (US)

(72) Inventors: Michael Klidas, Rocky River, OH (US); Joseph Mitchell, III, Canal Fulton, OH (US)

(73) Assignee: The Babcock & Wilcox Company, Akron, OH (US)

( * ) Notice: Subject to any disclaimer, the term of this patent is extended or adjusted under 35 U.S.C. 154(b) by 421 days.

(21) Appl. No.: 15/575,479

(22) PCT Filed: May 21, 2015

(86) PCT No.: PCT/US2015/031986  
§ 371 (c)(1),  
(2) Date: Nov. 20, 2017

(87) PCT Pub. No.: WO2016/186674  
PCT Pub. Date: Nov. 24, 2016

(65) Prior Publication Data  
US 2018/0161725 A1    Jun. 14, 2018

(51) Int. Cl.  
*B01D 53/78* (2006.01)  
*B01D 1/16* (2006.01)  
(Continued)

(52) U.S. Cl.  
CPC .............. *B01D 53/78* (2013.01); *B01D 1/16* (2013.01); *B01D 1/18* (2013.01); *B01D 53/1431* (2013.01);  
(Continued)

(58) Field of Classification Search  
CPC .... B01D 53/78; B01D 53/50; B01D 2252/60; B01D 2252/10; B01D 2259/126; B01D 2258/0283; B01D 2257/302; B01D 2251/404; B01D 53/8631; B01D 53/75; B01D 53/507; B01D 53/18; B01D 53/1481; B01D 53/1431; B01D 1/18; B01D 53/96; B01D 53/80; B01D 53/73; B01D 1/16; B01D 2258/0233; B01D 2259/124;  
(Continued)

(56) References Cited

U.S. PATENT DOCUMENTS

2015/0375166 A1* 12/2015 Fukuda ................ F26B 3/12  
423/242.1

* cited by examiner

*Primary Examiner* — David J Laux  
(74) *Attorney, Agent, or Firm* — Michael J. Seymour

(57) ABSTRACT

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for reducing and/or eliminating various liquid discharges from one or more emission control equipment devices (e.g., one or more wet flue gas desulfurization (WFGD) units). In another embodiment, the method and apparatus of the present invention is designed to reduce and/or eliminate the amount of liquid waste that is discharged from a WFGD unit by subjecting the WFGD liquid waste to one or more drying processes, one or more spray dryer (or spray dry) absorber processes, and/or one or more spray dryer (or spray dry) evaporation processes.

30 Claims, 27 Drawing Sheets

(51) Int. Cl.
  *B01D 53/73* (2006.01)
  *B01D 53/80* (2006.01)
  *B01D 53/96* (2006.01)
  *F23J 15/00* (2006.01)
  *F23J 15/02* (2006.01)
  *B01D 1/18* (2006.01)
  *B01D 53/50* (2006.01)
  *C02F 1/12* (2006.01)
  *B01D 53/14* (2006.01)
  *B01D 53/18* (2006.01)
  *B01D 53/75* (2006.01)
  *B01D 53/86* (2006.01)
  *C02F 1/16* (2006.01)
  *C02F 11/12* (2019.01)
  *C02F 1/52* (2006.01)
  *C02F 11/14* (2019.01)
  *C02F 1/28* (2006.01)
  *C02F 103/18* (2006.01)

(52) U.S. Cl.
  CPC ......... *B01D 53/1481* (2013.01); *B01D 53/18* (2013.01); *B01D 53/50* (2013.01); *B01D 53/507* (2013.01); *B01D 53/73* (2013.01); *B01D 53/75* (2013.01); *B01D 53/80* (2013.01); *B01D 53/8631* (2013.01); *B01D 53/96* (2013.01); *C02F 1/12* (2013.01); *C02F 1/16* (2013.01); *C02F 11/12* (2013.01); *F23J 15/006* (2013.01); *F23J 15/02* (2013.01); *B01D 2251/404* (2013.01); *B01D 2252/10* (2013.01); *B01D 2252/60* (2013.01); *B01D 2257/302* (2013.01); *B01D 2257/80* (2013.01); *B01D 2258/0233* (2013.01); *B01D 2258/0283* (2013.01); *B01D 2259/124* (2013.01); *B01D 2259/126* (2013.01); *B01D 2259/65* (2013.01); *C02F 1/283* (2013.01); *C02F 1/52* (2013.01); *C02F 11/14* (2013.01); *C02F 2103/18* (2013.01); *C02F 2303/06* (2013.01); *F23J 2215/10* (2013.01); *F23J 2215/20* (2013.01); *F23J 2219/10* (2013.01); *F23J 2219/20* (2013.01); *F23J 2219/40* (2013.01)

(58) Field of Classification Search
  CPC ............ B01D 2259/65; B01D 2257/80; C02F 2303/06; C02F 2103/18; C02F 11/12; C02F 1/16; C02F 1/12; C02F 1/283; C02F 11/14; C02F 1/52; F23J 2219/40; F23J 2219/20; F23J 2219/10; F23J 2215/20; F23J 2215/10; F23J 15/02; F23J 15/006
  See application file for complete search history.

SYSTEM AND METHOD FOR REDUCING LIQUID DISCHARGE FROM ONE OR MORE DEVICES

FIELD AND BACKGROUND OF THE INVENTION

1. Field of the Invention

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for reducing and/or eliminating various liquid discharges from one or more emission control equipment devices (e.g., one or more wet flue gas desulfurization (WFGD) units). In another embodiment, the method and apparatus of the present invention is designed to reduce and/or eliminate the amount of liquid waste that is discharged from a WFGD unit by subjecting the WFGD liquid waste to one or more drying processes, one or more spray dryer (or spray dry) absorber processes, and/or one or more spray dryer (or spray dry) evaporation processes. In still another embodiment, the method and apparatus of the present invention permits: (a) control of the chemistry, physical properties and/or the composition of the liquid material discharged from a WFGD unit; and/or (b) control of one or more downstream air quality control systems (AQCS) by injection of the remaining liquid material from one or more drying processes and/or devices, one or more spray dryer (or spray dry) absorber processes and/or devices, and/or one or more spray dryer (or spray dry) evaporation processes and/or devices.

2. Description of the Related Art

As is known by those of skill in the art, various processes and/or apparatuses are utilized in connection with boilers, heaters, kilns, or other flue gas-, or combustion gas-, generating devices (e.g., those located at power plants, waste incinerators, processing plants, etc.) to treat the combustion and/or flue gases generated therefrom. Some of these air quality control systems (AQCS) include various processes and/or apparatuses that achieve the control, reduction and/or mitigation of various compounds including, but not limited to, $SO_x$, $NO_x$ and solid particulate prior to their emission into the atmosphere.

One of the most widely utilized emission control technologies is the use of one or more wet flue gas desulfurization (WFGD) units to control $SO_x$ emissions. WFGD units and the process of utilizing such units are well known to those of skill in the art as discussed in *Steam/its generation and use,* 41$^{st}$ Edition, Kitto and Stultz, Eds., Copyright 2005, The Babcock & Wilcox Company, Barberton, Ohio, U.S.A., particularly Chapter 35—Sulfur Dioxide Control, the complete text of this book is hereby incorporated by reference as though fully set forth herein.

These various sulfur dioxide control processes, especially those based on WFGD technologies, inevitably generate a stream of liquid waste necessary to keep their chemical-physical parameters under control and, therefore, ensure their correct functioning. This so produced liquid waste is traditionally treated in dedicated plants (or sub-plants) to ensure compliance with various liquid discharge regulations so that such liquid discharge can be further discharged into, for example, surface waters. Among other goals sought to be accomplished by these liquid treatment plants is the reduction of one or more compounds including, but not limited to, mercury compounds, selenium compounds, cadmium compounds, etc.

In order to control, reduce, and/or eliminate the discharge of the liquid waste from one or more WFGD units into surface waters various systems have been suggested in the prior art. However, such systems suffer from various drawbacks including, but not limited to: (i) the inability to process liquid waste, or a liquid waste stream, from a wide range of sources (e.g., any type of blow-down water, any type of make-up water and/or any type of make-up water treatment byproduct, any liquid waste from any WFGD unit or other AQCS unit, coal pile run-off and/or effluent, and/or ash pond run-off and/or effluent, etc.); and/or (ii) a difficulty in processing liquid waste, or a liquid waste stream, from an absorber recirculation tank (ART) (also referred to as an absorber reaction tank (ART)—hereinafter just referred to as an absorber recirculation tank (ART) for purely convenience sake) of one or more WFGD units with a total suspended solids content above about 0.01 percent by weight, above about 0.05 percent by weight, above about 0.1 percent by weight, above about 0.5 percent by weight, above about 1 percent by weight, or even above about 5 percent by weight.

Given the above, a need exists for a method and/or apparatus (or system) that provides for the reduction, mitigation and/or elimination of any liquid waste, or liquid waste stream, from any of a wide range of sources including, but not limited to, those generated by various AQCS devices (e.g., a WFGD).

SUMMARY OF THE INVENTION

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for reducing and/or eliminating various liquid discharges from one or more emission control equipment devices (e.g., one or more wet flue gas desulfurization (WFGD) units). In another embodiment, the method and apparatus of the present invention is designed to reduce and/or eliminate the amount of liquid waste that is discharged from a WFGD unit by subjecting the WFGD liquid waste to one or more drying processes, one or more spray dryer (or spray dry) absorber processes, and/or one or more spray dryer (or spray dry) evaporation processes. In still another embodiment, the method and apparatus of the present invention permits: (a) control of the chemistry, physical properties and/or the composition of the liquid material discharged from a WFGD unit; and/or (b) control of one or more downstream air quality control systems (AQCS) by injection of the remaining liquid material from one or more drying processes and/or devices, one or more spray dryer (or spray dry) absorber processes and/or devices, and/or one or more spray dryer (or spray dry) evaporation processes and/or devices.

Accordingly, one aspect of the present invention is drawn to a system for controlling, reducing and/or mitigating the amount of liquid waste from, or derived from, a fuel-fired furnace and/or boiler, the system comprising: a fuel-fired furnace and/or boiler designed to burn at least one fuel to generate heat and flue, or combustion, gases; at least one particulate control device, wherein the particulate control device is located downstream of the furnace and/or boiler and is operatively connected to same; one or more WFGD units, wherein at least one of the one or more WFGD units is located downstream of the at least one particulate control device and is operatively connected to same; at least one drying unit, wherein the at least one drying unit is operatively connected to at least one of the one or more WFGD units and designed to receive at least a portion of the liquid waste and/or liquid waste stream from at least one of the one or more WFGD units; and at least one mixing device, wherein the at least one mixing device is operatively connected to both the at least one drying unit and the at least one or more WFGD units and designed to receive a combination of a high solids portion of the liquid waste and/or liquid waste stream from at least one of the one or more WFGD units and at least one particulate matter from one or more particulate control devices, wherein the at least one drying unit is designed to control, reduce and/or mitigate the volume of liquid waste and/or liquid waste stream from at least one of the one or more WFGD units via the use of at least a portion of the flue, or combustion, gases generated from the furnace and/or boiler, and wherein the liquid waste and/or liquid waste stream from the one or more WFGD units contains both a total suspended solids content in the range of about 0.01 percent by weight to about 60 percent by weight and a total dissolved content of about 2,500 ppm to about 250,000 ppm.

In yet another aspect of the present invention, there is provided a method for controlling, reducing and/or mitigating the amount of liquid waste from, or derived from, a fuel-fired furnace and/or boiler, the method comprising the steps of: supplying a fuel-fired furnace and/or boiler designed to burn at least one fuel to generate heat and flue, or combustion, gases; supplying at least one particulate control device, wherein the particulate control device is located downstream of the furnace and/or boiler and is operatively connected to same; supplying one or more WFGD units, wherein at least one of the one or more WFGD units is located downstream of the at least one particulate control device and is operatively connected to same; supplying at least one drying unit, wherein the at least one drying unit is operatively connected to at least one of the one or more WFGD units and receives a portion of the liquid waste and/or liquid waste stream from at least one of the one or more WFGD units; and supplying at least one mixing device, wherein the at least one mixing device is operatively connected to both the at least one drying unit and the at least one or more WFGD units and designed to receive a combination of a high solids portion of the liquid waste and/or liquid waste stream from at least one of the one or more WFGD units and at least one particulate matter from one or more particulate control devices, wherein the at least one drying unit controls, reduces and/or mitigates the volume of liquid waste and/or liquid waste stream from the WFGD via the use of at least a portion of the flue, or combustion, gases generated from the furnace and/or boiler, and wherein the liquid waste and/or liquid waste stream from the one or more WFGD units contains both a total suspended solids content in the range of about 0.01 percent by weight to about 60 percent by weight and a total dissolved content of about 2,500 ppm to about 250,000 ppm.

In yet another aspect of the present invention there is provided a system for controlling, reducing and/or mitigating the amount of liquid waste in a fuel-fired furnace and/or boiler, the system comprising any of the embodiments disclosed in any one or more of FIGS. 16 through 27.

In yet another aspect of the present invention there is provided a system for controlling, reducing and/or mitigating the amount of liquid waste in a fuel-fired furnace and/or boiler according to any one or more of the embodiments disclosed and discussed herein.

In yet another aspect of the present invention there is provided a system for controlling, reducing and/or mitigating the amount of liquid waste from any liquid waste producing device and/or process, the system comprising any of the embodiments disclosed in any one or more of FIGS. 16 through 27.

In yet another aspect of the present invention there is provided a system for controlling, reducing and/or mitigating the amount of liquid waste from any liquid waste producing device and/or process according to any one or more of the embodiments disclosed and discussed herein.

In yet another aspect of the present invention there is provided a method for controlling, reducing and/or mitigating the amount of liquid waste in a fuel-fired furnace and/or boiler, the method comprising using any of the systems of any one or more of FIGS. 16 through 27.

In yet another aspect of the present invention there is provided a method for controlling, reducing and/or mitigating the amount of liquid waste in a fuel-fired furnace and/or boiler, the method comprising using any of the systems according to any one or more of the embodiments disclosed and discussed herein.

In yet another aspect of the present invention there is provided a method for controlling, reducing and/or mitigating the amount of liquid waste from any liquid waste producing device and/or process, the method comprising using any of the systems of any one or more of FIGS. 16 through 27.

In yet another aspect of the present invention there is provided a method for controlling, reducing and/or mitigating the amount of liquid waste from any liquid waste producing device and/or process, the method comprising using any of the systems according to any one or more of the embodiments disclosed and discussed herein.

In yet another aspect of the present invention there is provided a system for controlling one or more physical and/or chemical properties of a dried material generated in one or more drying devices according to any of the embodiments disclosed or discussed herein.

In yet another aspect of the present invention there is provided a method for controlling one or more physical and/or chemical properties of a dried material generated in one or more drying devices according to any of the embodiments disclosed or discussed herein.

In yet another aspect of the present invention there is provided a system for controlling one or more physical and/or chemical properties of a slurry and/or solution and/or a device from which a portion thereof is used to provide a liquid waste and/or liquid waste stream according to any of the embodiments disclosed or discussed herein.

In yet another aspect of the present invention there is provided a method for controlling one or more physical and/or chemical properties of a slurry and/or solution and/or a device from which a portion thereof is used to provide a liquid waste and/or liquid waste stream according to any of the embodiments disclosed or discussed herein.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

Figure 1:
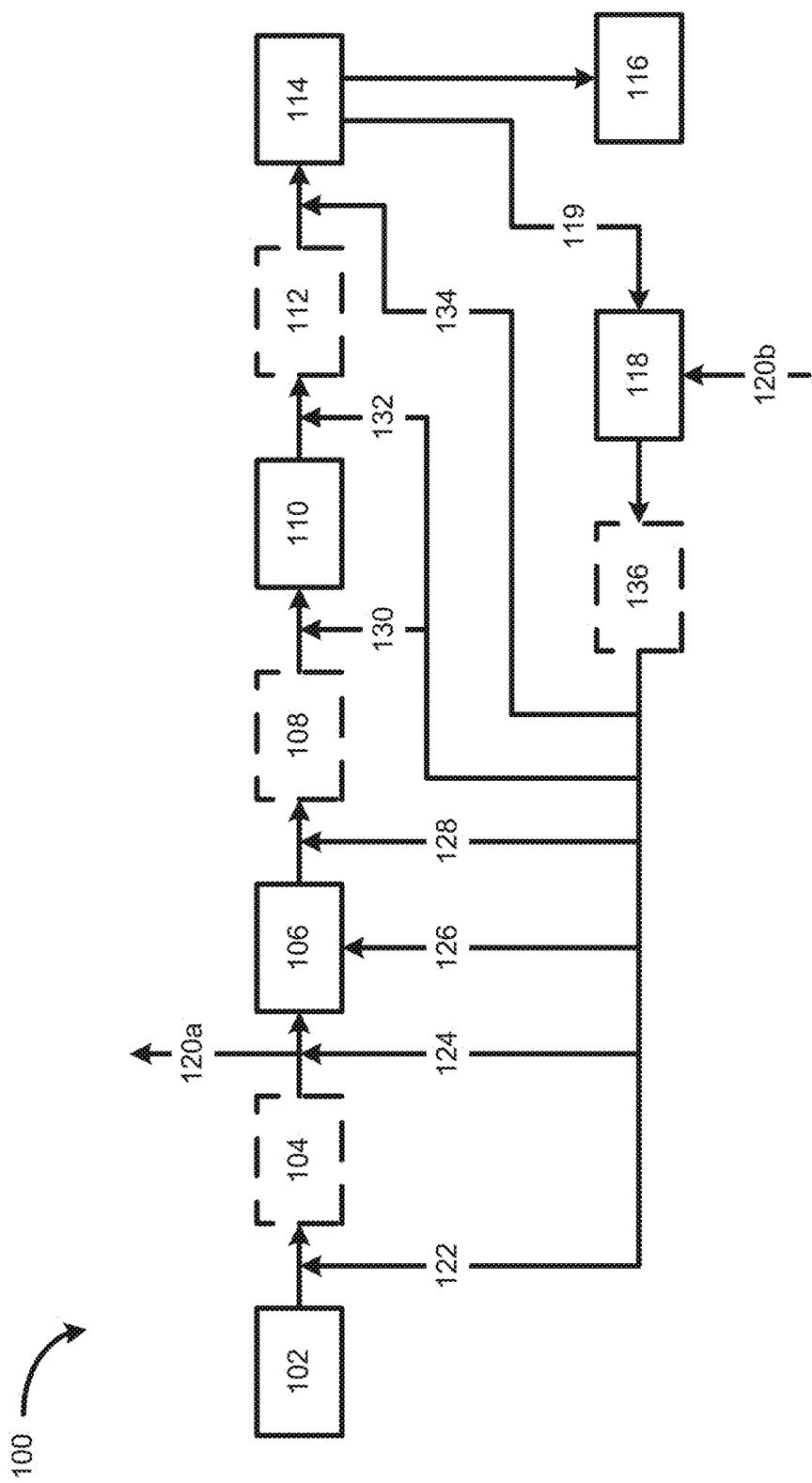
FIG. 1 is a schematic representation of a fuel burning facility which includes a system according to one embodiment for practicing one method of the present invention.

The present invention relates generally to the field of emission control equipment for boilers, heaters, kilns, or other flue gas-, or combustion gas-, generating devices (e.g., those located at power plants, processing plants, etc.) and, in particular to a new and useful method and apparatus for reducing and/or eliminating various liquid discharges from one or more emission control equipment devices (e.g., one or more wet flue gas desulfurization (WFGD) units). In another embodiment, the method and apparatus of the present invention is designed to reduce and/or eliminate the amount of liquid waste that is discharged from a WFGD unit by subjecting the WFGD liquid waste to one or more drying processes, one or more spray dryer (or spray dry) absorber processes, and/or one or more spray dryer (or spray dry) evaporation processes. In still another embodiment, the method and apparatus of the present invention permits: (a) control of the chemistry, physical properties and/or the composition of the liquid material discharged from a WFGD unit; and/or (b) control of one or more downstream air quality control systems (AQCS) by injection of the remaining liquid material from one or more drying processes and/or devices, one or more spray dryer (or spray dry) absorber processes and/or devices, and/or one or more spray dryer (or spray dry) evaporation processes and/or devices.

While the present invention will be described in terms of fossil fuel-fired combustion (e.g., coal-fired combustion) and in connection with one or more liquid waste streams from a wet flue gas desulfurization (WFGD) unit, the present invention is not limited thereto. Rather, the present invention is applicable to any situation in which it is desirable to reduce, mitigate and/or eliminate any volumetric portion, or the total volumetric amount (i.e., 100 percent), from any one or more of: (i) a liquid waste, or liquid waste stream, from any type of blow-down water, any type of liquid waste generated during make-up water treatment, any liquid waste from any one or more WFGD units or other AQCS units, coal pile run-off and/or effluent, ash pond run-off and/or effluent, halide-containing liquid waste and/or liquid waste streams, etc.; (ii) a liquid waste, or a liquid waste stream, from an absorber recirculation tank (ART) of one or more WFGD units with a total suspended solids content above about 1 percent by weight, or even above about 5 percent by weight; (iii) any liquid waste, or liquid waste stream, that is generated by, utilized to transport, or is left over from any fuel supply handling process, any fuel conditioning process, and/or any combustion residual process or treatment; and/or (iv) any liquid waste, or liquid waste stream, generated at any location outside of a fossil fuel-fired power plant that can be supplied to such a power plant.

Initially, the present invention is equally applicable to a wide range of furnaces, or boilers, including, but not limited to, oxy-fuel combustion (i.e., oxy-combustion) furnaces and/or boilers, variable temperature furnaces and/or boilers, standard air-fired furnaces and/or boilers, staged combustion air-fired furnaces and/or boilers, furnaces and/or boilers designed to permit re-burning (regardless of whether the re-burning fuel and the primary fuel are the same or different fuels), and/or furnaces and/or boilers with an economizer by-pass. Given that all of these types of furnaces and/or boilers are known to those of skill in the art a detailed description thereof is omitted for the sake of brevity. Given the wide range of different types of furnaces and/or boilers that the methods and/or apparatuses of the present invention have applicability to, the term "furnace" or the term "boiler" are utilized herein and within the claims to mean any type of fossil fuel-fired furnace or boiler, or fuel-fired boiler, including, but not limited, to all of the different types of furnaces and/or boilers listed above as well as any other types of furnaces and/or boilers that permit the burning of any type of fuel (e.g., biomass, waste matter, etc.) and/or fossil fuel that create combustion and/or flue gases that require one or more process to remove from such combustion and/or flue gases one or more compounds (e.g., acid gases, acid-based liquid wastes, $CO_2$, $NO_x$, $SO_x$, heavy metals, etc.) contained within the combustion and/or flue gas stream. Accordingly, from this point hereafter, the term furnace and/or boiler will encompass all of the types of furnaces and/or boilers listed above as well as those additionally known to those of skill in the art but not specifically listed herein unless otherwise specifically noted by reference to a specific type of furnace and/or boiler (e.g., a staged furnace and/or boiler).

Additionally, various embodiments of the present invention utilize one or more AQCS components including, but not limited to, one or more $NO_x$ control devices (although such $NO_x$ control devices may not be necessary in the instance where the combustion process is an oxy-combustion process), at least one air heater, one or more particulate control devices, various waste water treatment devices and/or sections, and at least one wet flue gas desulfurization (WFGD) unit. As would be appreciated by those of skill in the art, the foregoing list is exemplary in nature and not meant to be exhaustive. The present invention is applicable to combustion systems and/or processes that utilize a wide range of devices regardless of whether or not such devices are specifically listed herein.

Although the present invention is described with regard to a liquid waste stream that is generated by one or more WFGD units, the present invention is not limited thereto. Rather, as is stated above, the present invention is applicable to any situation in which it is desirable to reduce, mitigate and/or eliminate any volumetric portion, or the total volumetric amount (i.e., 100 percent), from any one or more of: (i) a liquid waste, or liquid waste stream, from any type of blow-down water, any type of make-up water treatment byproduct, any liquid waste from any one or more WFGD units or other AQCS units, coal pile run-off and/or effluent, ash pond run-off and/or effluent, etc.; (ii) a liquid waste, or a liquid waste stream, from an absorber recirculation tank (ART) of one or more WFGD units with a total suspended solids content above about 1 percent by weight, or even above about 5 percent by weight; and/or (iii) any liquid waste, or liquid waste stream, that is generated by, utilized to transport, or is left over from any fuel supply handling process, any fuel conditioning process, and/or any combustion residual process or treatment. In still another embodiment, the present invention is applicable to any type of combustible fuel (e.g., municipal solid waste, biomass, blended coal/biomass co-combustion, any coal/bone meal co-combustion, any blended fuel combustion regardless of whether or not any portion of the blended fuel is a fossil fuel, etc.).

The phrase "liquid waste" as well as the phrase "liquid waste stream" is not to be construed as limited to only waste, or waste streams, that are composed mainly (i.e., more than 90 percent by weight or more) of liquid, or water. Thus, the phrases "liquid waste" and/or "liquid waste stream" are meant to fully encompass any liquid material that is at least about 5 percent by weight, at least about 7.5 percent by weight, or even at least about 10 percent by weight liquid (e.g., water, or any other liquid associated with the systems discussed herein), with the remainder being solids, suspended solids, dissolved solids, particulate matter, or any other non-liquid solid material. Additionally, the term "stream" is not used to denote movement but rather is used to denote one or more point sources of "liquid waste" as defined above. Furthermore, as utilized herein suitable fossil fuels, or carbonaceous fuels, include, but are not limited to, oil, coal, natural gas, tar sands, bitumen, or any combination of two or more thereof.

In one embodiment, the term "dissolved solids" or "total dissolved solids" as used in the specification and claims herein refers to any one or more dissolved compounds, or compositions, known to be present in any of the liquid wastes, or liquid waste streams, described herein. Some non-limiting examples of such dissolved compounds, or compositions, include one or more aqueous soluble calcium compounds (e.g., calcium chloride, calcium bromide, calcium carbonate, calcium nitrate, calcium sulfate, etc.), one or more aqueous soluble sodium compounds (e.g., sodium chloride, sodium bromide, etc.), one or more aqueous soluble magnesium compounds (e.g., magnesium chloride, magnesium bromide, magnesium carbonate, magnesium nitrate, magnesium sulfate, etc.), one or more aqueous soluble boron compounds (e.g., boron chloride, boron bromide, boron arsenate, boric acid, etc.), one or more aqueous soluble mercury compounds (e.g., mercury chloride, mercury bromide, mercury iodide, etc.), one or more aqueous soluble selenium compounds (e.g., selenium chloride, selenium bromide, potassium selenate, sodium selenate, sodium selenite, etc.), one or more aqueous soluble arsenic compounds (e.g., arsenic oxide, arsenic chloride, arsenic bromide, sodium arsenate, etc.), one or more aqueous soluble chloride compounds (e.g., sodium chloride, calcium chloride, magnesium chloride, boron chloride, mercury chloride, etc.), one or more aqueous soluble bromide compounds (e.g., sodium bromide, calcium bromide, magnesium bromide, boron bromide, mercury bromide, etc.), one or more aqueous soluble sulfate compounds (e.g., sodium sulfate, potassium sulfate, calcium sulfate, magnesium sulfate, etc.), one or more aqueous soluble nitrate compounds (e.g., sodium nitrate, potassium nitrate, calcium nitrate, magnesium nitrate, etc.), or combinations of any one or more thereof, two or more thereof, three or more thereof, four or more thereof, five or more thereof, six or more thereof, seven or more thereof, eight or more thereof, nine or more thereof, ten or more thereof, eleven or more thereof, twelve or more thereof, thirteen or more thereof, fourteen or more thereof, or even fifteen or more thereof. It should be noted that the term "aqueous soluble" as used herein is not to be construed in a numerical sense (e.g., by using a solubility constant, or constants). Rather, the determination as to whether or not a compound listed herein is to be viewed as "aqueous soluble" is measured by whether such compound, or compounds, regardless of its, or their, solubility constant contribute to the dissolved solids, or total dissolved solids, contained in the liquid wastes, or liquid waste streams, described herein. Additionally, the specific compounds listed above are exemplary in nature and are to be viewed as including all alternative forms of similar compounds including, but not limited to, hydrate or anhydrous forms of all of the compounds listed above, if such hydrated and/or anhydrous forms of such compounds exist.

In one embodiment, the term "suspended solids" or "total suspended solids" as used in the specification and claims herein refers to any one or more suspended compounds, or compositions, known to be present in any of the liquid wastes, or liquid waste streams, described herein. Some non-limiting examples of such suspended compounds, or compositions, that are known to be aqueous insoluble in the various liquid wastes, or liquid waste streams, described herein include calcium sulfate (i.e., gypsum), calcium carbonate, magnesium carbonate, silica, one or more aluminum oxides, one or more iron oxides, mercury sulfide, other aqueous insoluble mercury compounds, aqueous insoluble selenium compounds (e.g., arsenic selenide, copper selenite, copper selenide, mercury selenide, etc.), aqueous insoluble arsenic compounds (e.g., arsenic selenide, arsenic sulfide, etc.), or combinations of any one or more thereof, two or more thereof, three or more thereof, four or more thereof, five or more thereof, six or more thereof, seven or more thereof, eight or more thereof, nine or more, or even ten or more. It should be noted that the term "aqueous insoluble" as used herein is not to be construed in a numerical sense (e.g., by using a solubility constant, or constants). Rather, the determination as to whether or not a compound listed herein is to be viewed as "aqueous insoluble" is measured by whether such compound, or compounds, regardless of its, or their, solubility constant contribute to the suspended solids, or total suspended solids, contained in the liquid wastes, or liquid waste streams, described herein. Additionally, the specific compounds listed above are exemplary in nature and are to be viewed as including all alternative forms of similar compounds including, but not limited to, hydrate or anhydrous forms of all of the compounds listed above, if such hydrated and/or anhydrous forms of such compounds exist.

Regarding oxy-fuel combustion (or oxy-combustion), oxy-fuel combustion is the process of burning a fuel using an oxidant with less nitrogen than atmospheric air (e.g., a combination of flue gas and oxygen, pure oxygen, or a combination of oxygen and one or more inert gases), instead of air, or atmospheric air, as the primary oxidant. Since the nitrogen component of air is either reduced, or not present, the nitrogen component of the air is either not converted to nitrogen oxides, or in the instance of total oxy-combustion not present to be heated.

In the field of power generation research has turned to the use of oxy-combustion for power generation using one or more fossil fuels, or carbonaceous fuels, as the combustion fuel. There is currently research being done in firing fossil-fueled power plants with a nitrogen-depleted gas, or gas mixture, instead of air. In one such proposed non-limiting process, almost all of the nitrogen is removed from input air, yielding a stream that is approximately 95 percent oxygen and subsequently mixed with, for example, re-circulated flue gas. Firing with pure oxygen can in some circumstances result in too high a flame temperature, so the mixture is diluted by mixing with recycled flue gas. The recycled flue gas (RFG) can also be used to carry fuel into the boiler and to ensure adequate convective heat transfer. Oxy-fuel combustion produces approximately 75 percent less flue gas than air fueled combustion and produces exhaust consisting primarily of $CO_2$ and $H_2O$.

The justification for using oxy-fueled combustion, or oxy-combustion, is to produce a $CO_2$ rich flue gas ready for purification, compression and/or sequestration. Oxy-fuel combustion has significant advantages over traditional air-fired plants. Among the non-limiting advantages are: (i) the mass and volume of the products of combustion, which essentially comprise the flue gas leaving the process, are reduced by approximately 75 percent; (ii) the size of the flue gas compression and purification equipment can be reduced by approximately 75 percent; (iii) the flue gas is primarily $CO_2$, suitable for separation and treatment for use or sequestration via, for example, converting the $CO_2$ into a liquid or supercritical fluid; (iv) the concentration of undesirable constituents in the flue gas is much higher, making separation easier within the process; (v) most of the flue gas impurities (e.g., water and acid gaseous) are condensable which makes compression by separation and cooling possible; (vi) heat of compression can be captured and reused rather than lost in the flue gas; and (vii) because the amount of nitrogen contained in the combustion air is either greatly reduced and/or eliminated, nitrogen oxide production is greatly reduced and/or eliminated.

Economically speaking oxy-combustion costs more than traditional air-fired combustion. This is because oxy-combustion relies on decreasing the amount of nitrogen in the combustion air via various techniques thereby resulting in an increase in the percentage of oxygen present or available in the combustion air. The oxygen separation process requires a significant amount of energy leading to an increase in cost that is justified by the savings realized in the flue gas treatment plant (e.g., in the compression purification unit—CPU). For example, cryogenic air separation can consume on the order of 15 percent of the electricity produced by a fossil, or carbonaceous, fuel-fired power station. However, various new technologies such as membranes and chemical looping are being developed that can be used to reduce this cost.

In the realm of coal power, oxy-combustion has the possibility to achieve a near-zero emission coal power plant, including $CO_2$. To capture $CO_2$, there is one pre-combustion method known as Integrated Gasification Combined Cycle (IGCC) and two post-combustion-based technology paths: oxy-combustion (as described above) and $CO_2$ scrubbing. All of these overall techniques are known to those of skill in the art and as such a detailed discussion of any one specific method of accomplishing IGCC and/or one, or both, of the post-combustion-based technologies are omitted for the sake of brevity. Oxy-combustion is applied to the entire plant process, inherently providing near-zero emissions. $CO_2$ scrubbing can be applied to all or part of the plant emissions.

To understand how such low emission levels are achievable, consider a typical combustion process versus an oxy-coal combustion process. The oxidant for typical combustion is primarily atmospheric air which contains slightly more than 78 percent by volume nitrogen and slightly less than 21 percent by volume oxygen. This leads to flue gases that typically contain about 68 to about 73 percent nitrogen, about 13 to about 16 percent carbon dioxide, about 5 to about 10 percent water vapor, plus some oxygen and other minor compounds (as measured after flue gas desulfurization has taken place). On the other hand, the oxidant for oxy-combustion is nearly pure oxygen containing around 95 percent or greater oxygen with the remainder being some nitrogen and some argon. To replace the gas volume produced by the nitrogen in typical combustion using air, flue gas is recycled to the boiler. This in turn leads to flue gases being supplied to a compression purification unit (CPU) containing about 70 percent by volume or more carbon dioxide, with the remainder being primarily water, argon, nitrogen and oxygen. Thus, combustion air is replaced with oxygen from an air separation unit (ASU). Nitrogen that would normally be conveyed with the air through conventional air-fuel firing is essentially excluded. Instead, in this exemplary set-up, a portion of the $CO_2$-rich flue gas is returned back to a conventional pulverizer/burner system, substituting recycled flue gas (primarily $CO_2$) for the nitrogen in the furnace. The $CO_2$ in oxy-combustion impacts furnace operation and heat transfer in ways similar to the nitrogen in an air-fired system. These features allow the technology to be used in retrofit and repowering applications. Oxy-combustion creates a flue gas that is primarily $CO_2$, rather than nitrogen, and includes other products of combustion (although a greatly reduced amount of $NO_x$). The fraction of the flue gas that is not recirculated to the boiler is sent to a compression purification unit (CPU).

The flue gas leaving the boiler is cleaned using conventional particulate and sulfur removal systems as is known to those of skill in the art. Remaining particulate is further filtered in the CPU to protect the compressor systems. Primary and polishing scrubbers are used to reduce sulfur and moisture to required levels in the flue gas prior to recycling of a portion of the flue gas to the boiler and sending the remainder to the CPU. The trace amount of $SO_2$ remaining is removed in the CPU. A $NO_x$ removal system (such as an SCR or SNCR) is not required as the remaining combustion-generated $NO_x$ is almost completely removed as a condensable in the CPU. Mercury is removed in one or more of the scrubbers and/or CPU. To provide pipeline quality $CO_2$ at the exit of the CPU, a small amount of inert constituents must be removed in the CPU. Small quantities of oxygen, nitrogen and argon present in the oxygen from the ASU (typically 95 percent by volume pure oxygen) and from air in-leakage are vented to the atmosphere, along with a very small amount of some remaining combustion products such as carbon monoxide (CO).

Additional disclosure relating to oxy-combustion can be found in at least one of *Steam/its generation and use,* 41$^{st}$ Edition, Kitto and Stultz, Eds., Copyright 2005, The Babcock & Wilcox Company, Barberton, Ohio, U.S.A., and/or United States Patent Application Publication No. 2014/0000311 A1, the complete text of this book, as well as the above-listed published United States patent application, are hereby incorporated by reference as though both fully set forth herein.

Regarding the systems of the present invention, the systems and/or apparatuses disclosed herein make use of one or more devices (e.g., AQCS devices) including, but not limited to, $NO_x$ control and/or mitigation systems (e.g., selective catalytic reduction (SCR) units, selective non-catalytic reduction (SNCR, etc.), particulate control and/or mitigation units (e.g., electrostatic precipitators, fabric filters, etc.), and/or any type of additional AQCS or water/liquid treatment process or device. It should be understood that while the present invention is described in terms of various specific types of AQCS units, the present invention is not limited solely to the specific types of devices and/or systems described below. Rather, again, the present invention is equally applicable to any process or device utilized in connection with any aspect, or part, of a fossil fuel steam and/or heat generating process that generates any of the above-mentioned liquid wastes, or liquid waste streams.

Regarding $NO_x$ control, as known to those of skill in the art $NO_x$ control can be accomplished by any one or more of the following non-limiting examples: a hot-side SCR (that is an SCR that is located somewhere upstream of an air heater), a cold-side SCR (that is an SCR located somewhere downstream of an air heater), and/or a SNCR system. Since such devices and/or systems are known to those of skill in the art a more detailed discussion herein is omitted for the sake of brevity. Regarding particulate control, as is known by those of skill in the art particulate control can be achieved by a variety of technologies including, but not limited to, wet electrostatic precipitators (wet ESPs), dry electrostatic precipitators (dry ESPs), fabric filters (e.g., pulse jet fabric filters), etc. Since such devices and/or systems are known to those of skill in the art a more detailed discussion herein is omitted for the sake of brevity. Regarding any other type of additional AQCS and/or water/liquid treatment process or device, such processes and/or devices are known to those of skill in the art. Since such devices and/or systems are known to those of skill in the art a more detailed discussion herein is omitted for the sake of brevity. Given the above, one such place where a discussion of various types of AQCS devices can be found is in *Steam/its generation and use,* 41$^{st}$ Edition, Kitto and Stultz, Eds., Copyright 2005, The Babcock & Wilcox Company, Barberton, Ohio, U.S.A., the complete text of this book is hereby incorporated by reference as though both fully set forth herein.

Regarding the discussion above relating to variable temperature furnaces and/or boilers, such furnaces and/or boilers are known to those of skill in the art. For example U.S. Pat. Nos. 7,578,265 and 7,637,233 disclose systems and methods designed to permit an increase in the outlet temperature of a flue gas passing through an economizer of a furnace/boiler by reducing the water flow in selected tubes and/or sections of the economizer without the need to divert feedwater away from the economizer. As disclosed within these patents, when these selected tubes or sections are reduced in flow, the remaining sections or tubes in the economizer are overflowed so that the total flow is maintained through the economizer. Given this, an increase in the economizer gas outlet temperature is achieved as a certain percentage of the tubes in the economizer will have their heat transfer reduced by decreasing the flow through these tubes. The increase in water flow in the remaining tubes has a minimal effect on the heat transfer of the remaining tubes, resulting in an overall decrease in the total gas side heat transfer of the economizer and as a result increases the gas outlet temperature from the economizer. Given the above, the complete disclosures of U.S. Pat. Nos. 7,578,265 and 7,637,233 are incorporated herein as if reproduced in their entireties.

Regarding the Figures contained herein, as will be apparent to those of skill in the art, only the major components necessary to convey the nature of the present invention are depicted. However, this does not mean that the systems and/or methods of the present invention only utilize the components illustrated in the Figures described below. Rather, numerous other components are necessary to achieve the desired operation of the systems and/or methods of the present invention. It is noted however, that these additional components are known to those of skill in the art and that the inclusion of such components would only result in a cluttered and/or unintelligible set of Figures. Some examples of components that are not illustrated in the attached Figures include, but are not limited to, one or more pumps (e.g., be they pumps to move liquid additives and/or reagents, dry additives and/or reagents, slurry- and/or suspension-based additives and/or reagents, liquid waste, etc.), one or more injection devices (e.g., be they injection devices for liquid additives and/or reagents, dry additives and/or reagents, slurry- and/or suspension-based additives and/or reagents, etc.), one or more fans (e.g., be they fans for achieving a desired gas flow rate in any one or more of the various ducts, conduits, or conveying passages necessary to connect one portion of the overall systems of the present invention to another portion thereof).

Furthermore, as will be apparent those of skill in the art upon reading and understanding the detailed description of the embodiments of the present invention, some of the choices for some of the "known" components for the systems of the present invention are not typically arranged in such a manner. For example, as will be discussed in more detail below the generalized particulate control devices of the present invention include wet ESPs which are not typically operated at positions upstream of a WFGD unit. However, should any such currently non-typical arrangements and/or non-favored arrangements become so in the future, the description of the embodiments of the present invention is not meant to be limiting and shall encompass all such arrangements regardless of whether now, or sometime later, viewed as desirable, favorable and/or technically achievable/acceptable. Another point to consider with regard to the various embodiments of the present invention is that in some applications the systems and/or methods of the present invention may not need, or require, all of the AQCS devices listed herein. For example, circulating fluidized bed boilers, stoker boilers and other combustion systems and/or processes known to those of skill in the art may not require the use of an air heater. In such instances the present invention is still applicable thereto with the caveat that the flue gases and/or combustion gases discussed below that are supplied to the one or more drying devices of the present invention can be supplied from any other suitable location via any suitable process including, but not limited to, a slipstream arrangement, a bifurcated supply arrangement, etc.

Turning to FIG. 1, FIG. 1 is an illustration of a system 100 according to one embodiment of the present invention. System 100 of FIG. 1 comprises a furnace/boiler 102. As noted above furnace/boiler 102 can be any of the types of furnace/boilers discussed above. Furnace/boiler 102 is connected via any suitable conduit, duct or gas conveying passage to an air heater 106, represented by the horizontal arrows that connect furnace/boiler 102 to air heater 106.

Regarding any of the conduits, ducts or gas conveying passages in system 100, such structures are known to those of skill in the art and can, for example, be formed from any suitable material including but not limited to, metal, one or more metal alloys, or any combination thereof. In this instance furnace/boiler 102 is either an oxy-combustion device, utilizes a SNCR system, and/or does not require $NO_x$ control for whatever reason. Alternatively, where an SCR is desired such an SCR can be either: (i) a hot-side SCR 104 and be located between furnace/boiler 102 and air heater 106, and connected to each via a suitable set of conduits, ducts or gas conveying passages, which again represented by the horizontal arrows connecting components 102, 104 and 106; and (ii) a cold-side SCR 108 and be located between air heater 106 and particulate control device 110, and connected to each via a suitable set of conduits, ducts or gas conveying passages, which again represented by the horizontal arrows connecting components 106, 108 and 110. Regarding the particulate control devices useful in connection with the present invention as either a specifically called out particulate control device (e.g., device 110, device 112 and/or device 136) and/or any other particulate control device regardless of whether such particulate control device is specifically called out or generically mentioned (e.g., referred to as any one or more additional AQCS devices), such particulate control devices can be selected from any known device and/or system for removing particulate matter from a gas stream where such devices/systems include, but are not limited to, wet electrostatic precipitators (wet ESPs), dry electrostatic precipitators (dry ESPs), fabric filters (e.g., pulse jet fabric filters), etc. It should be noted that typically wet ESPs are not used upstream of WFGD units. As such, in one instance any particulate control devices of any of the embodiments of the present invention are not selected from any type of wet ESP should such one or more particulate control devices be located upstream of a WFGD unit. Again however, should such an arrangement either be, or at some later date become, desirable the embodiments of the present invention are meant to encompass any such non-traditional layouts/designs.

In one instance, particulate control device 110 is connected via a conduit, duct or gas conveying passage to a wet flue gas desulfurization (WFGD) unit 114, which is again represented by the horizontal arrow connecting components 110 to 114. In another instance, system 100 can further comprise a secondary particulate control device 112 located between particulate control device 110 (for the purposes of any embodiment with multiple particulate control devices, device 110 will be referred to as the primary particulate control device for clarity sake) and WFGD unit 114, and connected to each via a suitable set of conduits, ducts or gas conveying passages, which again represented by the horizontal arrows connecting components 110, 112 and 114. WFGD unit 114 is then connected to any one or more further AQCS devices 116 and/or is connected to a stack 116 where the cleaned flue gases and/or combustion gases are transmitted to an environment external system 100.

As is further illustrated by FIG. 1, WFGD unit 114 is designed to provide liquid waste and/or a liquid waste stream to a drying unit, or drying device (DD), 118. DD 118 can be any suitable drying unit, or device, including, but not limited to, spray dryer absorbers or spray dry absorbers (SDAs), spray dryer evaporators or spray dry evaporators (SDEs), fluid bed dryers, flash dryers, GEA Spray Fluidizers™ (sold by GEA Group AG of Germany or any of its subsidiaries (e.g., GEA Process Engineering A/S)), Swirl Fluidizers™, or similar equipment. A portion of the flue gases and/or combustion gases generated by furnace/boiler 102 are utilized to supply heated gas to DD 118. This is represented by the pair of arrows labeled 120a and 120b. Arrow 120a represents the desired portion of the flue gases and/or combustion gases that are drawn from the main conduit, duct or gas conveying passage and are conveyed via a conduit, duct or gas conveying passage (not shown) to DD gas input represented by arrow 120b. While not wishing to be bound to any one embodiment, the portion of flue gases and/or combustion gases that are diverted to supply DD 118 depends on a number of factors including, but not limited to, the size of furnace/boiler 102, the volumetric amount of flue gases and/or combustion gases generated by furnace/boiler 102, the flow rate of the flue gases and/or combustion gases generated by furnace/boiler 102, the composition of the flue gas generated by furnace/boiler 102, the size of DD 118, and/or the amount, volume, and/or flow rate of the liquid waste and/or a liquid waste stream from WFGD 114, and the composition of the liquid waste and/or liquid waste stream from WFGD 114. As such, one of skill in the art would recognize that there is no set amount for the portion of flue gases and/or combustion gases that are diverted to supply DD 118. Accordingly, the present invention is not limited to any specific portion, amount and/or percentage of flue gases and/or combustion gases that are diverted from the main conduit, duct or gas conveying passage connecting furnace/boiler 102, or hot-side SCR 104, with air heater 106.

DD 118 is designed to receive liquid waste and/or a liquid waste stream, via any suitable type of liquid waste supply line, pipe or conduit 119, from any desired portion of WFGD 114 including, but not limited to, the absorber recirculation tank (ART) or another device and/or output that itself is connected to the WFGD 114 including, but not limited to, a primary hydroclone overflow, a secondary hydroclone overflow, etc. and reduce and/or eliminate such liquid waste and/or a liquid waste stream by evaporating same in DD 118. Suitable liquid waste supply lines, pipes or conduits include, but are not limited to, metal supply lines, pipes or conduits; metal alloy supply lines, pipes or conduits; plastic and/or polymer supply lines, pipes or conduits; or any other supply lines, pipes or conduits known in the art to be suitable for the transportation and/or conveyance of liquid waste and/or a liquid waste or effluent stream from a WFGD. Once the flue gases and/or combustion gases diverted to DD 118 are utilized to achieve any desired level of drying, evaporation, spray dryer (or spray dry) evaporation, absorption and/or spray dryer (or spray dry) absorption of the liquid waste and/or a liquid waste stream from WFGD 114, they leave DD 118 and are reintroduced to the main conduits, ducts or gas conveying passages connecting various portions of system 100 at one or more points as denoted by arrows 122, 124, 126, 128, 130, 132 and/or 134. In one alternative, after the flue gases and/or combustion gases diverted to DD 118 leave DD 118 they can be subjected to a DD particulate control device 136 designed to remove one or more particulate compounds or materials that result from the drying, evaporation, spray dryer (or spray dry) evaporation, absorption and/or spray dryer (or spray dry) absorption process accomplished by DD 118. Particulate control device 136 can be selected from any known device and/or system for removing particulate matter from a gas stream where such devices/systems include, but are not limited to, wet electrostatic precipitators (wet ESPs), dry electrostatic precipitators (dry ESPs), fabric filters (e.g., pulse jet fabric filters), etc.

Accordingly, as can be seen from FIG. 1, the operation of system 100 of the present invention permits the control, reduction and/or mitigation of any amount of liquid waste material drawn from any desired portion of WFGD unit 114 including, but not limited to, the absorber recirculation tank (ART) thereof. In one instance the liquid waste and/or liquid waste stream that is drawn from WFGD 114 and supplied to DD 118 for control, reduction and/or mitigation has a total suspended solids content of between about 1 percent by weight and about 60 percent by weight, or between about 1.5 percent by weight and about 57.5 percent by weight, or between about 2 percent by weight and about 55 percent by weight, or between about 2.5 percent by weight and about 52.5 percent by weight, or between about 5 percent by weight and about 50 percent by weight, or between about 7.5 percent by weight and about 47.5 percent by weight, or between about 10 percent by weight and about 45 percent by weight, or between about 12.5 percent by weight and about 42.5 percent by weight, or between about 15 percent by weight and about 40 percent by weight, or between about 17.5 percent by weight and about 37.5 percent by weight, or between about 20 percent by weight and about 35 percent by weight, or between about 22.5 percent by weight and about 32.5 percent by weight, or between about 25 percent by weight and about 30 percent by weight, or even about 27.5 percent by weight. It should be noted that with regard to another embodiment of the present invention, that all of the total suspended solids in the liquid waste and/or liquid waste stream that is supplied to DD 118 for control, reduction and/or mitigation does not necessarily come directly from WFGD unit 114, rather any portion thereof can come indirectly from another device that is operatively connected to the WFGD unit 114 including, but not limited to, a hydroclone and/or some other type of gypsum concentrating device, these two liquid wastes and/or two liquid waste streams can then be combined to yield a liquid waste and/or liquid waste stream that is supplied to DD 118 having a total suspended solids content within any of the ranges stated above. Here, as well as elsewhere in the specification and claims, individual numerical values can be combined to form additional and/or non-disclosed ranges.

In another embodiment, the operation of system 100 of FIG. 1, or for that matter any of the systems of FIGS. 2 through 12, of the present invention permits the control, reduction and/or mitigation of any amount of liquid waste material drawn from any desired portion of WFGD unit 114 including, but not limited to, the absorber recirculation tank (ART) thereof. In one instance the liquid waste and/or liquid waste stream that is drawn from WFGD 114 and supplied to DD 118 for control, reduction and/or mitigation has a total suspended solids content of between about 1 percent by weight and about 60 percent by weight and a total dissolved solids content of between about 2,500 ppm (or about 0.25 percent by weight) and about 250,000 ppm (or about 25 percent by weight). In another instance the liquid waste and/or liquid waste stream that is drawn from WFGD 114 and supplied to DD 118 for control, reduction and/or mitigation has a total suspended solids content of between about 1.5 percent by weight and about 57.5 percent by weight, or between about 2 percent by weight and about 55 percent by weight, or between about 2.5 percent by weight and about 52.5 percent by weight, or between about 5 percent by weight and about 50 percent by weight, or between about 7.5 percent by weight and about 47.5 percent by weight, or between about 10 percent by weight and about 45 percent by weight, or between about 12.5 percent by weight and about 42.5 percent by weight, or between about 15 percent by weight and about 40 percent by weight, or between about 17.5 percent by weight and about 37.5 percent by weight, or between about 20 percent by weight and about 35 percent by weight, or between about 22.5 percent by weight and about 32.5 percent by weight, or between about 25 percent by weight and about 30 percent by weight, or even about 27.5 percent by weight. In another instance the liquid waste and/or liquid waste stream that is drawn from WFGD 114 and supplied to DD 118 for control, reduction and/or mitigation has a total dissolved solids content of between about 3,000 ppm (or about 0.3 percent by weight) and about 240,000 ppm (or about 24 percent by weight), or between about 4,000 ppm (or about 0.4 percent by weight) and about 230,000 ppm (or about 23 percent by weight), or between about 5,000 ppm (or about 0.5 percent by weight) and about 220,000 ppm (or about 22 percent by weight), or between about 7,500 ppm (or about 0.75 percent by weight) and about 210,000 ppm (or about 21 percent by weight), or between about 10,000 ppm (or about 1 percent by weight) and about 200,000 ppm (or about 20 percent by weight), or between about 12,500 ppm (or about 1.25 percent by weight) and about 190,000 ppm (or about 19 percent by weight), or between about 15,000 ppm (or about 1.5 percent by weight) and about 180,000 ppm (or about 18 percent by weight), or between about 20,000 ppm (or about 2 percent by weight) and about 175,000 ppm (or about 17.5 percent by weight), or between about 25,000 ppm (or about 2.5 percent by weight) and about 170,000 ppm (or about 17 percent by weight), or between about 30,000 ppm (or about 3 percent by weight) and about 160,000 ppm (or about 16 percent by weight), or between about 40,000 ppm (or about 4 percent by weight) and about 150,000 ppm (or about 15 percent by weight), or between about 50,000 ppm (or about 5 percent by weight) and about 140,000 ppm (or about 14 percent by weight), or between about 60,000 ppm (or about 6 percent by weight) and about 130,000 ppm (or about 13 percent by weight), or between about 70,000 ppm (or about 7 percent by weight) and about 120,000 ppm (or about 12 percent by weight), or between about 80,000 ppm (or about 8 percent by weight) and about 110,000 ppm (or about 11 percent by weight), or between about 90,000 ppm (or about 9 percent by weight) and about 100,000 ppm (or about 10 percent by weight), or even about 95,000 ppm (or about 9.5 percent by weight). Again, it should be noted that with regard to another embodiment of the present invention all of the total suspended solids and/or all of the dissolved solids in the liquid waste and/or liquid waste stream that is/are supplied to DD 118 for control, reduction and/or mitigation does/do not necessarily come directly from WFGD unit 114, rather any portion thereof can come indirectly from another device that is operatively connected to the WFGD unit 114 including, but not limited to, a hydroclone and/or some other type of gypsum concentrating device, these two liquid wastes and/or two liquid waste streams can then be combined to yield a liquid waste and/or liquid waste stream that is supplied to DD 118 having a total suspended solids content within any of the ranges stated above. Here, as well as elsewhere in the specification and claims, individual numerical values can be combined to form additional and/or non-disclosed ranges. Additionally, individual numerical values and/or individual ranges from one set of nested ranges can be combined with individual numerical values and/or individual ranges from the other set of nested ranges to form additional and/or non-disclosed combinations of numerical values and/or ranges.

In one instance, system 100 of the present invention permits the control, reduction and/or mitigation of 100 percent of the liquid waste generated by a WFGD unit in a fossil fuel, or fuel, combustion system that does not utilize the DD process of the present invention. In another embodiment, system 100 of the present invention permits the control, reduction and/or mitigation of about 95 percent by volume or less, about 90 percent by volume or less, about 85 percent by volume or less, about 80 percent by volume or less, about 75 percent by volume or less, about 70 percent by volume or less, about 65 percent by volume or less, about 60 percent by volume or less, about 55 percent by volume or less, about 50 percent by volume or less, about 45 percent by volume or less, about 40 percent by volume or less, about 35 percent by volume or less, about 30 percent by volume or less, about 25 percent by volume or less, about 20 percent by volume or less, about 15 percent by volume or less, about 10 percent by volume or less, about 7.5 percent by volume or less, about 5 percent by volume or less, about 2.5 percent by volume or less, about 1 percent by volume or less, or even 0.5 percent by volume or less of the liquid waste generated by a WFGD unit in a fossil fuel, or fuel, combustion system. Here, as well as elsewhere in the specification and claims, individual numerical values can be combined to form additional and/or non-disclosed ranges.

Figure 2:
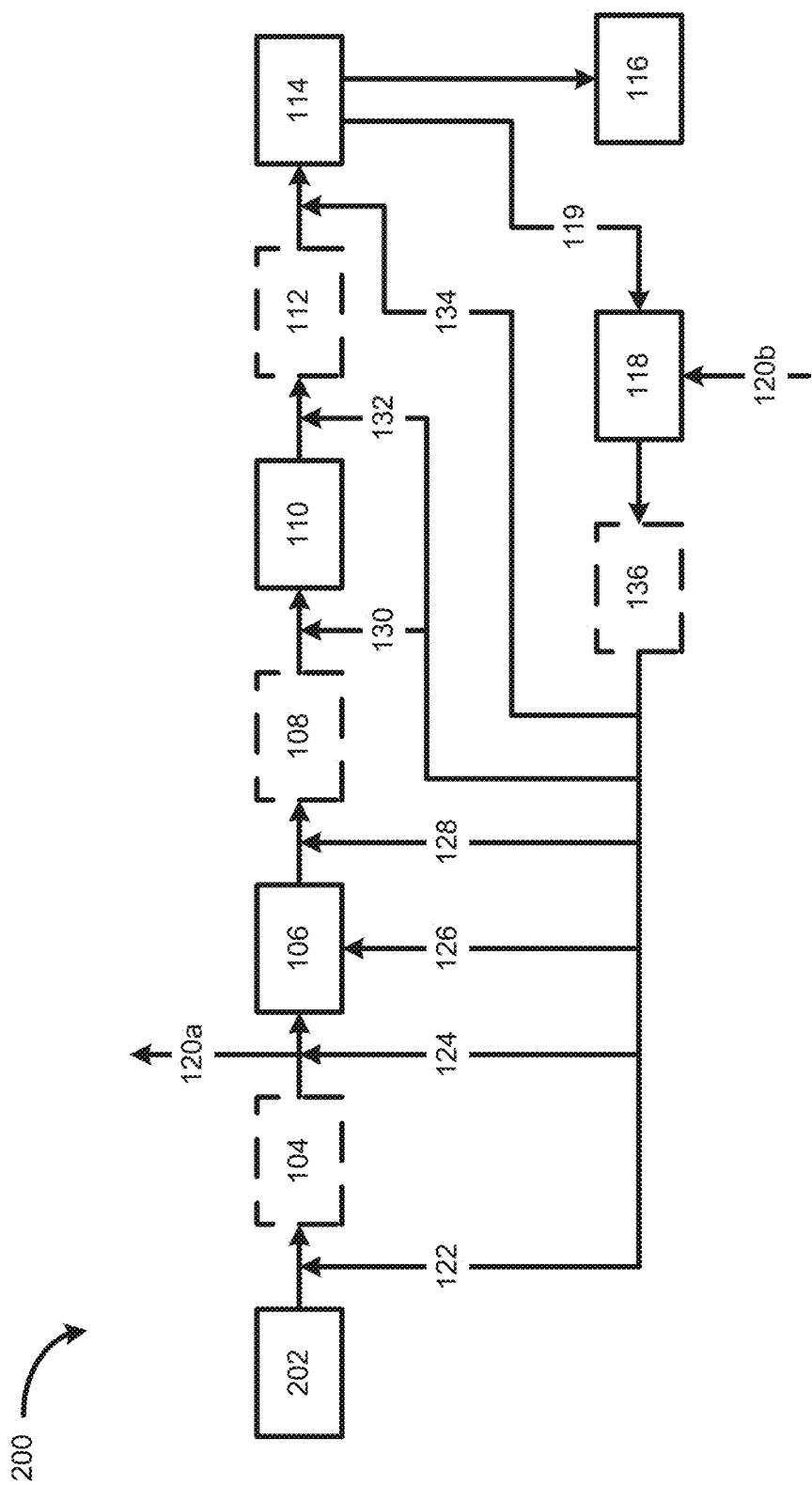
FIG. 2 is a schematic representation of a fuel burning facility which includes a system according to another embodiment for practicing one method of the present invention.

Turning to FIG. 2, FIG. 2 illustrates a system 200 according to another embodiment of the present invention. System 200 differs from system 100 of FIG. 1 in that furnace/boiler 102 of system 100 is replaced by a furnace/boiler 202 that is selected from one of an oxy-fuel combustion (i.e., oxy-combustion) furnace and/or boiler, a variable temperature furnace and/or boiler, and/or a furnace and/or boiler with an economizer by-pass. Regarding the remainder of system 200, the remainder thereof is identical in nature to that discussed above with regard to system 100 as denoted by the fact that identical reference numerals are utilized to denote the various remaining portions of system 200. It should be noted that although the embodiments of FIGS. 3 through 12 are described in connection with furnace/boiler 102, these embodiments are also applicable to a system where furnace/boiler 102 is replaced with furnace/boiler 202. Furthermore, from this point forward, identical reference numerals refer to identical parts in the remaining embodiments of FIGS. 3 through 12.

Figure 3:
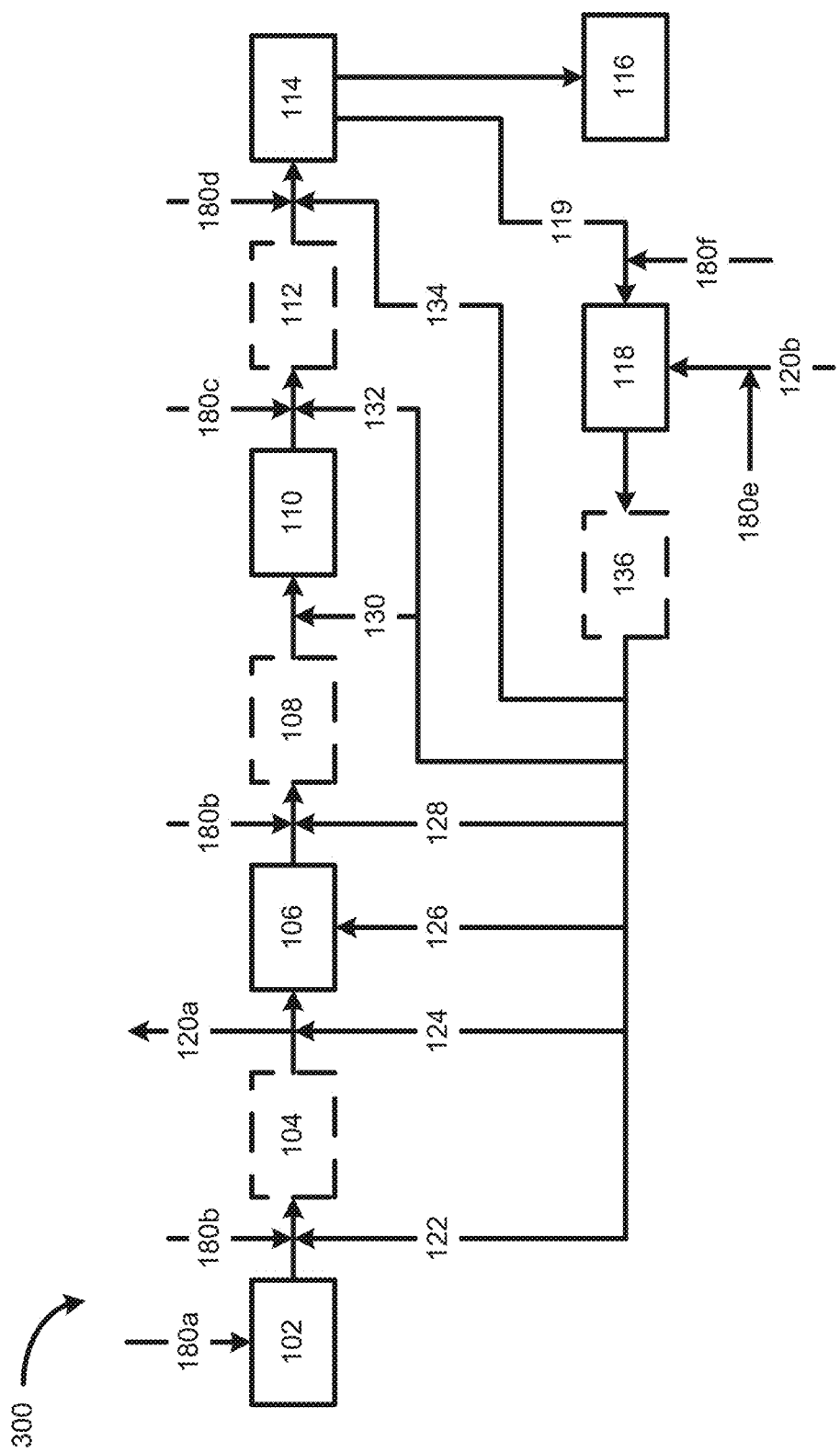
FIG. 3 is a schematic representation of a fuel burning facility which includes a system according to still another embodiment for practicing one method of the present invention.

Turning to FIG. 3, FIG. 3 illustrates a system 300 according to yet another embodiment of the present invention. System 300 differs from system 100 of FIG. 1 in that it further includes one or more additive injection devices (denoted by vertical arrows 180a, 180b, 180c, 180d and/or 180e) for injecting one or more additives into one or more of furnace/boiler 102 as represented by arrow 180a; downstream of furnace/boiler 102 and either upstream of air heater 106, or optional hot-side SCR 104, as represented by arrow 180b or if optional hot-side SCR 104 is not present but optional cold-side SCR 108 is, upstream of optional cold-side SCR 108 also represented by arrow 180b; between particulate control device 110 and WFGD 114 as represented by arrow 180c when optional secondary particulate control device 112 is not present; between particulate control device 110 and optional secondary particulate control device 112 as represented by arrow 180c; between optional secondary particulate control device 112 and WFGD 114 as represented by arrow 180d; and/or into the portion of the flue gases and/or combustion gases generated by furnace/boiler 102 that are utilized to supply heated gas to DD 118 as represented by arrow 180e. As would be apparent to those of skill in the art, if secondary particulate control device 112 is not present in system 300 then the one or more additive injection devices denoted by arrow 180d will also not be present. The devices utilized to inject the one or more additives discussed herein can be any suitable device known to those of skill in the art for injecting dry matter, liquid matter, or particulate matter be the particulate matter dry, wet, or in the form of a liquid suspension. As such, a detailed discussion of such injection devices is omitted for the sake of brevity.

Figure 11:
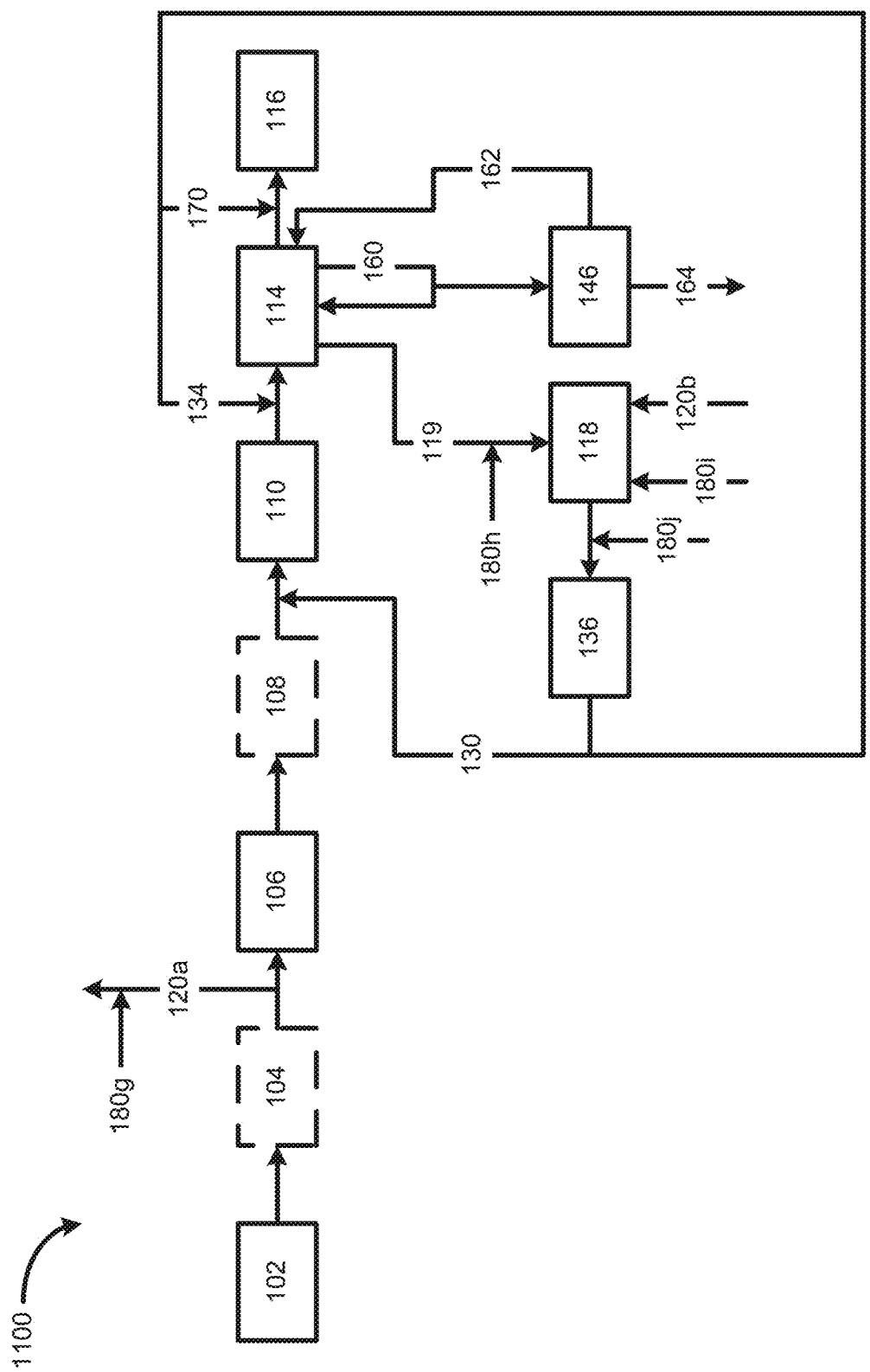
FIG. 11 is a schematic representation of a fuel burning facility which includes a system according to still another embodiment for practicing one method of the present invention.
Figure 12:
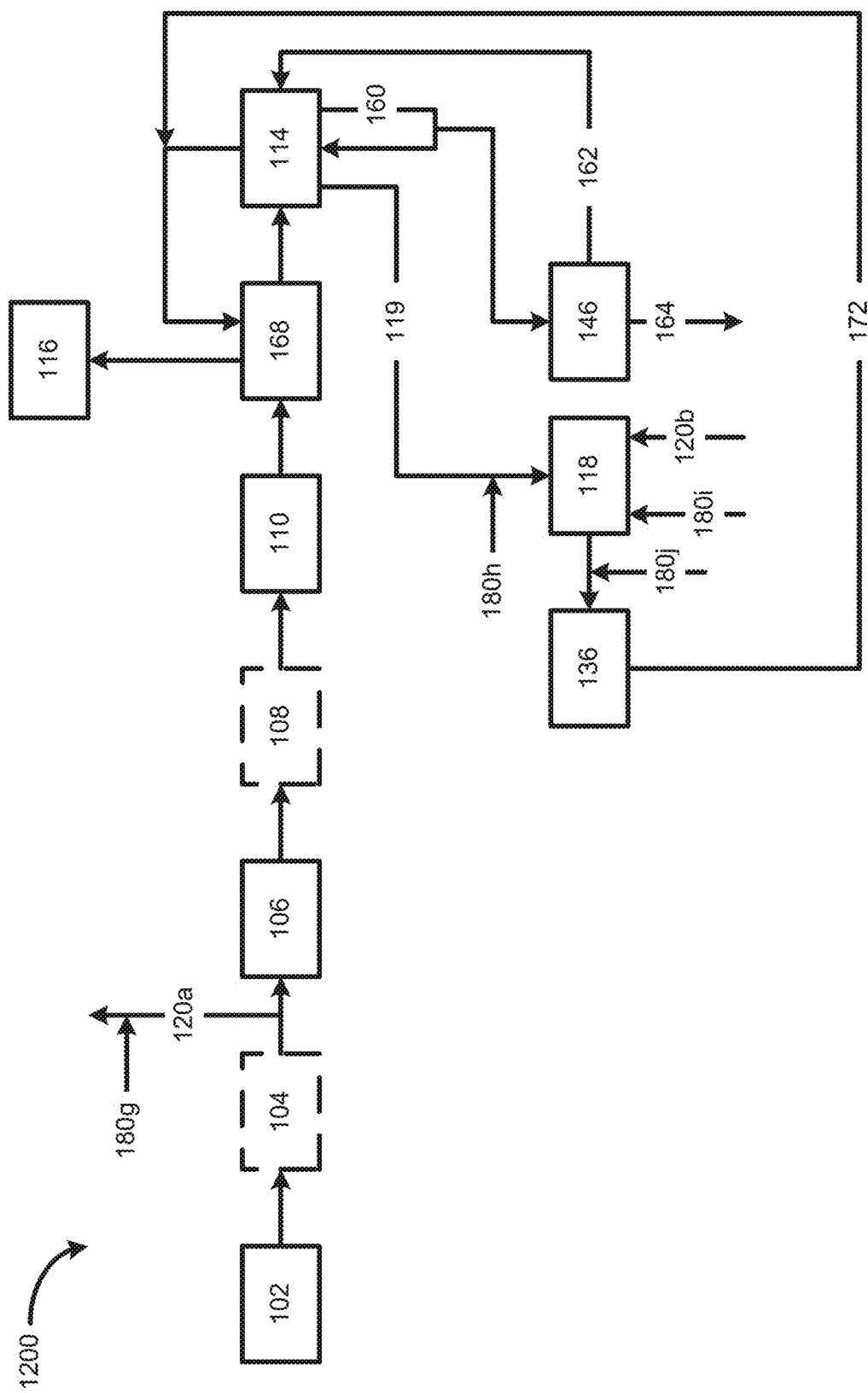
FIG. 12 is a schematic representation of a fuel burning facility which includes a system according to still another embodiment for practicing one method of the present invention.

Regarding the types of additives that can be injected in connection with the present invention, such additives are typically either one or more wet or dry absorbents and/or one or more wet or dry adsorbents. By "wet" it is meant that the absorbent and/or adsorbent is supplied in the form of a solution, liquid-based suspension, liquid-based slurry, liquid-based emulsion, etc. By "dry" it is meant that the absorbent and/or adsorbent is supplied in the form of a powder, solid, or some other solid particle-based form. Some examples of absorbent and/or adsorbents include, but are not limited to, one or more powdered activated carbons (PAC), one or more halogenated-powdered activated carbons (i.e., halogenated-PAC—examples of which include fluorinated-PAC, chlorinated-PAC, brominated-PAC, and/or iodinated-PAC), one or more phyllosilicates (be they modified such as amended silicates or unmodified), lime, wet slaked lime, dry hydrated lime, cement kiln dust, lime kiln dust, fly ash, trona, sodium bicarbonate (be it anhydrous and/or hydrated), sodium carbonate (be it anhydrous and/or hydrated), one or more suitable alkaline-based absorbents and/or adsorbents, one or more anti-caking and/or powdering additives, or any combination of two or more thereof. In one embodiment, one or more of the above-listed materials are injected at one or more of injection points 180a, 180b, 180c, 180d, 180e, 180f, 180g, 180h, 180i and/or 180j (some of these injection points will be discussed in more detail below). In still another embodiment, injection point 180f, as illustrated in FIGS. 3 through 7, and injection point 180h, as illustrated in FIGS. 11 and 12, can in the alternative, or additionally, be utilized to inject one or more salt compounds produced by, or derived from, any device and/or process in FIGS. 3 through 7, 11 and 12 into the liquid waste stream being supplied to DD 118 prior to entry of same into DD 118. In one instance, the one or more salt compounds can be dried salt compounds, re-circulated salt compounds, etc. from any one or more of the devices and/or processes of any of the embodiments illustrated in FIGS. 3 through 7, 11 and 12. In another instance, the injection of the one or more salt compounds at injection points 180f and/or 180h are done to improve the material handling properties of the liquid waste stream being supplied to DD 118 prior to entry of same into DD 118.

In one embodiment, the one or more anti-caking and/or powdering additives can be selected from any suitable anti-caking and/or powdering additives. Such additives include, but are not limited to, silicas (such as those sold under the trade name SIPERNAT® by Evonik AG of Germany), silicon dioxide, fumed silica, tricalcium phosphate, powdered cellulose, magnesium stearate, sodium bicarbonate, bone phosphate, sodium silicate, calcium silicate, magnesium trisilicate, talcum powder, sodium aluminosilicate, potassium aluminum silicate, calcium aluminosilicate, bentonite, aluminum silicate, stearic acid, polydimethylsiloxane or any combination of two or more thereof, any combination of three or more thereof, any combination of four or more thereof, or even any combination of five, of six, of seven, of eight, of nine, of ten, of eleven, or of twelve or more thereof.

Figure 4:
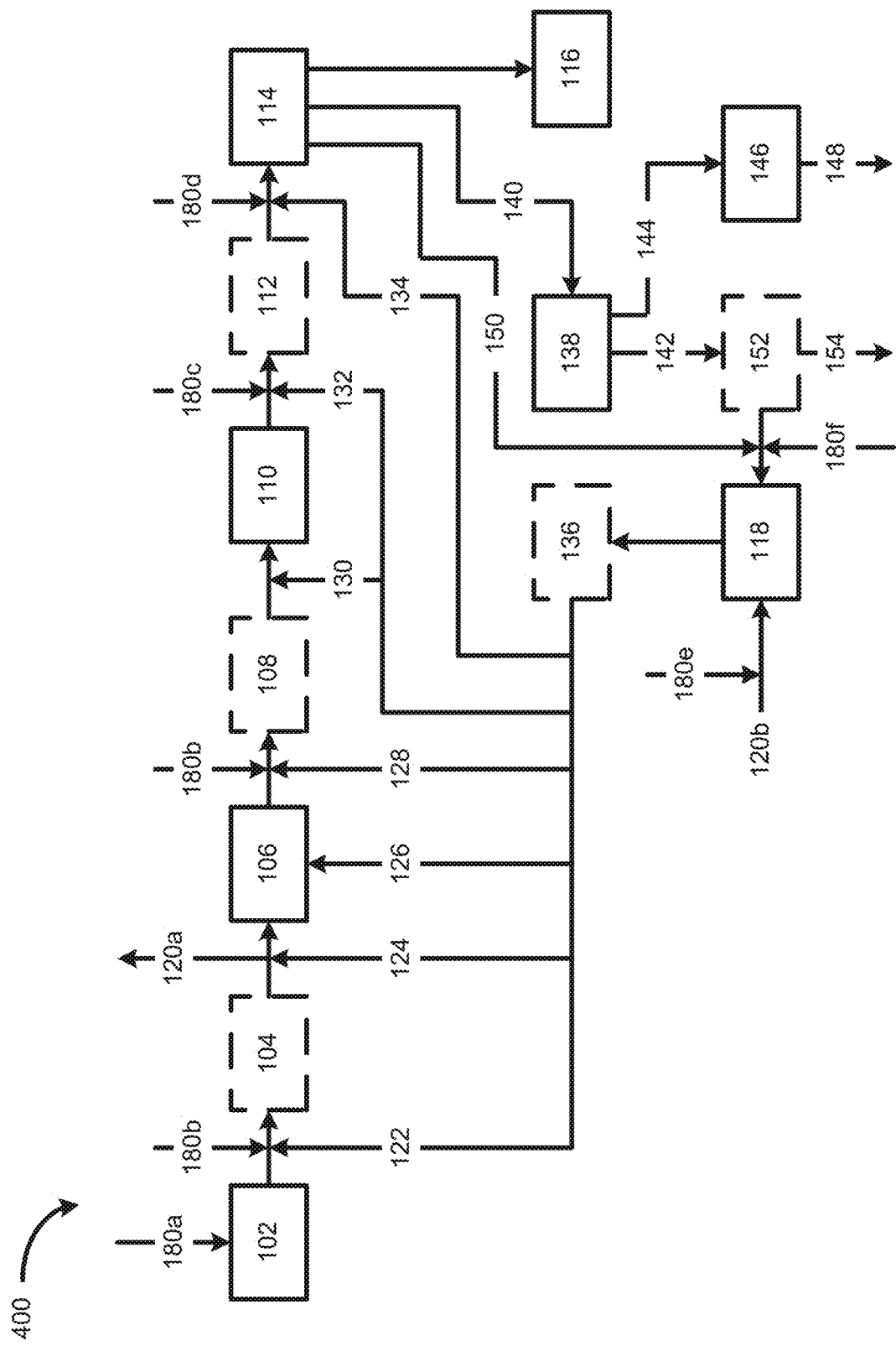
FIG. 4 is a schematic representation of a fuel burning facility which includes a system according to still another embodiment for practicing one method of the present invention.

Turning to FIG. 4, Figure illustrates a system 400 according to yet another embodiment of the present invention. System 400 of FIG. 4 differs from system 300 of FIG. 3 in that it further comprises a hydroclone 138 that receives a desired portion of, or the complete amount of, liquid waste and/or liquid waste stream that is generated by WFGD 114 via a suitable conduit, duct, pipe or conveying passage 140. Hydroclone 138 then processes such waste into two discrete streams with one stream from hydroclone 138 having: (a) a high suspended solids content of at least about 10 percent by weight, at least about 11 percent by weight, at least about 12 percent by weight, at least about 12.5 percent by weight, at least about 15 percent by weight, at least about 17.5 percent by weight, at least about 20 percent by weight, at least about 22.5 percent by weight, at least about 25 percent by weight, at least about 27.5 percent by weight, at least about 30 percent by weight, at least about 32.5 percent by weight, at least about 35 percent by weight, at least about 37.5 percent by weight, at least about 40 percent by weight, at least about 42.5 percent by weight, at least about 45 percent by weight, at least about 47.5 percent by weight, at least about 50 percent by weight, at least about 52.5 percent by weight, at least about 55 percent by weight, at least about 57.5 percent by weight, or even about 60 percent by weight; and (b) a low, or zero, suspended solids content of less than about 10 percent by weight, less than about 5 percent by weight, less than about 4 percent by weight, less than about 3 percent by weight, less than about 2 percent by weight, less than about 1 percent by weight, less than about 0.5 percent by weight, less than about 0.25 percent by weight, or less than about 0.1 percent by weight, or even 0 percent by weight. Here, as well as elsewhere in the specification and claims, individual numerical values can be combined to form additional and/or non-disclosed ranges. These streams are represented by the two outward arrows 142 and 144 that exit from hydroclone 138.

In light of the above, one of the above high suspended solids content stream or the low suspended solids content stream from hydroclone 138 is supplied to DD 118 and is subject to liquid waste control, reduction and/or mitigation as described above with regard to system 100. The remaining high suspended solids content stream or the low suspended solids content stream from hydroclone 138 that is not supplied to DD 118 is supplied to a filter device 146 that can be utilized to remove one or more desirable by-products contained in the liquid waste stream from a WFGD including, but not limited to, gypsum and/or supply back to WFGD 114 any remaining liquid material that is generated by filter device 146. This function is denoted generally by output arrow 148 from filter device 146. Filter device 146 can be any type of filter including, but not limited to, a belt filter, a rotary filter, a drum filter, etc. In another instance, system 400 further comprises a secondary liquid waste and/or liquid waste stream that is generated by WFGD 114 via a suitable conduit, duct, pipe or conveying passage 150 that sends a portion of the liquid waste and/or liquid waste stream from WFGD 114 directly to DD 118 and/or is combined with the high, or low, suspended solids content stream from hydroclone 138 prior to entry of same into DD 118.

In still another instance, system 400 further comprises a secondary hydroclone device 152 that is located in between hydroclone 138 and DD 118. In the instance where secondary hydroclone 152 is present it is useful to refer to hydroclone 138 as primary hydroclone 138. When secondary hydroclone 152 is present in system 400, secondary hydroclone receives either the high suspended solids content stream or the low suspended solids content stream from primary hydroclone 138 and itself generates a second set of a high suspended solids content stream and a low suspended solids content stream. These secondary high and low suspended solids content streams can have solids contents similar to, or different from, the high and low suspended solids content streams from primary hydroclone 138 so long as the suspended solids content of each of the high and low suspended solids content streams fall within the ranges defined above with regard to high and low suspended solids content streams of hydroclone 138.

In light of the above, one of the above high suspended solids content stream or the low suspended solids content stream from secondary hydroclone 152 is supplied to DD 118 and is subject to liquid waste control, reduction and/or mitigation as described above with regard to system 100. The remaining high suspended solids content stream or the low suspended solids content stream from secondary hydroclone 152 that is not supplied to DD 118 is utilized to generate one or more desirable by-products contained in the liquid waste stream from a WFGD including, but not limited to, gypsum and/or supply back to WFGD 114 any remaining low suspended solids content material that is generated by secondary hydroclone 152. This function is denoted generally by output arrow 154 from secondary hydroclone 152. In yet another instance, system 400 further comprises a secondary liquid waste and/or liquid waste stream that is generated by WFGD 114 via a suitable conduit, duct, pipe or conveying passage 150 that sends a portion of the liquid waste and/or liquid waste stream from WFGD 114 directly to DD 118 and/or is combined with the high, or low, suspended solids content stream from secondary hydroclone 152 prior to entry of same into DD 118.

In still yet another instance, system 400 also further comprises one or more additive injection devices (denoted by vertical arrow 180*f*) for injecting one or more additives into the liquid waste stream being supplied to DD 118 prior to entry of same into DD 118. As discussed above, the types of additives that can be injected in connection with the present invention are absorbents and/or adsorbents including, but not limited to, one or more powdered activated carbons (PAC), one or more halogenated-powdered activated carbons (i.e., halogenated-PAC—examples of which include fluorinated-PAC, chlorinated-PAC, brominated-PAC, and/or iodinated-PAC), one or more phyllosilicates (be they modified such as amended silicates or unmodified), lime, wet slaked lime, dry hydrated lime, cement kiln dust, lime kiln dust, fly ash, trona, sodium bicarbonate (be it anhydrous and/or hydrated), sodium carbonate (be it anhydrous and/or hydrated), one or more suitable alkaline-based absorbents and/or adsorbents, or any combination of two or more thereof. In this case, the injection device can be selected from any suitable injection device that can inject the above compounds into a liquid waste and/or a liquid waste stream.

Figure 5:
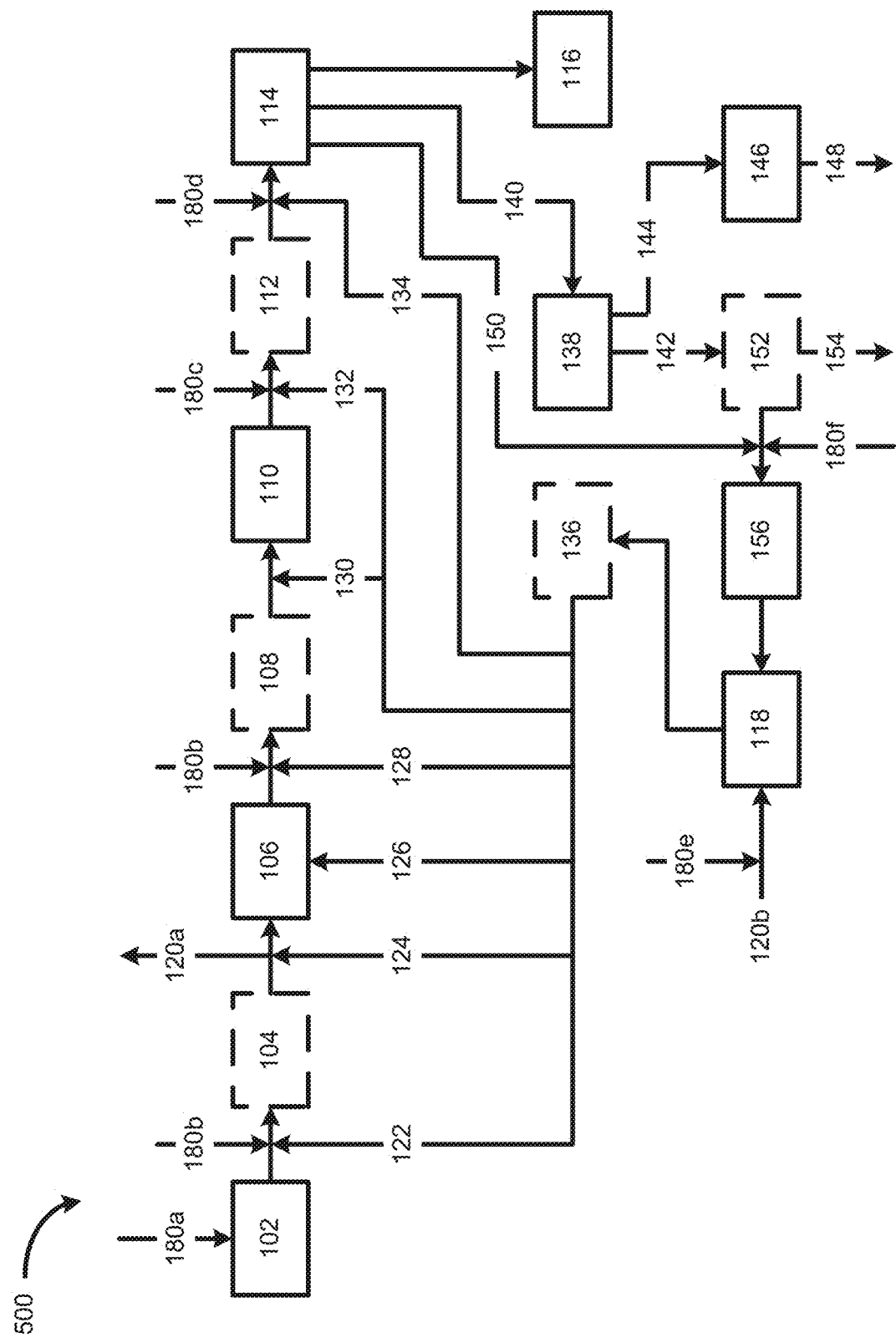
FIG. 5 is a schematic representation of a fuel burning facility which includes a system according to still another embodiment for practicing one method of the present invention.

Turning to FIG. 5, FIG. 5 illustrates a system 500 according to yet another embodiment of the present invention. System 500 differs from system 400 of FIG. 4 in that it contains a one or more physical and/or chemical water treatment devices 156 located between either hydroclone 138 and DD 118, or between secondary hydroclone 152 and DD 118. As can be seen from FIG. 5, a secondary liquid waste and/or liquid waste stream that is generated by WFGD 114 via a suitable conduit, duct, pipe or conveying passage 150 sends a portion of the liquid waste and/or liquid waste stream from WFGD 114 to a conduit, duct, pipe or conveying passage upstream of the one or more physical and/or chemical water treatment devices 156 to be combined with the liquid waste from one, or both, of hydroclones 138 and 152. Additionally additive injection device 180*f* is not present in system 500 as the one or more physical and/or chemical water treatment devices 156 can be designed to, if so desired, replace this function.

Figure 6:
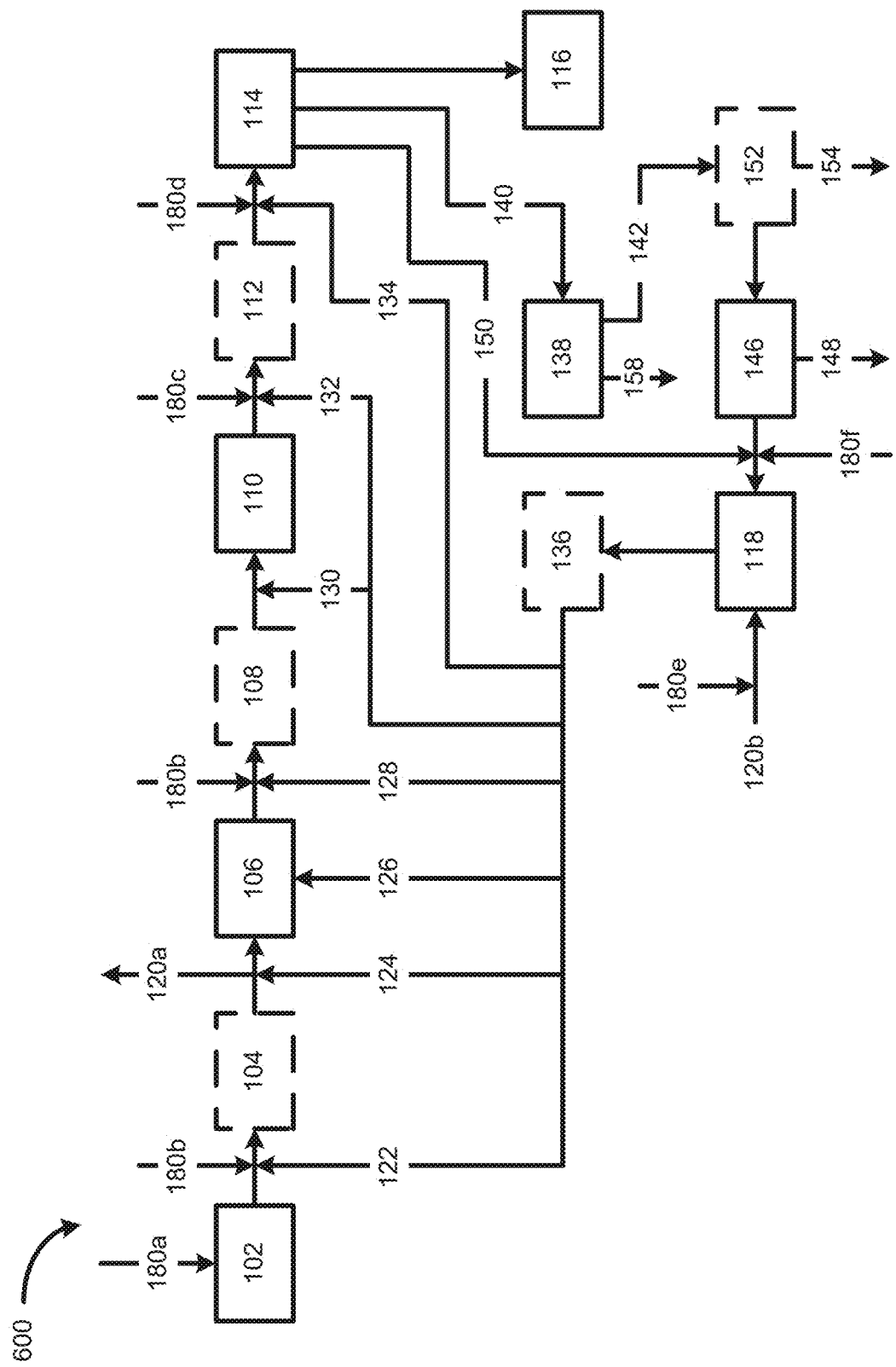
FIG. 6 is a schematic representation of a fuel burning facility which includes a system according to still another embodiment for practicing one method of the present invention.

Turning to FIG. 6, FIG. 6 illustrates a system 600 according to yet another embodiment of the present invention. System 600 differs from system 400 of FIG. 4 in that hydroclone 138 supplies either one of the above high suspended solids content stream or the low suspended solids content stream to filter 146 that is now positioned between hydroclone 138 and DD 118. Filter 146 is independently selected from the devices discussed above with regard to filter 146 of system 400. Filter 146 of this embodiment operates in a similar manner to that discussed above with regard to system 400 other than a portion of the material generated by filter 146 is passed on to DD 118 for control, reduction and/or mitigation of any liquid therein via DD 118. The solids content of such streams are in the ranges discussed above with regard to system 400. The remaining high suspended solids content stream or the low suspended solids content stream from hydroclone 138 is, in this embodiment, supplied back to WFGD 114 via a suitable conduit, duct, pipe or conveying passage partially denoted by arrow 158. In another instance, system 600 can further comprise a secondary hydroclone that is located in between hydroclone 138 and filter 146. In this embodiment, although positioned differently, secondary hydroclone operates in a manner identical to that of secondary hydroclone in system 400.

Figure 7:
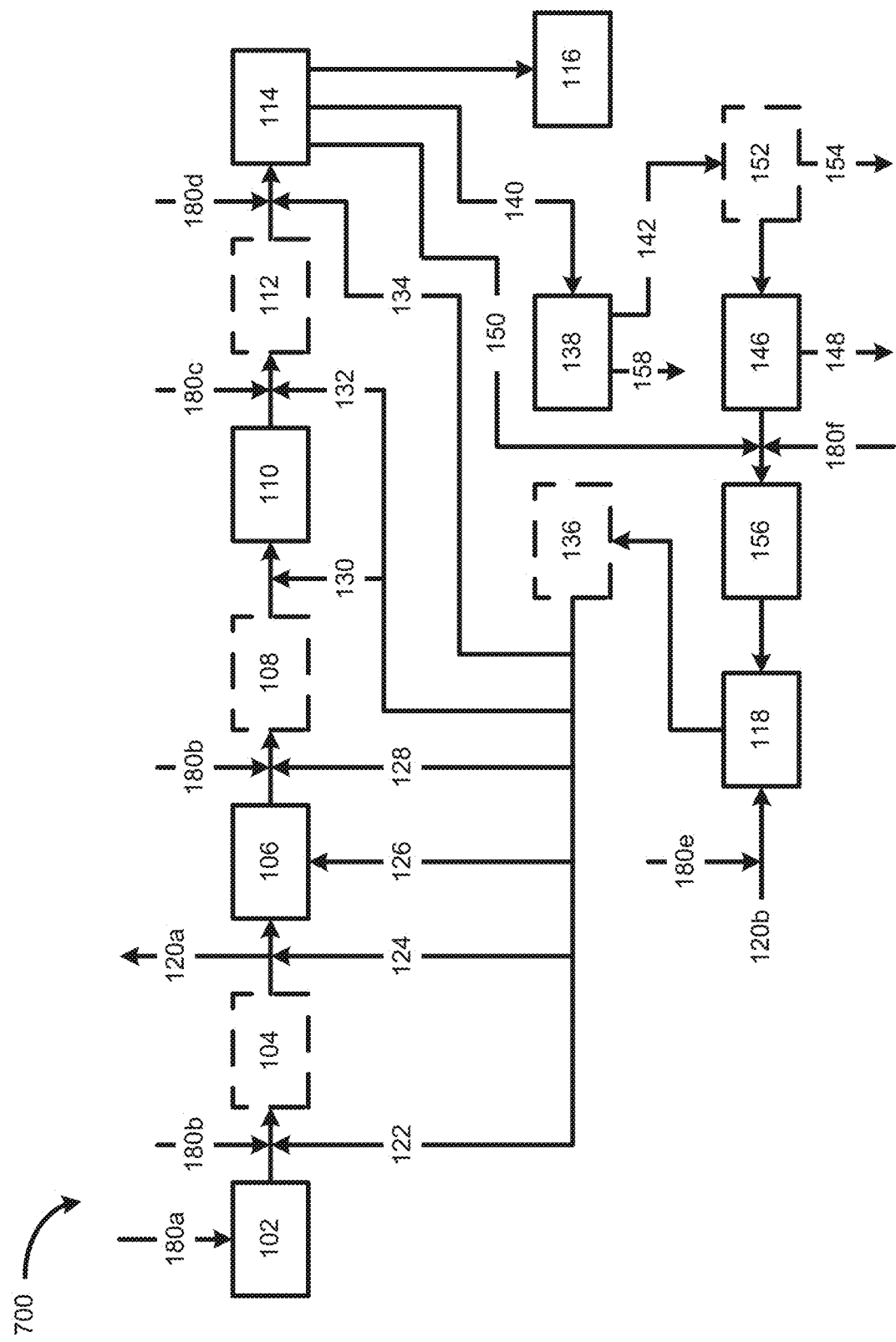
FIG. 7 is a schematic representation of a fuel burning facility which includes a system according to still another embodiment for practicing one method of the present invention.

Turning to FIG. 7, FIG. 7 illustrates a system 700 according to yet another embodiment of the present invention. System 700 differs from system 600 of FIG. 6 in that it contains a one or more physical and/or chemical water treatment devices 156 located between filter 146 and DD 118. As can be seen from FIG. 7, a secondary liquid waste and/or liquid waste stream that is generated by WFGD 114 via a suitable conduit, duct, pipe or conveying passage 150 sends a portion of the liquid waste and/or liquid waste stream from WFGD 114 to a conduit, duct, pipe or conveying passage upstream of the one or more physical and/or chemical water treatment devices 156 to be combined with the liquid waste from one, or both, of hydroclones 138 and 152 and the material generated by filter 146. Additionally additive injection device 180*f* is not present in system 700 as the one or more physical and/or chemical water treatment devices 156 can be designed to, if so desired, replace this function.

Figure 8:
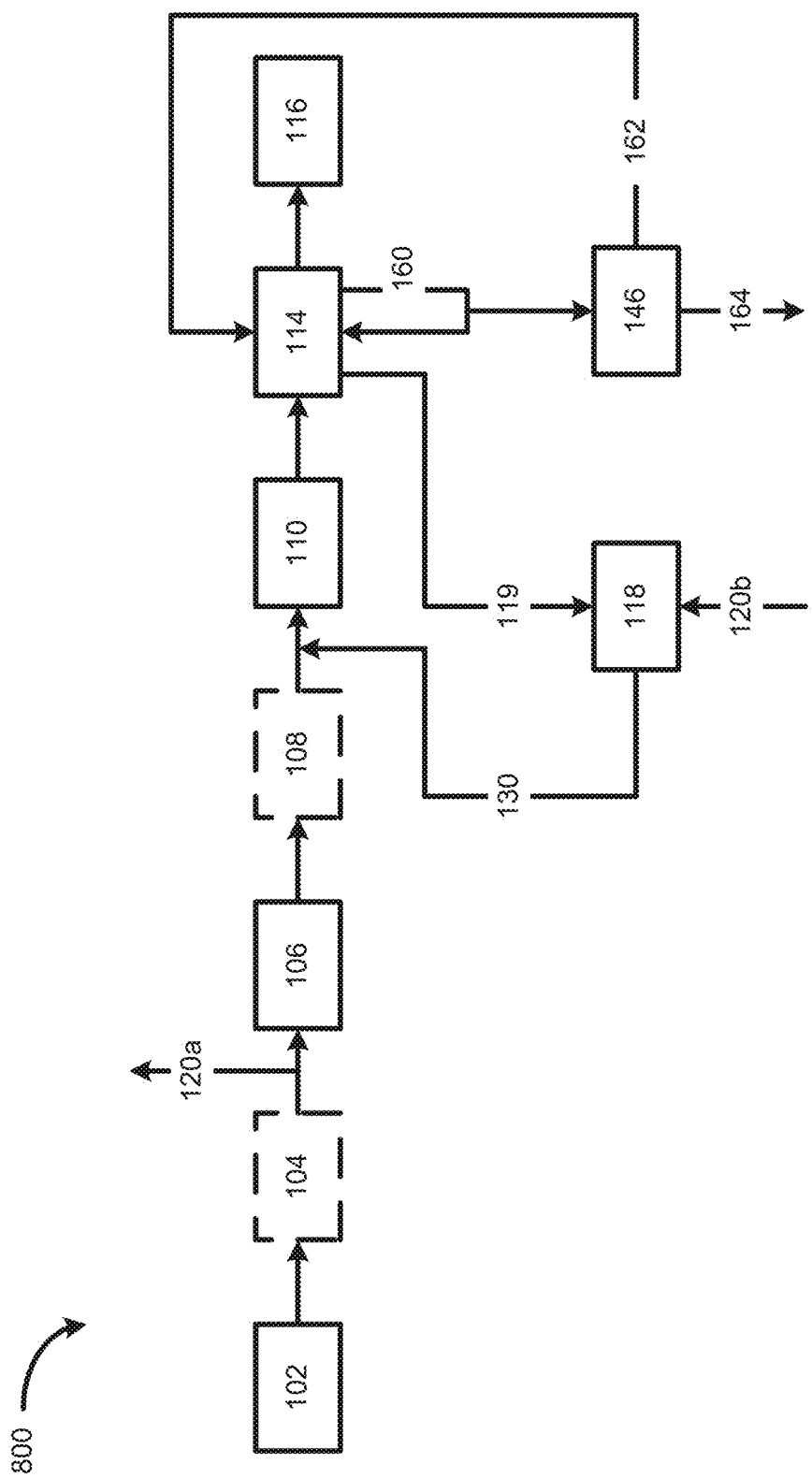
FIG. 8 is a schematic representation of a fuel burning facility which includes a system according to still another embodiment for practicing one method of the present invention.

Turning to FIG. 8, FIG. 8 illustrates a system 800 according to yet another embodiment of the present invention. System 800 differs from system 100 of FIG. 1 in that it contains a circulation loop 160 that is designed to recirculate absorber recirculation tank (ART) slurry and/or solution from WFGD 114 so as to permit a portion thereof to be supplied to filter 146 where filter 146 separates this portion of the ART into a mother liquor that is returned to the WFGD via a suitable conduit, duct, pipe or conveying passage 162 and a gypsum product 164. In system 800, the portion of the liquid waste and/or liquid waste stream that is supplied to DD 118 has a suspended solids, or total suspended solids, content of between 5 percent by weight and about 60 percent by weight, or between about 6 percent by weight and about 57.5 percent by weight, or between about 7 percent by weight and about 55 percent by weight, or between about 8 percent by weight and about 52.5 percent by weight, or between about 9 percent by weight and about 50 percent by weight, or between about 10 percent by weight and about 47.5 percent by weight, or between about 11 percent by weight and about 45 percent by weight, or between about 12.5 percent by weight and about 42.5 percent by weight, or between about 15 percent by weight and about 40 percent by weight, or between about 17.5 percent by weight and about 37.5 percent by weight, or between about 20 percent by weight and about 35 percent by weight, or between about 22.5 percent by weight and about 32.5 percent by weight, or between about 25 percent by weight and about 30 percent by weight, or even about 27.5 percent by weight. Here, as well as elsewhere in the specification and claims, individual numerical values can be combined to form additional and/or non-disclosed ranges.

Figure 9:
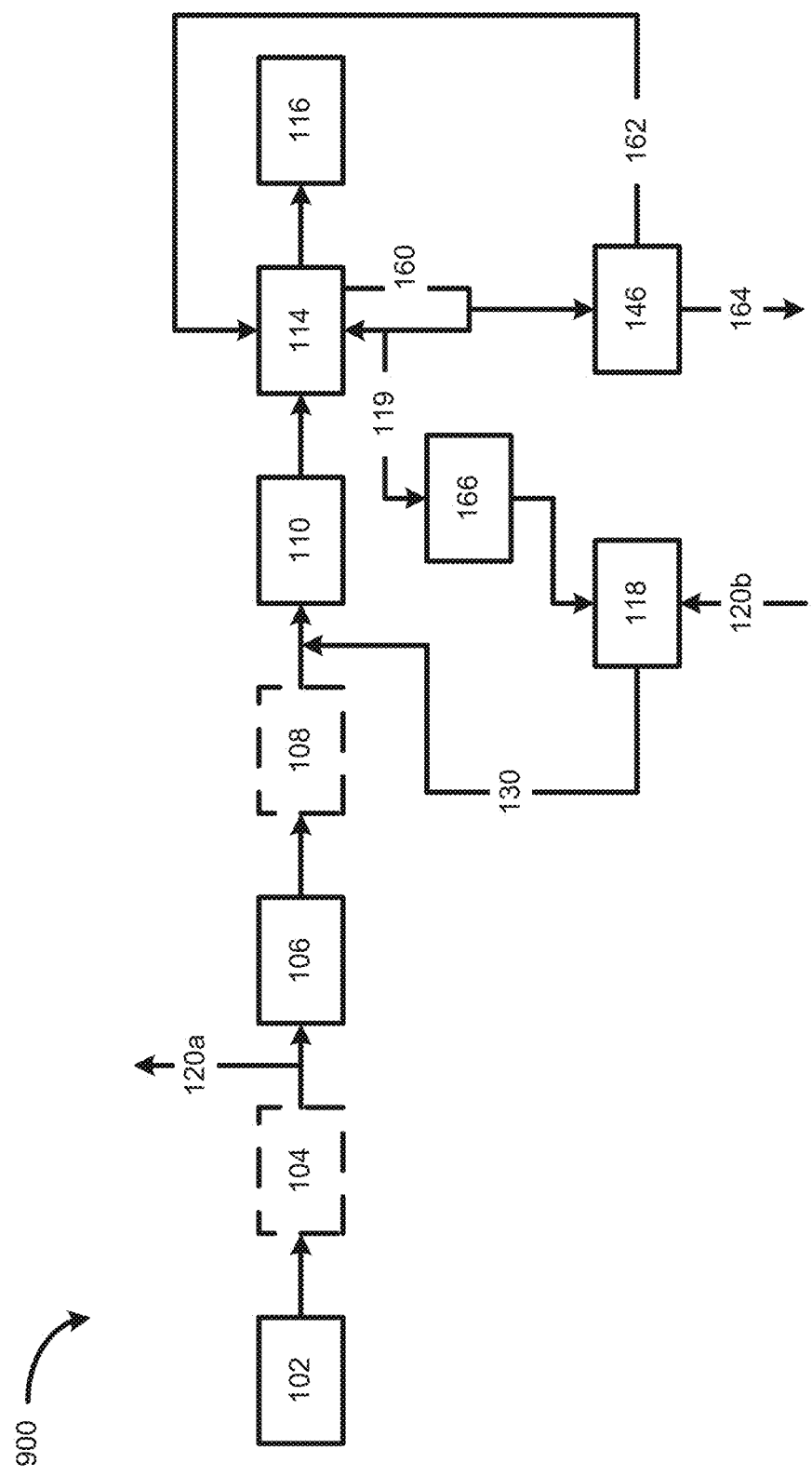
FIG. 9 is a schematic representation of a fuel burning facility which includes a system according to still another embodiment for practicing one method of the present invention.

Turning to FIG. 9, FIG. 9 illustrates a system 900 according to yet another embodiment of the present invention. System 900 differs from system 800 of FIG. 8 in that it contains a drying unit feed tank 166 for storing liquid waste from WFGD 114. Additionally, as is illustrated in FIG. 9, the liquid waste and/or liquid waste stream for this embodiment comes from circulation loop 160 and not directly from WFGD 114, or even directly from the ART of WFGD 114. It should be noted that although not shown therein, drying unit feed tank 166 could optionally be present in any one or more of the embodiments of FIGS. 1 through 7.

Figure 10:
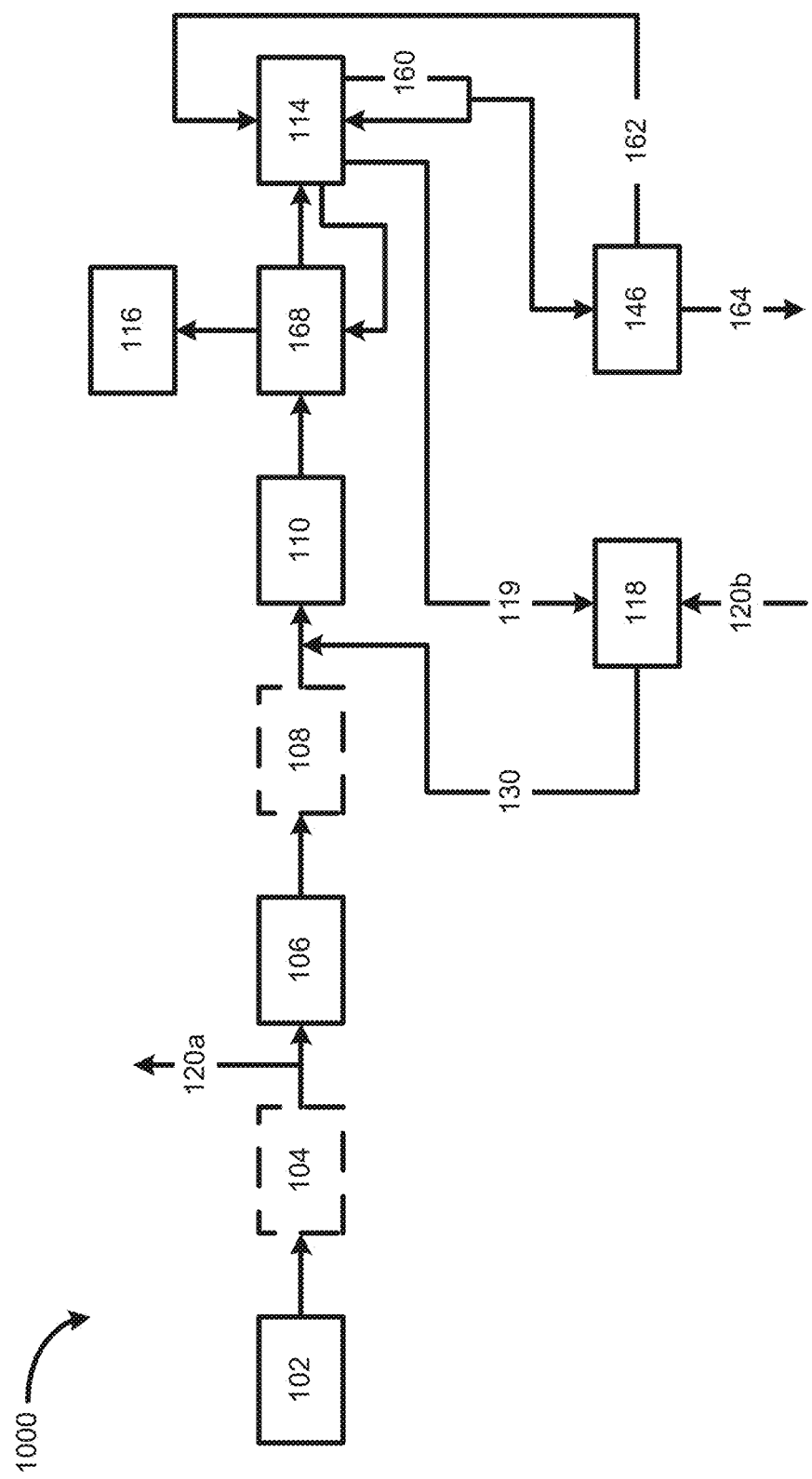
FIG. 10 is a schematic representation of a fuel burning facility which includes a system according to still another embodiment for practicing one method of the present invention.

Turning to FIG. 10, FIG. 10 illustrates a system 1000 according to yet another embodiment of the present invention. System 1000 differs from system 800 of FIG. 8 in that it contains a heat exchanger 168 position between particulate control device 110 and WFGD 114. As can be seen from FIG. 10 heat exchanger 168 receives the flue gases, or combustion gases, output from WFGD 114 as well as permitting the main flow the flue gases, or combustion gases, upstream of WFGD 114 to pass there through so as to permit the desired movement of heat from one flue gas stream to the other. The nature of the heat exchanger of this embodiment is not critical so long as the device permits the transfer of heat from one flue gas stream to the other stream, or vice versa.

Turning to FIG. 11, FIG. 11 illustrates a system 1100 according to yet another embodiment of the present invention. System 1100 differs from system 800 of FIG. 8 in that it contains a DD particulate control device 136 downstream of DD 118. DD particulate control device 136 can be selected from those devices discussed above with regard to device 136 from other embodiments of the present invention. As can be seen from FIG. 11, system 1100 further contains one or more additive injection devices 180g, 180h, 180i and/or 180j located as illustrated in FIG. 11. These additive injection devices can be selected from the devices discussed above with regard to any of additive injection devices 180a through 180f and can inject any of the one or more additives discussed above, or in one embodiment, wet or dry hydrated lime (Ca(OH)$_2$) (that is in solution, slurry, suspension, and/or emulsion versus in some solid, particulate, powder and/or granular form). Furthermore, system 1100 also permits reinjection of the flue gases and/or combustion gases exiting DD 118 and DD particulate device 136 into a position between WFGD 114 and the remainder of any AQCS equipment and/or stack 116.

Turning to FIG. 12, FIG. 12 illustrates a system 1200 according to yet another embodiment of the present invention. System 1200 differs from system 1000 of FIG. 10 in that it contains a DD particulate control device 136 downstream of DD 118. DD particulate control device 136 can be selected from those devices discussed above with regard to device 136 from other embodiments of the present invention. As can be seen from FIG. 12, system 1200 further contains one or more additive injection devices 180g, 180h, 180i and/or 180j located as illustrated in FIG. 12. These additive injection devices can be selected from the devices discussed above with regard to any of additive injection devices 180a through 180e and can inject any of the one or more additives discussed above, or in one embodiment, slaked lime (Ca(OH)$_2$). Furthermore, system 1200 alternatively permits reinjection of the flue gases and/or combustion gases exiting DD 118 and DD particulate device 136 into a position 172 between WFGD 114 and one portion of heat exchanger 168 in lieu of injection point 130 of FIG. 10.

While not wishing to be bound to any one set of advantages and/or accomplishments, the embodiments of the present invention permit one to realize one or more of: (a) an ability to influence the chemical and/or physical properties of the powder, or other dried material, generated by the one or more DDs 118 of the present invention; (b) an ability to influence the chemical and/or physical properties of the liquid waste and/or liquid waste stream that is supplied to one or more DDs 118 of the present invention thereby also permitting, in at least some instances, control of the chemical and/or physical properties of the powder, or other dried material, generated by the one or more DDs 118 of the present invention; and/or (c) an ability to influence the chemical and/or physical properties (e.g., particulate size, bulk density, the amount of bound and/or unbound water, hygroscopicity, etc.) of the landfill-bound material, be it liquid, slurry, suspension emulsion, dried material, or otherwise, that is produced by the one or more DDs 118 powder, or other dried material, generated by the one or more DDs 118. In another instance, the present invention permits one to realize and/or achieve recirculation of the dried product from the one or more DDs 118 to any one more desired injection devices and/or injection points including, but not limited to, any one or more of the injection devices and/or injection points 180a through 180j discussed above and/or any other desired injection point via any suitable injection device, or devices, regardless of whether or not such injection point and/or injection is/are specifically disclosed and/or discussed herein.

In still another instance, the present invention permits, in at least some of the embodiments disclosed herein, one to achieve a modification of, control of, and/or a change in at least one or more chemical and/or physical properties of at least a slurry and/or solution contained in the ART of a WFGD unit via the present invention's ability to control, reduce and/or mitigate one or more liquid wastes and/or liquid waste streams from a WFGD unit. In still yet another embodiment, the present invention can involve the use of one or more wet or dry injection steps and/or processes where one or more partially dry particulate materials, one or more dry particulate materials, and/or one or more wet particulate materials from one or more downstream devices and/or processes are injected into one or more upstream devices and/or processes in order to create and/or promote at least one of the following: agglomeration, achieve solubility, promote and/or enhance solubility and/or dissolvability, etc.

It should again be noted, that any of the systems of FIGS. 1 through 12 can be utilized to control, reduce and/or mitigate of any amount of liquid waste material drawn from any desired portion of WFGD unit 114 including, but not limited to, the absorber recirculation tank (ART) thereof. As discussed in detail above, such liquid waste material can contain either one, or both, of suspended solids and dissolved solids. In another embodiment, the systems of the present invention permit the control, reduction and/or mitigation of any amount of liquid waste material drawn from any desired portion of WFGD unit 114 including, but not limited to, the absorber recirculation tank (ART) thereof that contains both suspended solids and dissolved solids without requiring pre-treatment of such liquid waste material to remove any portion of, or all of, the suspended solids contained therein so as to make the remaining portion of such liquid waste material suitable for control, reduction and/or mitigation in one or more of DDs 118 disclosed herein. While not wishing to be bound to any one advantage, the fact that the systems of the present invention permit, in some embodiments, the reduction and/or mitigation of a liquid waste material that contains both suspended solids and dissolved solids without first treating such liquid waste material to remove any portion of, or all of, the suspended solids contained therein permits the systems of the present invention to be simplified, to draw liquid waste material from more points in a given system as disclosed in FIGS. 1 through 12.

In one embodiment, the systems of the present invention are advantageous in that they permit control, reduce and/or mitigate of any amount of liquid waste material drawn from any desired portion of WFGD unit 114 where such waste has a high suspended solids, or total suspended solids, content. That is, having a suspended solids, or total suspended solids, content of between 5 percent by weight and about 60 percent by weight, or between about 6 percent by weight and about 57.5 percent by weight, or between about 7 percent by weight and about 55 percent by weight, or between about 8 percent by weight and about 52.5 percent by weight, or between about 9 percent by weight and about 50 percent by weight, or between about 10 percent by weight and about 47.5 percent by weight, or between about 11 percent by weight and about 45 percent by weight, or between about 12.5 percent by weight and about 42.5 percent by weight, or between about 15 percent by weight and about 40 percent by weight, or between about 17.5 percent by weight and about 37.5 percent by weight, or between about 20 percent by weight and about 35 percent by weight, or between about 22.5 percent by weight and about 32.5 percent by weight, or between about 25 percent by weight and about 30 percent by weight, or even about 27.5 percent by weight. Here, as well as elsewhere in the specification and claims, individual numerical values can be combined to form additional and/or non-disclosed ranges. Such locations where such waste streams having high total suspended solids, or suspended solids, content can be drawn from include, but are not limited to, a WFGD's absorber recirculation tank (ART), at least one primary hydroclone underflow, at least one filter feed tank, or any combination of two or more thereof, or even three or more thereof.

In another embodiment, the systems illustrated in FIGS. 1 through 12 are composed of a variety of components as described herein with the components shown in dashed lines being optional. As such, in one embodiment any one or more, two or more, three or more, four or more, or all five of such dashed components of any of FIGS. 1 through 12 are present. Alternatively, in another embodiment any combination of the various dashed components of any of FIGS. 1 through 12 are present.

Figure 13:
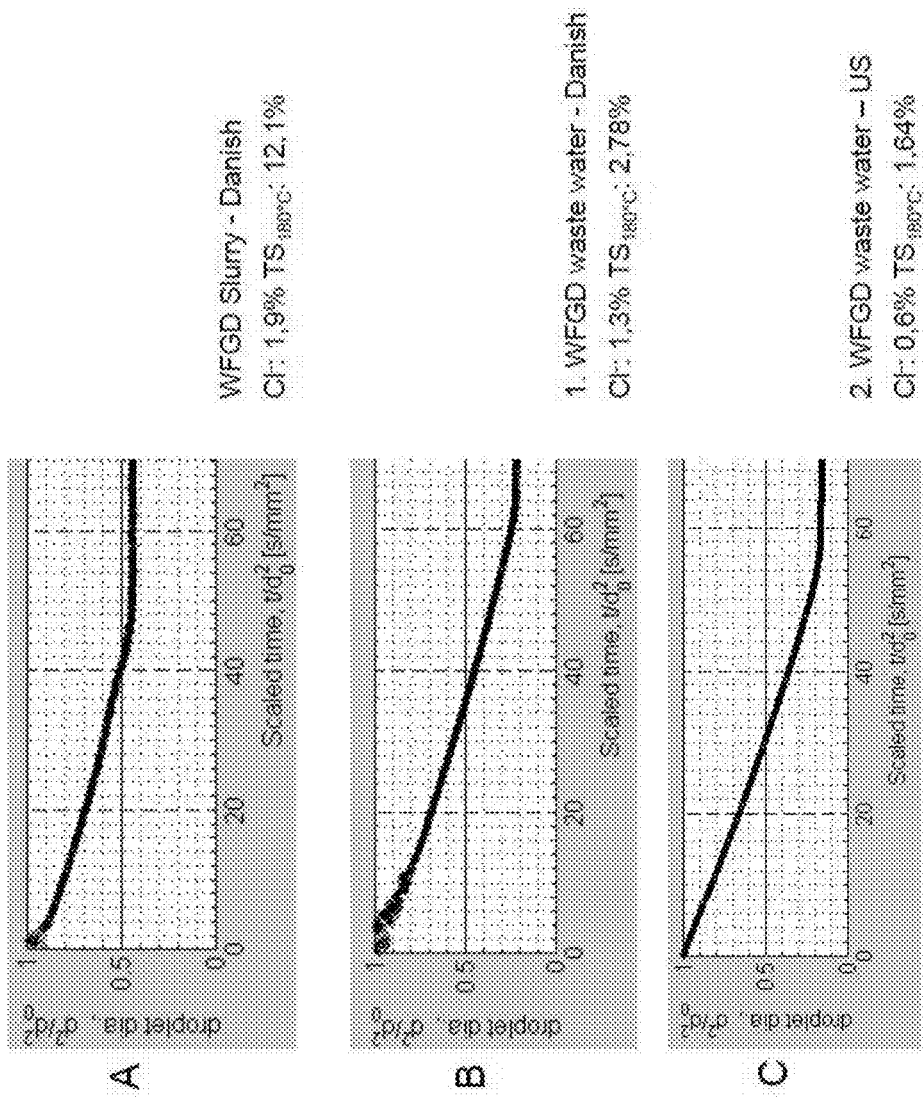
FIGS. 13A through 13C are graphs illustrating test data from the drying of a levitated single droplet of WFGD slurry (FIG. 13A) and two different WFGD waste waters (FIGS. 13B and 13C.
Figure 14:
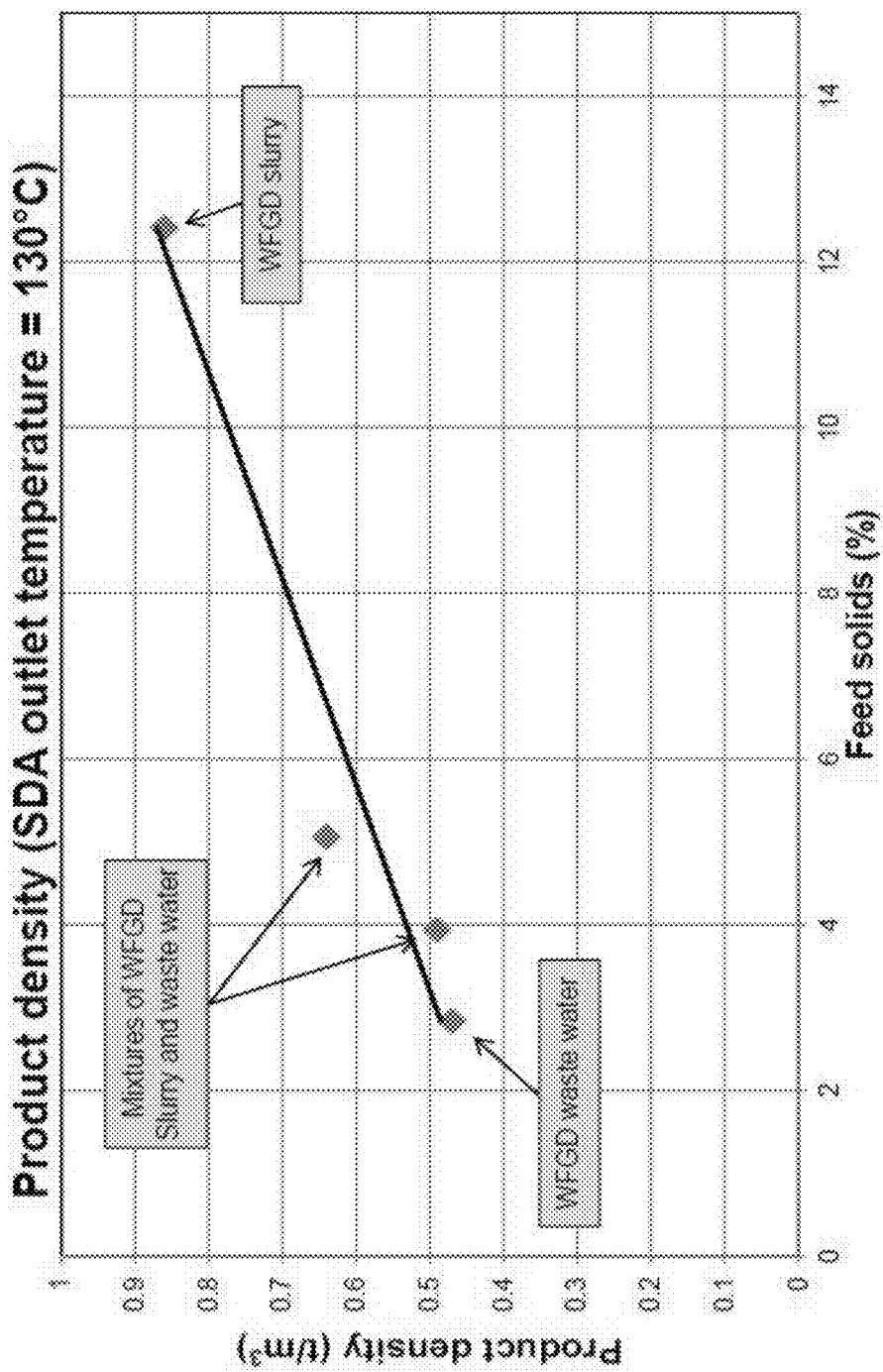
FIG. 14 is a graph illustrating the bulk density of spray dried product as a function of solids content in the liquid waste being dried.
Figure 15:
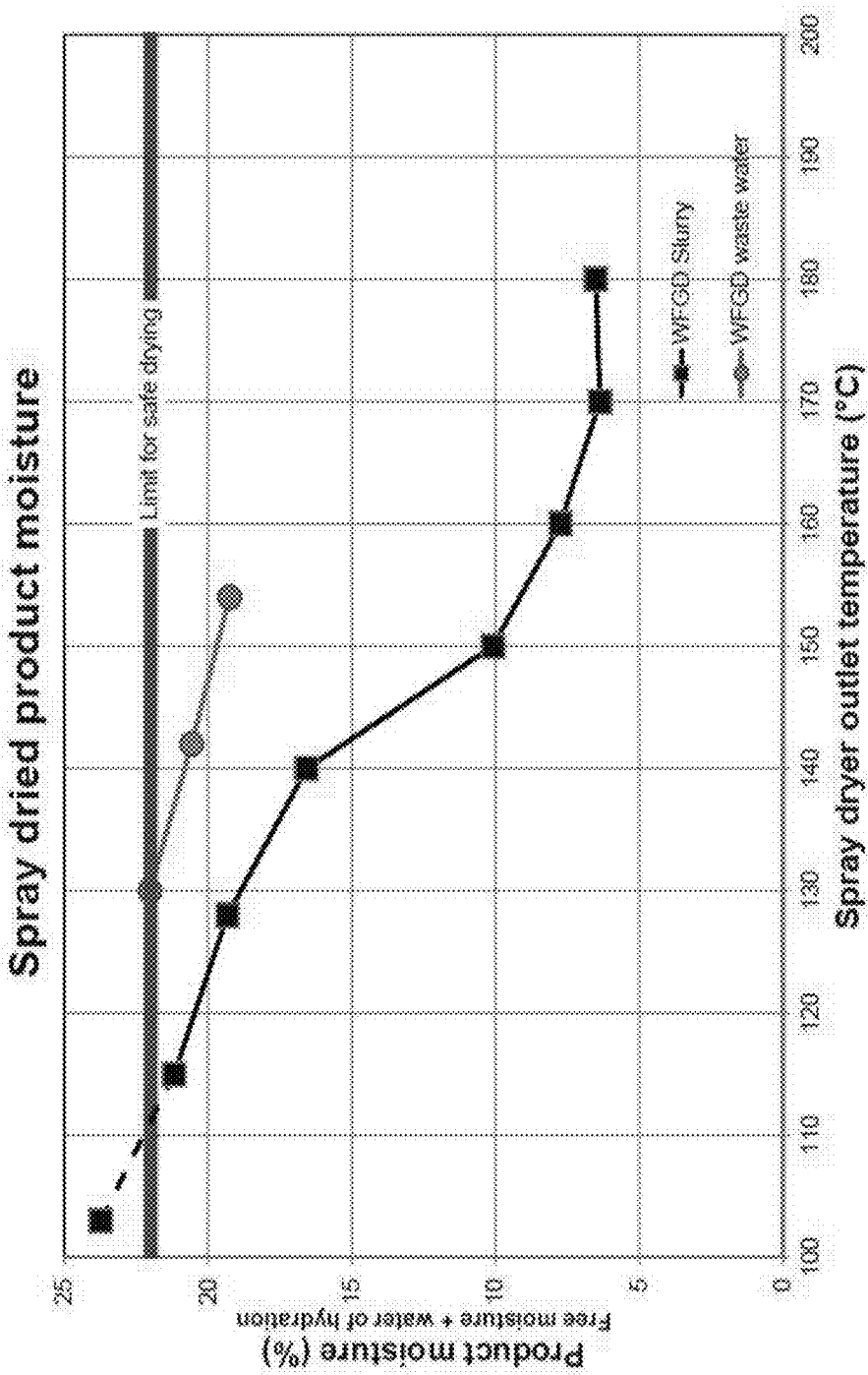
FIG. 15 is a graph illustrating spray dried product moisture (free moisture+water of hydration) as a function of the SDE outlet temperature for both the WFGD slurry and the WFGD wastewater.

Turning to FIGS. 13 through 15, FIGS. 13 through 15 represent data from various tests relating to the drying of various waste water streams. Specifically with regard to FIGS. 13A through 13C, these Figures are graphs illustrating test data from the drying of a single levitated droplet of WFGD slurry (FIG. 13A) and two different WFGD waste waters (FIGS. 13B and 13C), where the curves show that a droplet of WFGD slurry and of a certain size reaches a dry state within a shorter time compared to WFGD waste waters. The data of FIGS. 13A through 13C helps to illustrate that the presence of a certain solid matter content in the droplet leads to a dry state in less time. This is advantageous in that the drying device can be made smaller permitting both economic savings as well as various design advantages due to a reduction in the size of the spray dryer, or spray dry, device.

Turning to FIG. 14, this Figure is a graph illustrating product density as a function of solids content in the material being spray dried where the bulk density of the dried WFGD slurry is significantly higher than for the dried WFGD waste water. The higher density of the dried WFGD slurry is advantageous as it is beneficial for product handling, transportation and storage demand. Finally, with regard to FIG. 15, this Figure is a graph illustrating product moisture (free moisture+water of hydration) as function of the SDE outlet temperature where the moisture in the dried slurry is lower than in the dried waste water for a specific SDE outlet temperature. More important however is that the WFGD slurry can be dried at a lower SDE outlet temperature than the WFGD waste water, thereby increasing the evaporative capacity of the SDE.

Although the systems of FIGS. 1 through 12 are designed to reduce and/or eliminate liquid waste and/or a liquid waste stream from one of more WFGD devices and/or one or more other air quality control system devices (AQCS devices), some existing drying devices such as spray dryer evaporators, or spray dry evaporators, (SDEs) have several challenges that can be difficult and expensive to address. A non-limiting example of one such challenge when drying solids in a SDE is that the bulk density of the dried solids is very low. This in turn creates an additional difficulty to consider when designing a material handling system. An even more significant issue is that the dried salts are hygroscopic and become corrosive when they absorb water. The material handling system for the dried salts must also prevent the solids from coming into contact with air (due to the water vapor available). As such, the embodiments of FIGS. 16 through 27 address, at a minimum, these various issues that can occur in some applications where it is desirable to utilize an SDE as the drying device of in various systems of the present invention.

As such, the embodiments of FIG. 16 through 27 are designed to re-solvate the dried salts with a liquid stream to generate a high dissolved solids slurry stream that can be utilized to transport the previously dried salts to a device where such slurry stream can be processed into a form that is easy to dispose of. Given this, the embodiments of FIG. 16 through 27 are designed in such a manner that a portion of the total effluent stream from a WFGD that was previously being sent to the SDE is split off, or diverted, to act as a source of water to re-dissolve various dried salts that are produced in the liquid waste reducing and/or eliminating systems of the present invention.

Figure 16:
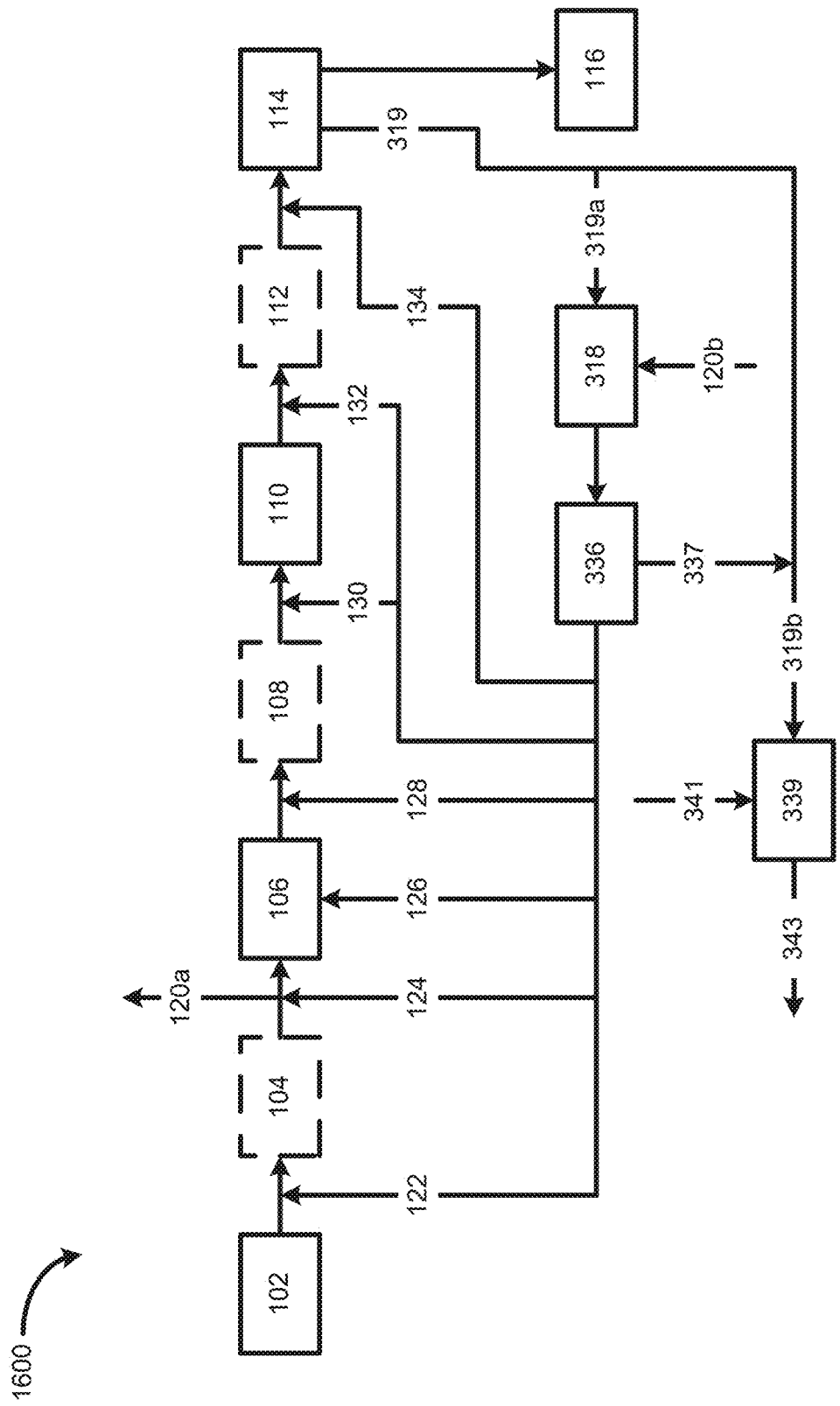
FIG. 16 is a schematic representation of a fuel burning facility which includes a system according to still another embodiment for practicing one method of the present invention.

Accordingly, turning to FIG. 16, FIG. 16 is an illustration of a system 1600 according to one embodiment of the present invention. System 1600 of FIG. 16 comprises a furnace/boiler 102. As noted above furnace/boiler 102 can be any of the types of furnace/boilers discussed above, or even furnace/boiler 202. It should be noted that although the embodiments of FIGS. 17 through 27 are described in connection with furnace/boiler 102, these embodiments are also applicable to a system where furnace/boiler 102 is replaced with furnace/boiler 202. Turning to furnace/boiler 102, furnace/boiler 102 is connected via any suitable conduit, duct or gas conveying passage to an air heater 106, represented by the horizontal arrows that connect furnace/boiler 102 to air heater 106. Regarding any of the conduits, ducts or gas conveying passages in system 1600, such structures are known to those of skill in the art and can, for example, be formed from any suitable material including but not limited to, metal, one or more metal alloys, or any combination thereof. In this instance furnace/boiler 102 is either an oxy-combustion device, utilizes a SNCR system, and/or does not require NO$_x$ control for whatever reason. Alternatively, where an SCR is desired such an SCR can be either: (i) a hot-side SCR 104 and be located between furnace/boiler 102 and air heater 106, and connected to each via a suitable set of conduits, ducts or gas conveying passages, which again represented by the horizontal arrows connecting components 102, 104 and 106; and (ii) a cold-side SCR 108 and be located between air heater 106 and particulate control device 110, and connected to each via a suitable set of conduits, ducts or gas conveying passages, which again represented by the horizontal arrows connecting components 106, 108 and 110. Regarding the particulate control devices useful in connection with the present invention as either a specifically called out particulate control device (e.g., device 110, device 112 and/or device 336) and/or any other particulate control device regardless of whether such particulate control device is specifically called out or generically mentioned (e.g., referred to as any one or more additional AQCS devices), such particulate control devices can be selected from any known device and/or system for removing particulate matter from a gas stream where such devices/systems include, but are not limited to, wet electrostatic precipitators (wet ESPs), dry electrostatic precipitators (dry ESPs), fabric filters (e.g., pulse jet fabric filters), etc. It should be noted that typically wet ESPs are not used upstream of WFGD units. As such, in one instance any particulate control devices of any of the embodiments of the present invention are not selected from any type of wet ESP should such one or more particulate control devices be located upstream of a WFGD unit. Again however, should such an arrangement either be, or at some later date become, desirable the embodiments of the present invention are meant to encompass any such non-traditional layouts/designs.

In one instance, particulate control device 110 is connected via a conduit, duct or gas conveying passage to a wet flue gas desulfurization (WFGD) unit 114, which is again represented by the horizontal arrow connecting components 110 to 114. In another instance, system 1600 can further comprise a secondary particulate control device 112 located between particulate control device 110 (for the purposes of any embodiment with multiple particulate control devices, device 110 will be referred to as the primary particulate control device for clarity sake) and WFGD unit 114, and connected to each via a suitable set of conduits, ducts or gas conveying passages, which again represented by the horizontal arrows connecting components 110, 112 and 114. WFGD unit 114 is then connected to any one or more further AQCS devices 116 and/or is connected to a stack 116 where the cleaned flue gases and/or combustion gases are transmitted to an environment external system 1600.

As is further illustrated by FIG. 16, WFGD unit 114 is designed to provide liquid waste and/or a liquid waste stream to a spray dryer evaporator, or spray dry evaporator, (SDE), 318. SDE 318 can be any suitable spray dryer evaporator or spray dry evaporators (SDE), or similar equipment. A portion of the flue gases and/or combustion gases generated by furnace/boiler 102 are utilized to supply heated gas to SDE 318. This is represented by the pair of arrows labeled 120a and 120b. Arrow 120a represents the desired portion of the flue gases and/or combustion gases that are drawn from the main conduit, duct or gas conveying passage and are conveyed via a conduit, duct or gas conveying passage (not shown) to SDE gas input represented by arrow 120b. While not wishing to be bound to any one embodiment, the portion of flue gases and/or combustion gases that are diverted to supply SDE 318 depends on a number of factors including, but not limited to, the size of furnace/boiler 102, the volumetric amount of flue gases and/or combustion gases generated by furnace/boiler 102, the flow rate of the flue gases and/or combustion gases generated by furnace/boiler 102, the size of SDE 318, and/or the amount, volume, and/or flow rate of the liquid waste and/or a liquid waste stream from WFGD 114. As such, one of skill in the art would recognize that there is no set amount for the portion of flue gases and/or combustion gases that are diverted to supply SDE 318. Accordingly, the present invention is not limited to any specific portion, amount and/or percentage of flue gases and/or combustion gases that are diverted from the main conduit, duct or gas conveying passage connecting furnace/boiler 102, or hot-side SCR 104, with air heater 106.

SDE 318 is designed to receive liquid waste and/or a liquid waste stream, via any suitable type of liquid waste supply line, pipe or conduit 319, from any desired portion of WFGD 114 including, but not limited to, the absorber recirculation tank (ART) or another device and/or output that itself is connected to the WFGD 114 including, but not limited to, a primary hydroclone overflow, a secondary hydroclone overflow, etc. and reduce and/or eliminate such liquid waste and/or a liquid waste stream by evaporating same in SDE 318. Suitable liquid waste supply lines, pipes or conduits include, but are not limited to, metal supply lines, pipes or conduits; metal alloy supply lines, pipes or conduits; plastic and/or polymer supply lines, pipes or conduits; or any other supply lines, pipes or conduits known in the art to be suitable for the transportation and/or conveyance of liquid waste and/or a liquid waste or effluent stream from a WFGD. As can be seen from FIG. 16, supply line 319 is split into two liquid waste portions and/or two liquid waste streams—a low suspended solids/high dissolved solids slurry stream 319a and a high suspended solids slurry stream 319b. In another embodiment, the high suspended solids slurry stream 319b is generated due to the addition of any particulate matter via supply line 337 (as will be explained in more detail below) and it is only after such addition in this embodiment that slurry stream 319b is a high suspended solids slurry stream in accordance with the numerical ranges discussed below. As such, in this additional embodiment, prior to this point the split in stream 319 yields two essentially similar liquid waste streams. Portion 319a is sent to SDE 318 to reduce and/or eliminate such liquid waste and/or liquid waste stream by evaporating same in SDE 318.

Once the flue gases and/or combustion gases diverted to SDE 318 are utilized to achieve any desired level of drying, evaporation, spray dryer (or spray dry) evaporation, absorption and/or spray dryer (or spray dry) absorption of the liquid waste and/or a liquid waste stream from WFGD 114, they leave SDE 318 and are reintroduced to the main conduits, ducts or gas conveying passages connecting various portions of system 1600 at one or more points as denoted by arrows 122, 124, 126, 128, 130, 132 and/or 134. As can be seen from the layout of system 1600 in FIG. 16, after the flue gases and/or combustion gases diverted to SDE 318 leave SDE 318 they can be subjected to a SDE particulate control device 336 designed to remove one or more particulate compounds or materials that result from the drying, evaporation, spray dryer (or spray dry) evaporation, absorption and/or spray dryer (or spray dry) absorption process accomplished by SDE 318. Particulate control device 336 can be selected from any known device and/or system for removing particulate matter from a gas stream where such devices/systems include, but are not limited to, wet electrostatic precipitators (wet ESPs), dry electrostatic precipitators (dry ESPs), fabric filters (e.g., pulse jet fabric filters), etc. As can be seen from FIG. 16, particulate control device 336 generates a particulate matter, or product, (e.g., fly ash or any other particulate matter) that is supplied via supply line, or conduit, 337 to the other portion 319b of the liquid waste and/or liquid waste stream, from any desired portion of WFGD 114, where these two products are combined to produce a high suspended solids content slurry that is then sent on to a mixing device (or solidification device— hereinafter referred to collectively as mixing device 339) 339. Mixing device 339 can be any suitable device that can take a high suspended solids content slurry waste stream and further concentrate such a steam to yield a stabilized clay-like, cementitious-like, or other solid-type material that can then either be utilized for some secondary purposes or earmarked for transportation to a waste disposal for disposal thereof. In one non-limiting embodiment, mixing device 339 is a pug mill (or pugmill), a mixing tank, cement mixer, static mixer, batch mixer, drum mixer paddle mixer, v-type mixers/blenders, nauta mixers, and any combinations of two or more, three or more, or even four or more thereof. Pug mills are machines in which various solid materials can be mixed into a plastic-like, clay-like, paste-like, or any flowable/extrudable state. A pug mill may be a fast continuous mixer that can achieve a thoroughly mixed, homogeneous mixture in a few seconds. In order to achieve the desired mixing of the high suspended solids content slurry waste stream so as to yield a solid-type material that can then either be utilized for some secondary purposes or earmarked for transportation to a waste disposal for disposal thereof, one or more additives are provided mixing device 339. Such one or more materials can include, but are not limited to, one or more of gypsum, fly ash, pozzolan (e.g., any compound that when sufficiently wetted will react chemically with calcium hydroxide at a desired temperature to form compounds possessing cementitious properties including but not limited to siliceous or siliceous and aluminous material), quicklime (i.e., CaO), calcium sulfite, slaked lime (i.e., CaOH), etc.

Regarding the amount of liquid waste and/or liquid waste stream 319 that is sent to SDE 318 via supply line 319a, this amount varies from about 7.5 percent by volume to about 95 percent by volume out of the total volume of liquid waste and/or liquid waste stream 319, with the remainder volume of between about 92.5 percent by volume to about 5 percent by volume of liquid waste and/or liquid waste stream 319 being sent to mixing device 339. In another embodiment, from about 10 percent by volume to about 92.5 percent by volume out of the total volume of liquid waste and/or liquid waste stream 319 is sent to SDE 318 via supply line 319a, from about 12.5 percent by volume to about 90 percent by volume out of the total volume of liquid waste and/or liquid waste stream 319 is sent to SDE 318 via supply line 319a, from about 15 percent by volume to about 87.5 percent by volume out of the total volume of liquid waste and/or liquid waste stream 319 is sent to SDE 318 via supply line 319a, from about 17.5 percent by volume to about 85 percent by volume out of the total volume of liquid waste and/or liquid waste stream 319 is sent to SDE 318 via supply line 319a, from about 20 percent by volume to about 82.5 percent by volume out of the total volume of liquid waste and/or liquid waste stream 319 is sent to SDE 318 via supply line 319a, from about 22.5 percent by volume to about 80 percent by volume out of the total volume of liquid waste and/or liquid waste stream 319 is sent to SDE 318 via supply line 319a, from about 25 percent by volume to about 77.5 percent by volume out of the total volume of liquid waste and/or liquid waste stream 319 is sent to SDE 318 via supply line 319a, from about 27.5 percent by volume to about 75 percent by volume out of the total volume of liquid waste and/or liquid waste stream 319 is sent to SDE 318 via supply line 319a, from about 30 percent by volume to about 72.5 percent by volume out of the total volume of liquid waste and/or liquid waste stream 319 is sent to SDE 318 via supply line 319a, from about 32.5 percent by volume to about 70 percent by volume out of the total volume of liquid waste and/or liquid waste stream 319 is sent to SDE 318 via supply line 319a, from about 35 percent by volume to about 67.5 percent by volume out of the total volume of liquid waste and/or liquid waste stream 319 is sent to SDE 318 via supply line 319a, from about 37.5 percent by volume to about 65 percent by volume out of the total volume of liquid waste and/or liquid waste stream 319 is sent to SDE 318 via supply line 319a, from about 40 percent by volume to about 62.5 percent by volume out of the total volume of liquid waste and/or liquid waste stream 319 is sent to SDE 318 via supply line 319a, from about 42.5 percent by volume to about 60 percent by volume out of the total volume of liquid waste and/or liquid waste stream 319 is sent to SDE 318 via supply line 319a, from about 45 percent by volume to about 57.5 percent by volume out of the total volume of liquid waste and/or liquid waste stream 319 is sent to SDE 318 via supply line 319a, from about 47.5 percent by volume to about 55 percent by volume out of the total volume of liquid waste and/or liquid waste stream 319 is sent to SDE 318 via supply line 319a, or even from about 50 percent by volume to about 52.5 percent by volume out of the total volume of liquid waste and/or liquid waste stream 319 is sent to SDE 318 via supply line 319a. Here, as well as elsewhere in the specification and claims, individual numerical values can be combined to form additional and/or non-disclosed ranges.

Regarding the amount of liquid waste and/or liquid waste stream 319 that is sent to mixing device 339 via supply line 319b, this amount varies from about 5 percent by volume to about 92.5 percent by volume out of the total volume of liquid waste and/or liquid waste stream 319, from about 7.5 percent by volume to about 90 percent by volume out of the total volume of liquid waste and/or liquid waste stream 319 is sent to mixing device 339 via supply line 319b, from about 10 percent by volume to about 87.5 percent by volume out of the total volume of liquid waste and/or liquid waste stream 319 is sent to mixing device 339 via supply line 319b, from about 12.5 percent by volume to about 85 percent by volume out of the total volume of liquid waste and/or liquid waste stream 319 is sent to mixing device 339 via supply line 319b, from about 15 percent by volume to about 82.5 percent by volume out of the total volume of liquid waste and/or liquid waste stream 319 is sent to mixing device 339 via supply line 319b, from about 17.5 percent by volume to about 80 percent by volume out of the total volume of liquid waste and/or liquid waste stream 319 is sent to mixing device 339 via supply line 319b, from about 20 percent by volume to about 77.5 percent by volume out of the total volume of liquid waste and/or liquid waste stream 319 is sent to mixing device 339 via supply line 319b, from about 22.5 percent by volume to about 75 percent by volume out of the total volume of liquid waste and/or liquid waste stream 319 is sent to mixing device 339 via supply line 319b, from about 25 percent by volume to about 72.5 percent by volume out of the total volume of liquid waste and/or liquid waste stream 319 is sent to mixing device 339 via supply line 319b, from about 27.5 percent by volume to about 70 percent by volume out of the total volume of liquid waste and/or liquid waste stream 319 is sent to mixing device 339 via supply line 319*b*, from about 30 percent by volume to about 67.5 percent by volume out of the total volume of liquid waste and/or liquid waste stream 319 is sent to mixing device 339 via supply line 319*b*, from about 32.5 percent by volume to about 65 percent by volume out of the total volume of liquid waste and/or liquid waste stream 319 is sent to mixing device 339 via supply line 319*b*, from about 35 percent by volume to about 67.5 percent by volume out of the total volume of liquid waste and/or liquid waste stream 319 is sent to mixing device 339 via supply line 319*b*, from about 37.5 percent by volume to about 65 percent by volume out of the total volume of liquid waste and/or liquid waste stream 319 is sent to mixing device 339 via supply line 319*b*, from about 40 percent by volume to about 62.5 percent by volume out of the total volume of liquid waste and/or liquid waste stream 319 is sent to mixing device 339 via supply line 319*b*, from about 42.5 percent by volume to about 60 percent by volume out of the total volume of liquid waste and/or liquid waste stream 319 is sent to mixing device 339 via supply line 319*b*, from about 45 percent by volume to about 57.5 percent by volume out of the total volume of liquid waste and/or liquid waste stream 319 is sent to mixing device 339 via supply line 319*b*, from about 47.5 percent by volume to about 55 percent by volume out of the total volume of liquid waste and/or liquid waste stream 319 is sent to mixing device 339 via supply line 319*b*, or even from about 50 percent by volume to about 52.5 percent by volume out of the total volume of liquid waste and/or liquid waste stream 319 is sent to mixing device 339 via supply line 319*b*. Here, as well as elsewhere in the specification and claims, individual numerical values can be combined to form additional and/or non-disclosed ranges.

In another embodiment, the amount of liquid waste and/or liquid waste stream 319 that is sent to SDE 318 via supply line 319*a* varies from about 7.5 percent by weight to about 95 percent by weight out of the total weight of liquid waste and/or liquid waste stream 319, from about 10 percent by weight to about 92.5 percent by weight out of the total weight of liquid waste and/or liquid waste stream 319 is sent to SDE 318 via supply line 319*a*, from about 12.5 percent by weight to about 90 percent by weight out of the total weight of liquid waste and/or liquid waste stream 319 is sent to SDE 318 via supply line 319*a*, from about 15 percent by weight to about 87.5 percent by weight out of the total weight of liquid waste and/or liquid waste stream 319 is sent to SDE 318 via supply line 319*a*, from about 17.5 percent by weight to about 85 percent by weight out of the total weight of liquid waste and/or liquid waste stream 319 is sent to SDE 318 via supply line 319*a*, from about 20 percent by weight to about 82.5 percent by weight out of the total weight of liquid waste and/or liquid waste stream 319 is sent to SDE 318 via supply line 319*a*, from about 22.5 percent by weight to about 80 percent by weight out of the total weight of liquid waste and/or liquid waste stream 319 is sent to SDE 318 via supply line 319*a*, from about 25 percent by weight to about 77.5 percent by weight out of the total weight of liquid waste and/or liquid waste stream 319 is sent to SDE 318 via supply line 319*a*, from about 27.5 percent by weight to about 75 percent by weight out of the total weight of liquid waste and/or liquid waste stream 319 is sent to SDE 318 via supply line 319*a*, from about 30 percent by weight to about 72.5 percent by weight out of the total weight of liquid waste and/or liquid waste stream 319 is sent to SDE 318 via supply line 319*a*, from about 32.5 percent by weight to about 70 percent by weight out of the total weight of liquid waste and/or liquid waste stream 319 is sent to SDE 318 via supply line 319*a*, from about 35 percent by weight to about 67.5 percent by weight out of the total weight of liquid waste and/or liquid waste stream 319 is sent to SDE 318 via supply line 319*a*, from about 37.5 percent by weight to about 65 percent by weight out of the total weight of liquid waste and/or liquid waste stream 319 is sent to SDE 318 via supply line 319*a*, from about 40 percent by weight to about 62.5 percent by weight out of the total weight of liquid waste and/or liquid waste stream 319 is sent to SDE 318 via supply line 319*a*, from about 42.5 percent by weight to about 60 percent by weight out of the total weight of liquid waste and/or liquid waste stream 319 is sent to SDE 318 via supply line 319*a*, from about 45 percent by weight to about 57.5 percent by weight out of the total weight of liquid waste and/or liquid waste stream 319 is sent to SDE 318 via supply line 319*a*, from about 47.5 percent by weight to about 55 percent by weight out of the total weight of liquid waste and/or liquid waste stream 319 is sent to SDE 318 via supply line 319*a*, or even from about 50 percent by weight to about 52.5 percent by weight out of the total weight of liquid waste and/or liquid waste stream 319 is sent to SDE 318 via supply line 319*a*. Here, as well as elsewhere in the specification and claims, individual numerical values can be combined to form additional and/or non-disclosed ranges.

In another embodiment, the amount of liquid waste and/or liquid waste stream 319 that is sent to mixing device 339 via supply line 319*b* varies from about 5 percent by weight to about 92.5 percent by weight out of the total weight of liquid waste and/or liquid waste stream 319, from about 7.5 percent by weight to about 90 percent by weight out of the total weight of liquid waste and/or liquid waste stream 319 is sent to mixing device 339 via supply line 319*b*, from about 10 percent by weight to about 87.5 percent by weight out of the total weight of liquid waste and/or liquid waste stream 319 is sent to mixing device 339 via supply line 319*b*, from about 12.5 percent by weight to about 85 percent by weight out of the total weight of liquid waste and/or liquid waste stream 319 is sent to mixing device 339 via supply line 319*b*, from about 15 percent by weight to about 82.5 percent by weight out of the total weight of liquid waste and/or liquid waste stream 319 is sent to mixing device 339 via supply line 319*b*, from about 17.5 percent by weight to about 80 percent by weight out of the total weight of liquid waste and/or liquid waste stream 319 is sent to mixing device 339 via supply line 319*b*, from about 20 percent by weight to about 77.5 percent by weight out of the total weight of liquid waste and/or liquid waste stream 319 is sent to mixing device 339 via supply line 319*b*, from about 22.5 percent by weight to about 75 percent by weight out of the total weight of liquid waste and/or liquid waste stream 319 is sent to mixing device 339 via supply line 319*b*, from about 25 percent by weight to about 72.5 percent by weight out of the total weight of liquid waste and/or liquid waste stream 319 is sent to mixing device 339 via supply line 319*b*, from about 27.5 percent by weight to about 70 percent by weight out of the total weight of liquid waste and/or liquid waste stream 319 is sent to mixing device 339 via supply line 319*b*, from about 30 percent by weight to about 67.5 percent by weight out of the total weight of liquid waste and/or liquid waste stream 319 is sent to mixing device 339 via supply line 319*b*, from about 32.5 percent by weight to about 65 percent by weight out of the total weight of liquid waste and/or liquid waste stream 319 is sent to mixing device 339 via supply line 319*b*, from about 35 percent by weight to about 67.5 percent by weight out of the total weight of liquid waste and/or liquid waste stream 319 is sent to mixing device 339 via supply line 319*b*, from about 37.5 percent by weight to about 65 percent by weight out of the total weight of liquid waste and/or liquid waste stream 319 is sent to mixing device 339 via supply line 319b, from about 40 percent by weight to about 62.5 percent by weight out of the total weight of liquid waste and/or liquid waste stream 319 is sent to mixing device 339 via supply line 319b, from about 42.5 percent by weight to about 60 percent by weight out of the total weight of liquid waste and/or liquid waste stream 319 is sent to mixing device 339 via supply line 319b, from about 45 percent by weight to about 57.5 percent by weight out of the total weight of liquid waste and/or liquid waste stream 319 is sent to mixing device 339 via supply line 319b, from about 47.5 percent by weight to about 55 percent by weight out of the total weight of liquid waste and/or liquid waste stream 319 is sent to mixing device 339 via supply line 319b, or even from about 50 percent by weight to about 52.5 percent by weight out of the total weight of liquid waste and/or liquid waste stream 319 is sent to mixing device 339 via supply line 319b. Here, as well as elsewhere in the specification and claims, individual numerical values can be combined to form additional and/or non-disclosed ranges.

Accordingly, as can be seen from FIG. 16, the operation of system 1600 of the present invention permits the control, reduction and/or mitigation of any amount of liquid waste material drawn from any desired portion of WFGD unit 114 including, but not limited to, the absorber recirculation tank (ART) thereof. In one case the liquid waste and/or liquid waste stream that is drawn from WFGD 114 via supply line 319 has a total suspended solids content, prior to being split into low suspended solids slurry stream via supply line 319a and high suspended solids slurry stream via supply line 319b, of between about 0.01 percent by weight and about 60 percent by weight, or between about 0.05 percent by weight and about 57.5 percent by weight, or between about 0.1 percent by weight and about 55 percent by weight, or between about 0.5 percent by weight and about 52.5 percent by weight, or between about 1 percent by weight and about 50 percent by weight, or between about 2.5 percent by weight and about 47.5 percent by weight, or between about 5 percent by weight and about 45 percent by weight, or between about 7.5 percent by weight and about 42.5 percent by weight, or between about 10 percent by weight and about 40 percent by weight, or between about 12.5 percent by weight and about 37.5 percent by weight, or between about 15 percent by weight and about 35 percent by weight, or between about 17.5 percent by weight and about 32.5 percent by weight, or between about 20 percent by weight and about 30 percent by weight, or between about 22.5 percent by weight and about 27.5 percent by weight, or even about 25 percent by weight. Here, as well as elsewhere in the specification and claims, individual numerical values can be combined to form additional and/or non-disclosed ranges.

In one embodiment, the low suspended solids slurry stream 319a has a total suspended solids content of between 0 percent by weight and about 10 percent by weight, or between about 0.5 percent by weight and about 9.5 percent by weight, or between about 1 percent by weight and about 9 percent by weight, or between about 1.5 percent by weight and about 8.5 percent by weight, or between about 2 percent by weight and about 8 percent by weight, or between about 2.5 percent by weight and about 7.5 percent by weight, or between about 3 percent by weight and about 7 percent by weight, or between about 3.5 percent by weight and about 6.5 percent by weight, or between about 4 percent by weight and about 6 percent by weight, or between about 4.5 percent by weight and about 5.5 percent by weight, or even about 5 percent by weight. Here, as well as elsewhere in the specification and claims, individual numerical values can be combined to form additional and/or non-disclosed ranges.

In one embodiment, the high suspended solids slurry stream 319b has a total suspended solids content of between about 10 percent by weight and about 60 percent by weight, or between about 12.5 percent by weight and about 57.5 percent by weight, or between about 15 percent by weight and about 55 percent by weight, or between about 17.5 percent by weight and about 52.5 percent by weight, or between about 20 percent by weight and about 50 percent by weight, or between about 22.5 percent by weight and about 47.5 percent by weight, or between about 25 percent by weight and about 45 percent by weight, or between about 27.5 percent by weight and about 42.5 percent by weight, or between about 30 percent by weight and about 40 percent by weight, or between about 32.5 percent by weight and about 37.5 percent by weight, or even about 35 percent by weight. Here, as well as elsewhere in the specification and claims, individual numerical values can be combined to form additional and/or non-disclosed ranges.

In one embodiment, the total dissolved solids content of the high dissolved solids slurry stream via supply line 319a is in the range of between about 2,500 ppm (or about 0.25 percent by weight) and about 250,000 ppm (or about 25 percent by weight). In another case the liquid waste and/or liquid waste stream that is drawn from WFGD 114 and supplied to SDE 318 for control, reduction and/or mitigation has a total dissolved solids content of between about 3,000 ppm (or about 0.3 percent by weight) and about 240,000 ppm (or about 24 percent by weight), or between about 4,000 ppm (or about 0.4 percent by weight) and about 230,000 ppm (or about 23 percent by weight), or between about 5,000 ppm (or about 0.5 percent by weight) and about 220,000 ppm (or about 22 percent by weight), or between about 7,500 ppm (or about 0.75 percent by weight) and about 210,000 ppm (or about 21 percent by weight), or between about 10,000 ppm (or about 1 percent by weight) and about 200,000 ppm (or about 20 percent by weight), or between about 12,500 ppm (or about 1.25 percent by weight) and about 190,000 ppm (or about 19 percent by weight), or between about 15,000 ppm (or about 1.5 percent by weight) and about 180,000 ppm (or about 18 percent by weight), or between about 20,000 ppm (or about 2 percent by weight) and about 175,000 ppm (or about 17.5 percent by weight), or between about 25,000 ppm (or about 2.5 percent by weight) and about 170,000 ppm (or about 17 percent by weight), or between about 30,000 ppm (or about 3 percent by weight) and about 160,000 ppm (or about 16 percent by weight), or between about 40,000 ppm (or about 4 percent by weight) and about 150,000 ppm (or about 15 percent by weight), or between about 50,000 ppm (or about 5 percent by weight) and about 140,000 ppm (or about 14 percent by weight), or between about 60,000 ppm (or about 6 percent by weight) and about 130,000 ppm (or about 13 percent by weight), or between about 70,000 ppm (or about 7 percent by weight) and about 120,000 ppm (or about 12 percent by weight), or between about 80,000 ppm (or about 8 percent by weight) and about 110,000 ppm (or about 11 percent by weight), or between about 90,000 ppm (or about 9 percent by weight) and about 100,000 ppm (or about 10 percent by weight), or even about 95,000 ppm (or about 9.5 percent by weight). Again, it should be noted that with regard to another embodiment of the present invention all of the total suspended solids and/or all of the dissolved solids in the liquid waste and/or liquid waste stream that is/are supplied to SDE 318 for control, reduction and/or mitigation does/do not necessarily come directly from WFGD unit 114, rather any portion thereof can come indirectly from another device that is operatively connected to the WFGD unit 114 including, but not limited to, a hydroclone and/or some other type of gypsum concentrating device, these two liquid wastes and/or two liquid waste streams can then be combined to yield a liquid waste and/or liquid waste stream that is supplied to SDE 318 having a total suspended solids content within any of the ranges stated above. Here, as well as elsewhere in the specification and claims, individual numerical values can be combined to form additional and/or non-disclosed ranges. Additionally, individual numerical values and/or individual ranges from one set of nested ranges can be combined with individual numerical values and/or individual ranges from the other set of nested ranges to form additional and/or non-disclosed combinations of numerical values and/or ranges.

It should be noted that in one embodiment the total dissolved solids content of the high suspended solids slurry stream via supply line 319b is no different than that of the slurry stream supplied to SDE 318 via supply line 319a. This is because supply line 319b is designed to supply a high suspended solids stream but that does not mean that the dissolved material in the "liquid" portion of the slurry stream of supply line 319b has been treated to reduce the overall content of the dissolved solids contained therein. In another embodiment, the amount of total dissolved solids in the slurry stream of supply line 319b is different than that of the slurry stream of supply line 319a.

In one embodiment, the total dissolved solids content of the high suspended solids slurry stream via supply line 319b is in the range of between about 2,500 ppm (or about 0.25 percent by weight) and about 250,000 ppm (or about 25 percent by weight). In another case the liquid waste and/or liquid waste stream that is drawn from WFGD 114 and supplied to SDE 318 for control, reduction and/or mitigation has a total dissolved solids content of between about 3,000 ppm (or about 0.3 percent by weight) and about 240,000 ppm (or about 24 percent by weight), or between about 4,000 ppm (or about 0.4 percent by weight) and about 230,000 ppm (or about 23 percent by weight), or between about 5,000 ppm (or about 0.5 percent by weight) and about 220,000 ppm (or about 22 percent by weight), or between about 7,500 ppm (or about 0.75 percent by weight) and about 210,000 ppm (or about 21 percent by weight), or between about 10,000 ppm (or about 1 percent by weight) and about 200,000 ppm (or about 20 percent by weight), or between about 12,500 ppm (or about 1.25 percent by weight) and about 190,000 ppm (or about 19 percent by weight), or between about 15,000 ppm (or about 1.5 percent by weight) and about 180,000 ppm (or about 18 percent by weight), or between about 20,000 ppm (or about 2 percent by weight) and about 175,000 ppm (or about 17.5 percent by weight), or between about 25,000 ppm (or about 2.5 percent by weight) and about 170,000 ppm (or about 17 percent by weight), or between about 30,000 ppm (or about 3 percent by weight) and about 160,000 ppm (or about 16 percent by weight), or between about 40,000 ppm (or about 4 percent by weight) and about 150,000 ppm (or about 15 percent by weight), or between about 50,000 ppm (or about 5 percent by weight) and about 140,000 ppm (or about 14 percent by weight), or between about 60,000 ppm (or about 6 percent by weight) and about 130,000 ppm (or about 13 percent by weight), or between about 70,000 ppm (or about 7 percent by weight) and about 120,000 ppm (or about 12 percent by weight), or between about 80,000 ppm (or about 8 percent by weight) and about 110,000 ppm (or about 11 percent by weight), or between about 90,000 ppm (or about 9 percent by weight) and about 100,000 ppm (or about 10 percent by weight), or even about 95,000 ppm (or about 9.5 percent by weight). Again, it should be noted that with regard to another embodiment of the present invention all of the total suspended solids and/or all of the dissolved solids in the liquid waste and/or liquid waste stream that is/are supplied to SDE 318 for control, reduction and/or mitigation does/do not necessarily come directly from WFGD unit 114, rather any portion thereof can come indirectly from another device that is operatively connected to the WFGD unit 114 including, but not limited to, a hydroclone and/or some other type of gypsum concentrating device, these two liquid wastes and/or two liquid waste streams can then be combined to yield a liquid waste and/or liquid waste stream that is supplied to SDE 318 having a total suspended solids content within any of the ranges stated above. Here, as well as elsewhere in the specification and claims, individual numerical values can be combined to form additional and/or non-disclosed ranges. Additionally, individual numerical values and/or individual ranges from one set of nested ranges can be combined with individual numerical values and/or individual ranges from the other set of nested ranges to form additional and/or non-disclosed combinations of numerical values and/or ranges.

Regarding portion 319b from liquid waste supply line, pipe or conduit 319, portion 319b is combined with any portion, or all of, the particulate matter that is collected by particulate control device 336 and supplied to mixing device 339. In one embodiment, the amount of particulate matter that is collected by particulate control device 336 that is supplied to mixing device 339 is between about 1 percent by weight to 100 percent by weight of the total particulate matter that is collected by particulate control device 336. In another embodiment, the amount of particulate matter that is collected by particulate control device 336 that is supplied to mixing device 339 is between about 2.5 percent by weight to about 99 percent by weight of the total particulate matter that is collected by particulate control device 336, or about 5 percent by weight to about 97.5 percent by weight of the total particulate matter that is collected by particulate control device 336, about 7.5 percent by weight to about 95 percent by weight of the total particulate matter that is collected by particulate control device 336, about 10 percent by weight to about 92.5 percent by weight of the total particulate matter that is collected by particulate control device 336, about 12.5 percent by weight to about 90 percent by weight of the total particulate matter that is collected by particulate control device 336, about 15 percent by weight to about 87.5 percent by weight of the total particulate matter that is collected by particulate control device 336, about 17.5 percent by weight to about 85 percent by weight of the total particulate matter that is collected by particulate control device 336, about 20 percent by weight to about 80 percent by weight of the total particulate matter that is collected by particulate control device 336, about 22.5 percent by weight to about 77.5 percent by weight of the total particulate matter that is collected by particulate control device 336, about 25 percent by weight to about 75 percent by weight of the total particulate matter that is collected by particulate control device 336, about 27.5 percent by weight to about 72.5 percent by weight of the total particulate matter that is collected by particulate control device 336, about 30 percent by weight to about 70 percent by weight of the total particulate matter that is collected by particulate control device 336, about 32.5 percent by weight to about 67.5 percent by weight of the total particulate matter that is collected by particulate control device 336, about 35 percent by weight to about 65 percent by weight of the total particulate matter that is collected by particulate control device 336, about 37.5 percent by weight to about 62.5 percent by weight of the total particulate matter that is collected by particulate control device 336, about 40 percent by weight to about 60 percent by weight of the total particulate matter that is collected by particulate control device 336, about 42.5 percent by weight to about 57.5 percent by weight of the total particulate matter that is collected by particulate control device 336, about 45 percent by weight to about 55 percent by weight of the total particulate matter that is collected by particulate control device 336, about 47.5 percent by weight to about 52.5 percent by weight of the total particulate matter that is collected by particulate control device 336, or even about 50 percent by weight of the total particulate matter that is collected by particulate control device 336. Here, as well as elsewhere in the specification and claims, individual numerical values can be combined to form additional and/or non-disclosed ranges.

In addition to the combination of slurry and particulate matter that is supplied to mixing device 339 in another embodiment a variety of optional additives or compounds can be supplied to mixing device 339 including, but not limited to, gypsum, quicklime (i.e., CaO), lime, cement kiln dust, lime kiln dust, fly ash, one or more phyllosilicates (be they modified such as amended silicates or unmodified), or combinations of two or more thereof via one or more additive injection devices (denoted by vertical arrow 341, the nature of which are discussed above) for injecting the above one or more optional additives into mixing device 339.

Once high suspended solids slurry stream 319*b* and the particulate matter that is collected by particulate control device 336 and supplied to stream 319*b* via supply line 337 are combined this combination is supplied to mixing device 339 along with any optional additives added and/or injected to mixing device 339 via input 341 are processed in mixing device 339 to produce a stable waste product. This so produced stable waste product can then be disposed of in a more convenient and/or economical manner by sending it to an appropriate landfill or other disposal site.

In another embodiment, the amount of WFGD effluent bypassing the SDE via slurry stream 319*b* is controlled based on one or more of SDE operation, WFGD operation, and/or boiler operation. Exemplary control parameters include, but are not limited to, SDE outlet temperature, SDE spray chamber thermocouple temperatures, boiler secondary air temperature, boiler primary air temperature, WFGD chloride purge rate, and/or boiler load. This embodiment permits the plant to operate an SDE using about 10 percent by weight to about 95 percent by weight, or alternatively about 10 percent by volume to about 95 percent by volume, of the WFGD effluent allowing one to modify operation of system 1600 based on varying plant economics.

While not wishing to be bound to any one advantage, or set of advantages, system 1600 of the present invention permits the formation a stable, non-hygroscopic solid end product via mixing device 339 which, as noted above, can be more easily disposed of. Another advantage is that system 1600 permits the improved handling of the dried salts by conveying them in slurry form instead of as hygroscopic dried solids with a low bulk density. Another non-limiting advantage of system 1600 is that the energy requirement necessary to "run" SDE 318 is reduced. Still another non-limiting advantage of system 1600 is reduced operating costs versus previously implemented systems for dealing with WFGD waste water. Still another non-limiting advantage of system 1600 is that system 1600 provides a system that can still meet waste water reduction goals and/or zero liquid discharge goals even if SDE 318 needs to be shut down for maintenance. Still another non-limiting advantage of system 1600 is that system 1600 permits one or more operators thereof the ability to control the load of SDE 318 which in turn affects boiler operation.

In one instance, system 1600 of the present invention permits the control, reduction and/or mitigation of 100 percent of the liquid waste generated by a WFGD unit in a fossil fuel, or fuel, combustion system that does not utilize the SDE process of this embodiment of the present invention. In another embodiment, system 1600 of the present invention permits the control, reduction and/or mitigation of about 95 percent by volume or less, about 90 percent by volume or less, about 85 percent by volume or less, about 80 percent by volume or less, about 75 percent by volume or less, about 70 percent by volume or less, about 65 percent by volume or less, about 60 percent by volume or less, about 55 percent by volume or less, about 50 percent by volume or less, about 45 percent by volume or less, about 40 percent by volume or less, about 35 percent by volume or less, about 30 percent by volume or less, about 25 percent by volume or less, about 20 percent by volume or less, about 15 percent by volume or less, about 10 percent by volume or less, about 7.5 percent by volume or less, about 5 percent by volume or less, about 2.5 percent by volume or less, about 1 percent by volume or less, or even 0.5 percent by volume or less of the liquid waste generated by a WFGD unit in a fossil fuel, or fuel, combustion system. Here, as well as elsewhere in the specification and claims, individual numerical values can be combined to form additional and/or non-disclosed ranges.

It should be noted that with regard to the various embodiments of FIGS. 17 through 27 that will be described below, the various alternatives, numerical ranges, additives and/or non-limiting advantages discussed in connection with FIG. 16 apply equally to these additional embodiments.

Figure 17:
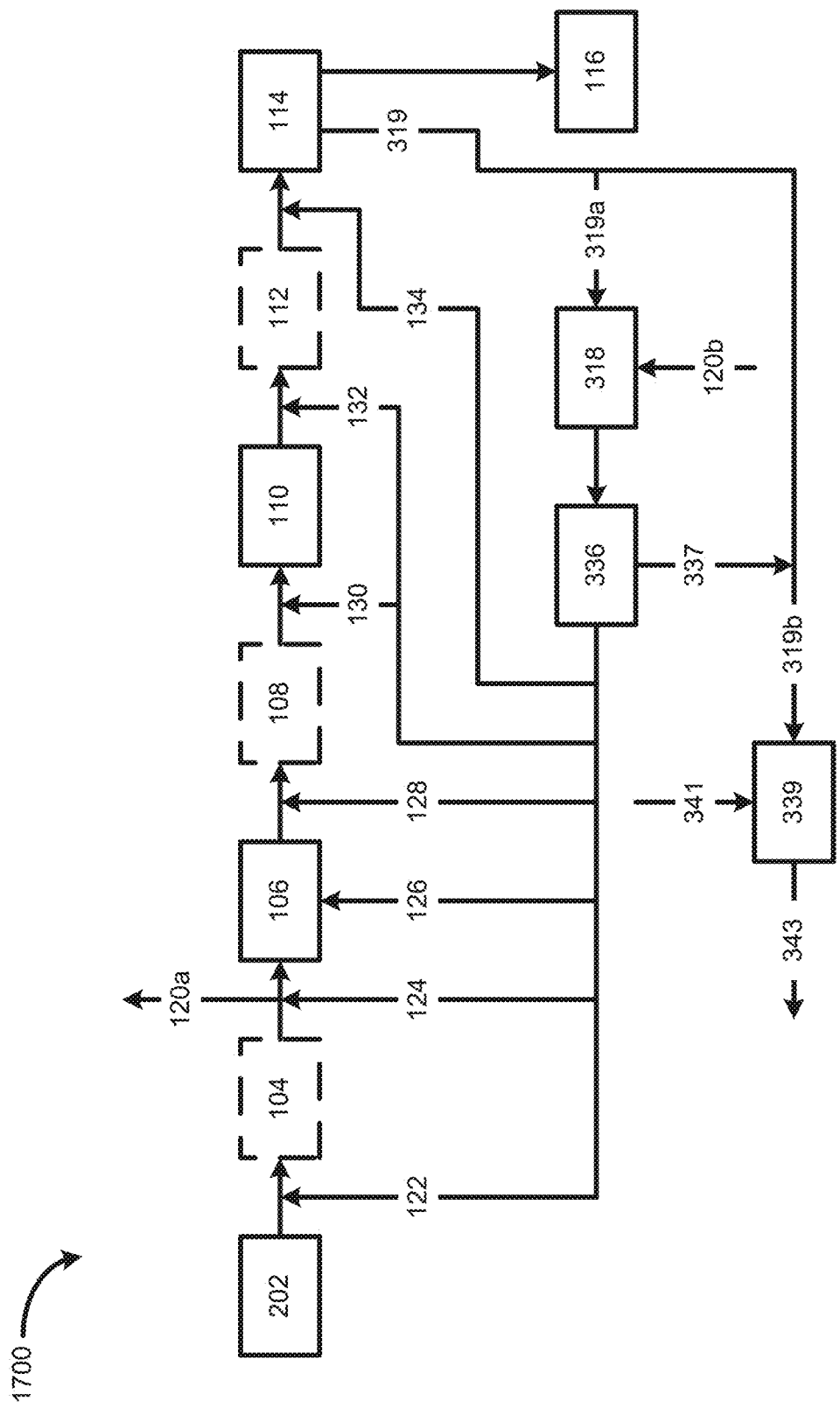
FIG. 17 is a schematic representation of a fuel burning facility which includes a system according to still another embodiment for practicing one method of the present invention.

Turning to FIG. 17, FIG. 17 illustrates a system 1700 according to another embodiment of the present invention. System 1700 differs from system 1600 of FIG. 16 in that furnace/boiler 102 of system 1600 is replaced by a furnace/boiler 202 that is selected from one of an oxy-fuel combustion (i.e., oxy-combustion) furnace and/or boiler, a variable temperature furnace and/or boiler, and/or a furnace and/or boiler with an economizer by-pass. Regarding the remainder of system 1700, the remainder thereof is identical in nature to that discussed above with regard to system 1600 as denoted by the fact that identical reference numerals are utilized to denote the various remaining portions of system 1700. It should be noted that although the embodiments of FIGS. 18 through 27 are described in connection with furnace/boiler 102, these embodiments are also applicable to a system where furnace/boiler 102 is replaced with furnace/boiler 202. Furthermore, from this point forward, identical reference numerals refer to identical parts in the remaining embodiments of FIGS. 18 through 27.

Figure 18:
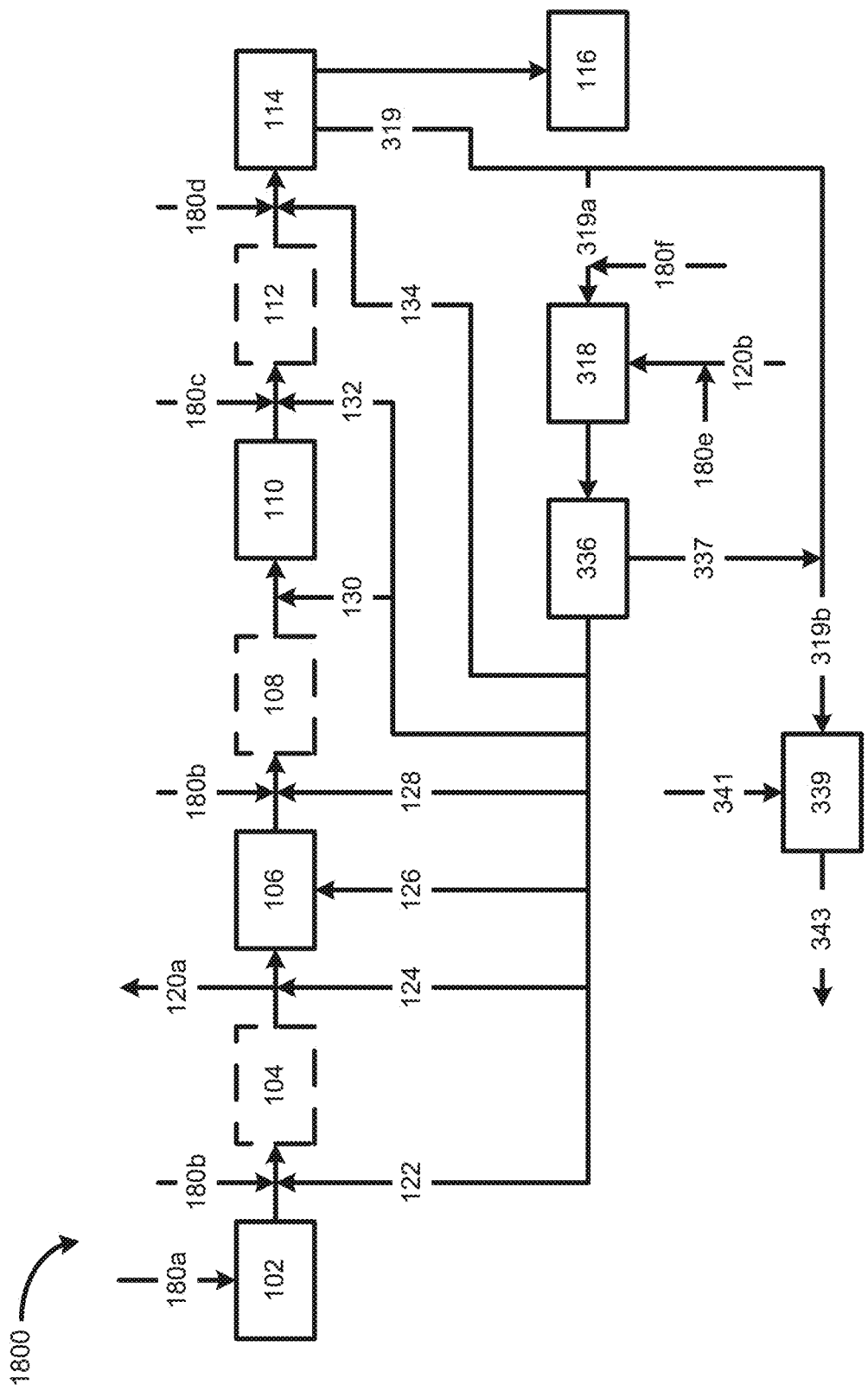
FIG. 18 is a schematic representation of a fuel burning facility which includes a system according to still another embodiment for practicing one method of the present invention.

Turning to FIG. 18, FIG. 18 illustrates a system 1800 according to yet another embodiment of the present invention. System 1800 differs from system 1600 of FIG. 16 in that it further includes one or more additive injection devices (denoted by vertical arrows 180*a*, 180*b*, 180*c*, 180*d* and/or 180*e*) for injecting one or more additives into one or more of furnace/boiler 102 as represented by arrow 180*a*; downstream of furnace/boiler 102 and either upstream of air heater 106, or optional hot-side SCR 104, as represented by arrow 180*b* or if optional hot-side SCR 104 is not present but optional cold-side SCR 108 is, upstream of optional cold-side SCR 108 also represented by arrow 180*b*; between particulate control device 110 and WFGD 114 as represented by arrow 180*c* when optional secondary particulate control device 112 is not present; between particulate control device 110 and optional secondary particulate control device 112 as represented by arrow 180*c*; between optional secondary particulate control device 112 and WFGD 114 as represented by arrow 180*d*; and/or into the portion of the flue gases and/or combustion gases generated by furnace/boiler 102 that are utilized to supply heated gas to SDE 318 as represented by arrow 180*e*. As would be apparent to those of skill in the art, if secondary particulate control device 112 is not present in system 1800 then the one or more additive injection devices denoted by arrow 180*d* will also not be present. The devices utilized to inject the one or more additives discussed herein can be any suitable device known to those of skill in the art for injecting dry matter, liquid matter, or particulate matter be the particulate matter dry, wet, or in the form of a liquid suspension. As such, a detailed discussion of such injection devices is omitted for the sake of brevity.

Figure 26:
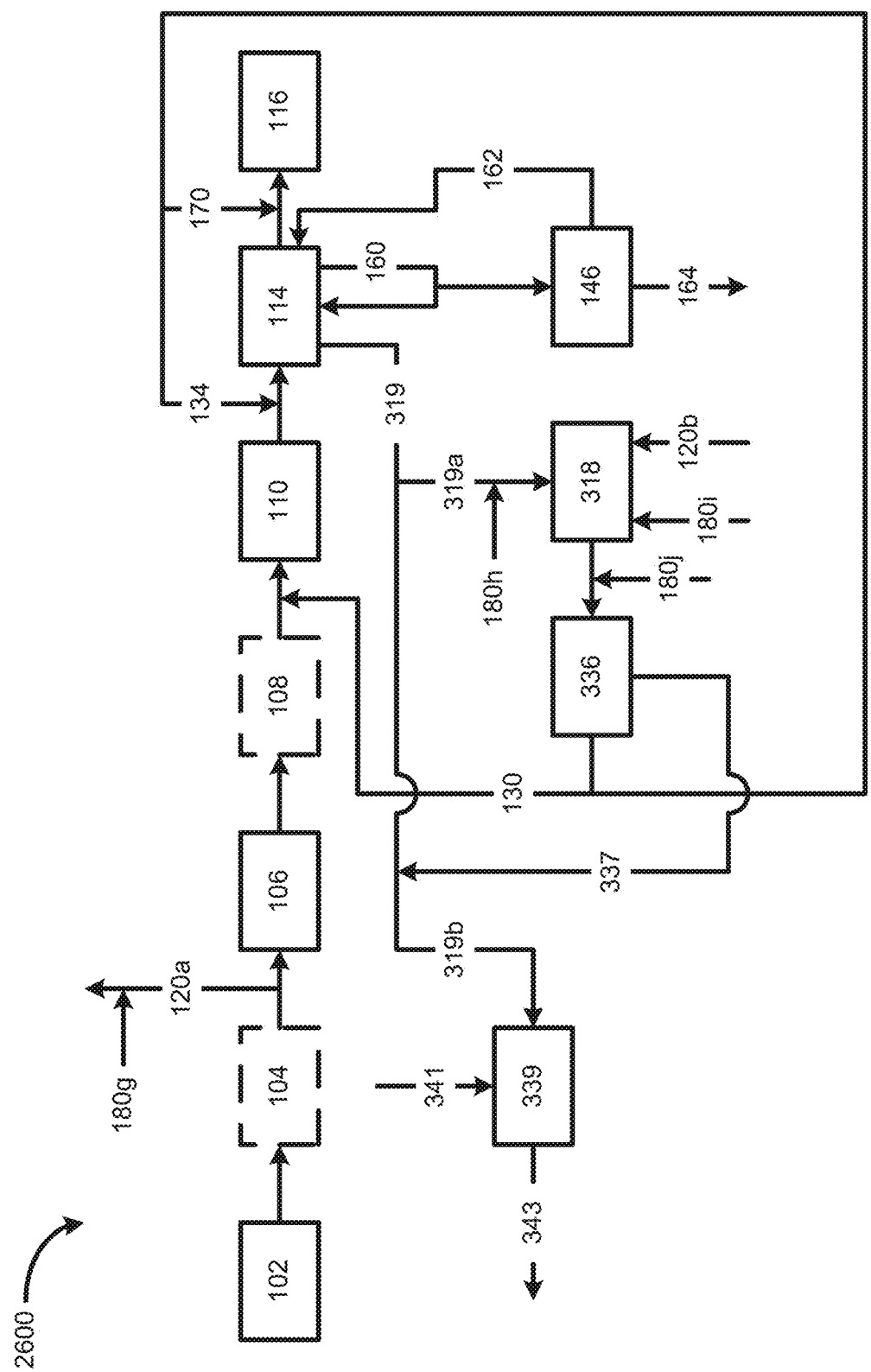
FIG. 26 is a schematic representation of a fuel burning facility which includes a system according to still another embodiment for practicing one method of the present invention.
Figure 27:
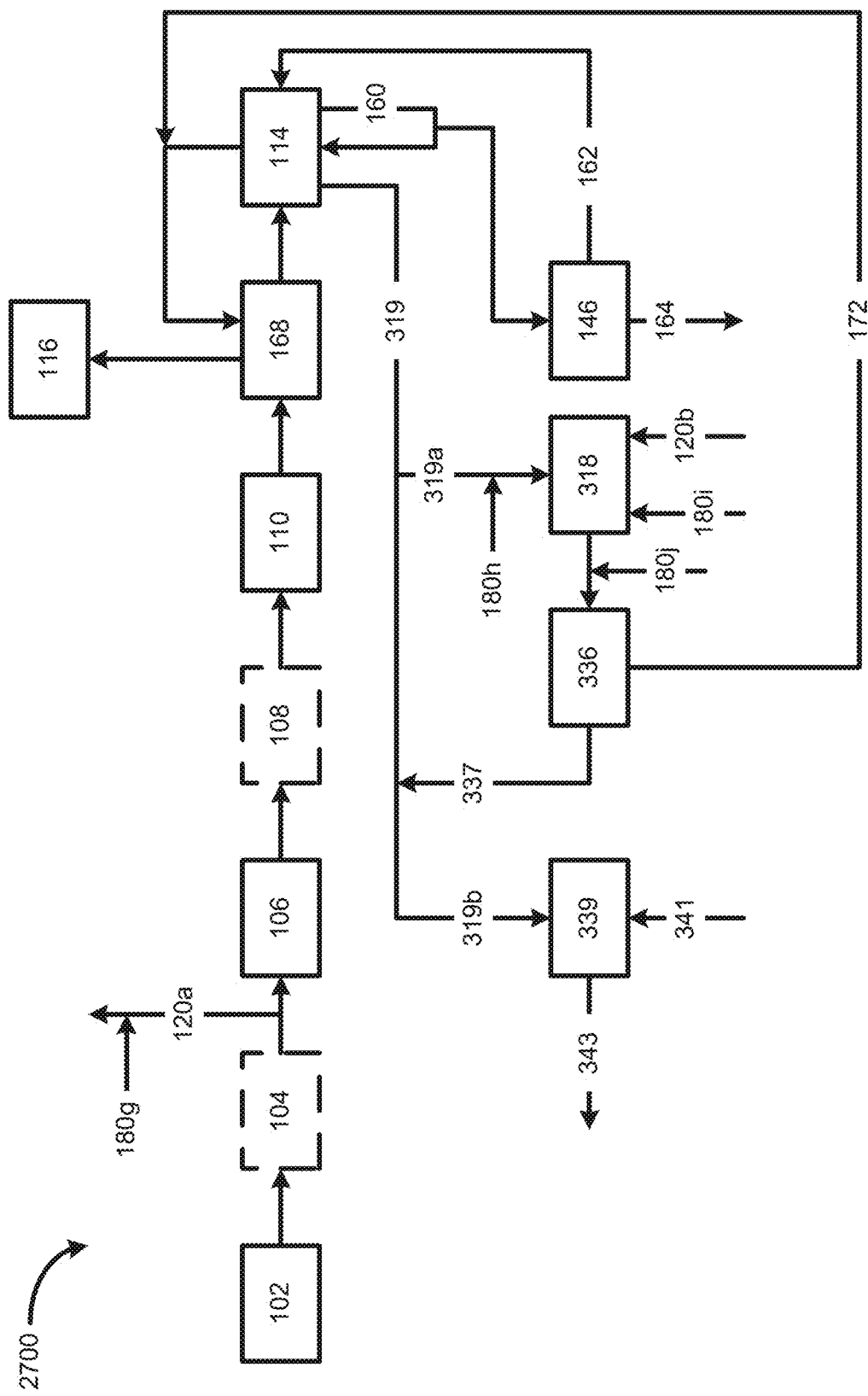
FIG. 27 is a schematic representation of a fuel burning facility which includes a system according to still another embodiment for practicing one method of the present invention.

Regarding the types of additives that can be injected in connection with the present invention, such additives are typically either one or more wet or dry absorbents and/or one or more wet or dry adsorbents. By "wet" it is meant that the absorbent and/or adsorbent is/are supplied in the form of a solution, liquid-based suspension, liquid-based slurry, liquid-based emulsion, etc. By "dry" it is meant that the absorbent and/or adsorbent is/are supplied in the form of a powder, solid, or some other solid particle-based form. Some examples of absorbent and/or adsorbents include, but are not limited to, one or more powdered activated carbons (PAC), one or more halogenated-powdered activated carbons (i.e., halogenated-PAC—examples of which include fluorinated-PAC, chlorinated-PAC, brominated-PAC, and/or iodinated-PAC), one or more phyllosilicates (be they modified such as amended silicates or unmodified), lime, wet slaked lime, dry hydrated lime, cement kiln dust, lime kiln dust, fly ash, trona, sodium bicarbonate (be it anhydrous and/or hydrated), sodium carbonate (be it anhydrous and/or hydrated), one or more suitable alkaline-based absorbents and/or adsorbents, one or more anti-caking and/or powdering additives, or any combination of two or more thereof. In one embodiment, one or more of the above-listed materials are injected at one or more of injection points 180*a*, 180*b*, 180*c*, 180*d*, 180*e*, 180*f*, 180*g*, 180*h*, 180*i* and/or 180*j* (some of these injection points will be discussed in more detail below). In still another embodiment, injection point 180*f*, as illustrated in FIGS. 18 through 22, and injection point 180*h*, as illustrated in FIGS. 26 and 27, can in the alternative, or additionally, be utilized to inject one or more salt compounds produced by, or derived from, any device and/or process in FIGS. 18 through 22, 26 and 27 into the liquid waste stream being supplied to SDE 318 prior to entry of same into SDE 318. In one instance, the one or more salt compounds can be dried salt compounds, re-circulated salt compounds, etc. from any one or more of the devices and/or processes of any of the embodiments illustrated in FIGS. 18 through 22, 26 and 27. In another instance, the injection of the one or more salt compounds at injection points 180*f* and/or 180*h* are done to improve the material handling properties of the liquid waste stream being supplied to SDE 318 prior to entry of same into SDE 318.

In one embodiment, the one or more anti-caking and/or powdering additives can be selected from any suitable anti-caking and/or powdering additives. Such additives include, but are not limited to, silicas (such as those sold under the trade name SIPERNAT® by Evonik AG of Germany), silicon dioxide, fumed silica, tricalcium phosphate, powdered cellulose, magnesium stearate, sodium bicarbonate, bone phosphate, sodium silicate, calcium silicate, magnesium trisilicate, talcum powder, sodium aluminosilicate, potassium aluminum silicate, calcium aluminosilicate, bentonite, aluminum silicate, stearic acid, polydimethylsiloxane or any combination of two or more thereof, any combination of three or more thereof, any combination of four or more thereof, or even any combination of five, of six, of seven, of eight, of nine, of ten, of eleven, or of twelve or more thereof.

Figure 19:
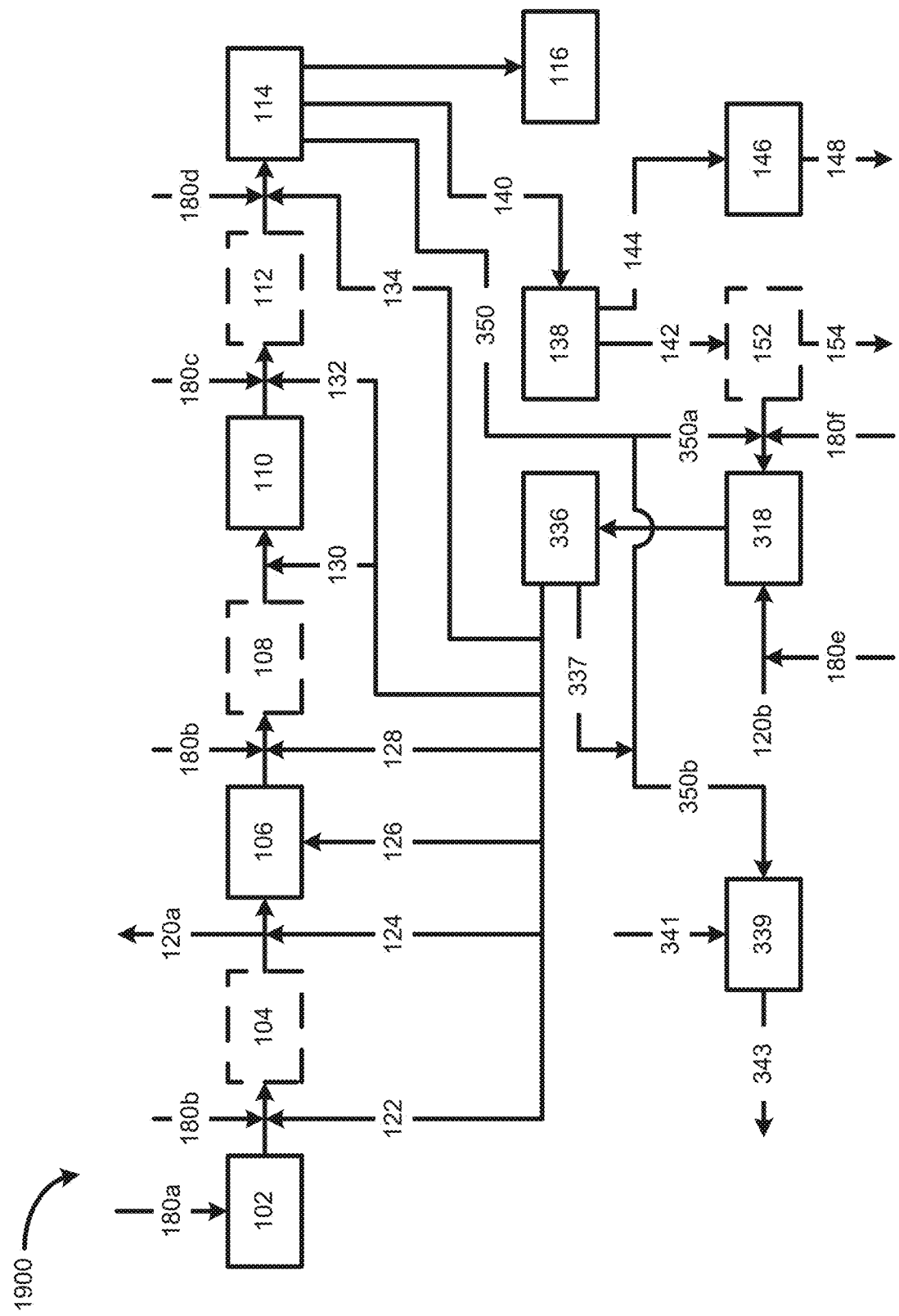
FIG. 19 is a schematic representation of a fuel burning facility which includes a system according to still another embodiment for practicing one method of the present invention.

Turning to FIG. 19, Figure illustrates a system 1900 according to yet another embodiment of the present invention. System 1900 of FIG. 19 differs from system 1800 of FIG. 18 in that it further comprises a hydroclone 138 that receives a desired portion of, or the complete amount of, liquid waste and/or liquid waste stream that is generated by WFGD 114 via a suitable conduit, duct, pipe or conveying passage 140. Hydroclone 138 then processes such waste into two discrete streams with one stream from hydroclone 138 having: (a) a high suspended solids content of at least about 5 percent by weight, at least about 7.5 percent by weight, at least about 10 percent by weight, at least about 12.5 percent by weight, at least about 15 percent by weight, at least about 17.5 percent by weight, at least about 20 percent by weight, at least about 22.5 percent by weight, at least about 25 percent by weight, at least about 27.5 percent by weight, at least about 30 percent by weight, at least about 32.5 percent by weight, at least about 35 percent by weight, at least about 37.5 percent by weight, at least about 40 percent by weight, at least about 42.5 percent by weight, at least about 45 percent by weight, at least about 47.5 percent by weight, at least about 50 percent by weight, at least about 52.5 percent by weight, at least about 55 percent by weight, at least about 57.5 percent by weight, or even about 60 percent by weight; and (b) a low, or zero, suspended solids content of less than about 5 percent by weight, less than about 4 percent by weight, less than about 3 percent by weight, less than about 2 percent by weight, less than about 1 percent by weight, less than about 0.5 percent by weight, less than about 0.25 percent by weight, or less than about 0.1 percent by weight, or even 0 percent by weight. Here, as well as elsewhere in the specification and claims, individual numerical values can be combined to form additional and/or non-disclosed ranges. These streams are represented by the two outward arrows 142 and 144 that exit from hydroclone 138.

In light of the above, one of the above high suspended solids content stream or the low suspended solids content stream from hydroclone 138 is supplied to SDE 318 and is subject to liquid waste control, reduction and/or mitigation as described above with regard to system 1600. The remaining high suspended solids content stream or the low suspended solids content stream from hydroclone 138 that is not supplied to SDE 318 is supplied to a filter device 146 that can be utilized to remove one or more desirable by-products contained in the liquid waste stream from a WFGD including, but not limited to, gypsum and/or supply back to WFGD 114 any remaining liquid material that is generated by filter device 146. This function is denoted generally by output arrow 148 from filter device 146. Filter device 146 can be any type of filter including, but not limited to, a belt filter, a rotary filter, a drum filter, etc. In another instance, system 1900 further comprises a secondary liquid waste and/or liquid waste stream that is generated by WFGD 114 via a suitable conduit, duct, pipe or conveying passage 350 that sends a portion of the liquid waste and/or liquid waste stream from WFGD 114. As can be seen from FIG. 19, supply line 350 is split into two liquid waste portions and/or two liquid waste streams—a low suspended solids/high dissolved solids slurry stream 350a and a high suspended solids slurry stream 350b. In another embodiment, the high suspended solids slurry stream 350b is generated due to the addition of any particulate matter via supply line 337 (as will be explained in more detail below) and it is only after such addition in this embodiment that slurry stream 350b is a high suspended solids slurry stream in accordance with the numerical ranges discussed below. As such, in this additional embodiment, prior to this point the split in stream 350 yields two essentially similar liquid waste streams. For the purposes of this embodiment, other than a differing amount of material that is supplied from WFGD 114 via supply line 350, supply line 350 and the two portions it is split into, supply line 350a and supply line 350b, are identical to the description about with regard to supply lines 319, 319a and 319b. Given this, all of the numerical parameters disclosed above with regard to the nature of the waste streams supplied by supply lines 319a and 319b apply respectively to nature of the waste streams supplied by supply lines 350a and 350b. Thus, portion 350a is sent to SDE 318 to reduce and/or eliminate such liquid waste and/or liquid waste stream by evaporating same in SDE 318, while portion 350b is combined with the particulate matter that is collected by particulate control device 336 and supplied to stream 350b via supply line 337. Again, a more detailed discussion of this embodiment is omitted for the sake of brevity as this portion of system 1900 is similar to the same portion of system 1600 described above except that supply lines 319, 319a and 319b are numbered 350, 350a and 350b in the embodiment of system 1900.

In still another instance, system 1900 further comprises a secondary hydroclone device 152 that is located in between hydroclone 138 and SDE 318. In the instance where secondary hydroclone 152 is present it is useful to refer to hydroclone 138 as primary hydroclone 138. When secondary hydroclone 152 is present in system 1900, secondary hydroclone receives either the high suspended solids content stream or the low suspended solids content stream from primary hydroclone 138 and itself generates a second set of a high suspended solids content stream and a low suspended solids content stream. These secondary high and low suspended solids content streams can have solids contents similar to, or different from, the high and low suspended solids content streams from primary hydroclone 138 so long as the suspended solids content of each of the high and low suspended solids content streams fall within the ranges defined above with regard to high and low suspended solids content streams of hydroclone 138.

In light of the above, one of the above high suspended solids content stream or the low suspended solids content stream from secondary hydroclone 152 is supplied to SDE 318 and is subject to liquid waste control, reduction and/or mitigation as described above with regard to system 1600. The remaining high suspended solids content stream or the low suspended solids content stream from secondary hydroclone 152 that is not supplied to SDE 318 is utilized to generate one or more desirable by-products contained in the liquid waste stream from a WFGD including, but not limited to, gypsum and/or supply back to WFGD 114 any remaining low suspended solids content material that is generated by secondary hydroclone 152. This function is denoted generally by output arrow 154 from secondary hydroclone 152. In yet another instance, system 1900 further comprises a secondary liquid waste and/or liquid waste stream that is generated by WFGD 114 via a suitable conduit, duct, pipe or conveying passage 350 that sends a portion of the liquid waste and/or liquid waste stream from WFGD 114 directly to SDE 318 and/or is combined with the high, or low, suspended solids content stream from secondary hydroclone 152 prior to entry of same into SDE 318.

In still yet another instance, system 1900 also further comprises one or more additive injection devices (denoted by vertical arrow 180f) for injecting one or more additives into the liquid waste stream being supplied to SDE 318 prior to entry of same into SDE 318. As discussed above, the types of additives that can be injected in connection with the present invention are absorbents and/or adsorbents including, but not limited to, one or more powdered activated carbons (PAC), one or more halogenated-powdered activated carbons (i.e., halogenated-PAC—examples of which include fluorinated-PAC, chlorinated-PAC, brominated-PAC, and/or iodinated-PAC), one or more phyllosilicates (be they modified such as amended silicates or unmodified), lime, wet slaked lime, dry hydrated lime, cement kiln dust, lime kiln dust, fly ash, trona, sodium bicarbonate (be it anhydrous and/or hydrated), sodium carbonate (be it anhydrous and/or hydrated), one or more suitable alkaline-based absorbents and/or adsorbents, or any combination of two or more thereof. In this case, the injection device can be selected from any suitable injection device that can inject the above compounds into a liquid waste and/or a liquid waste stream.

Figure 20:
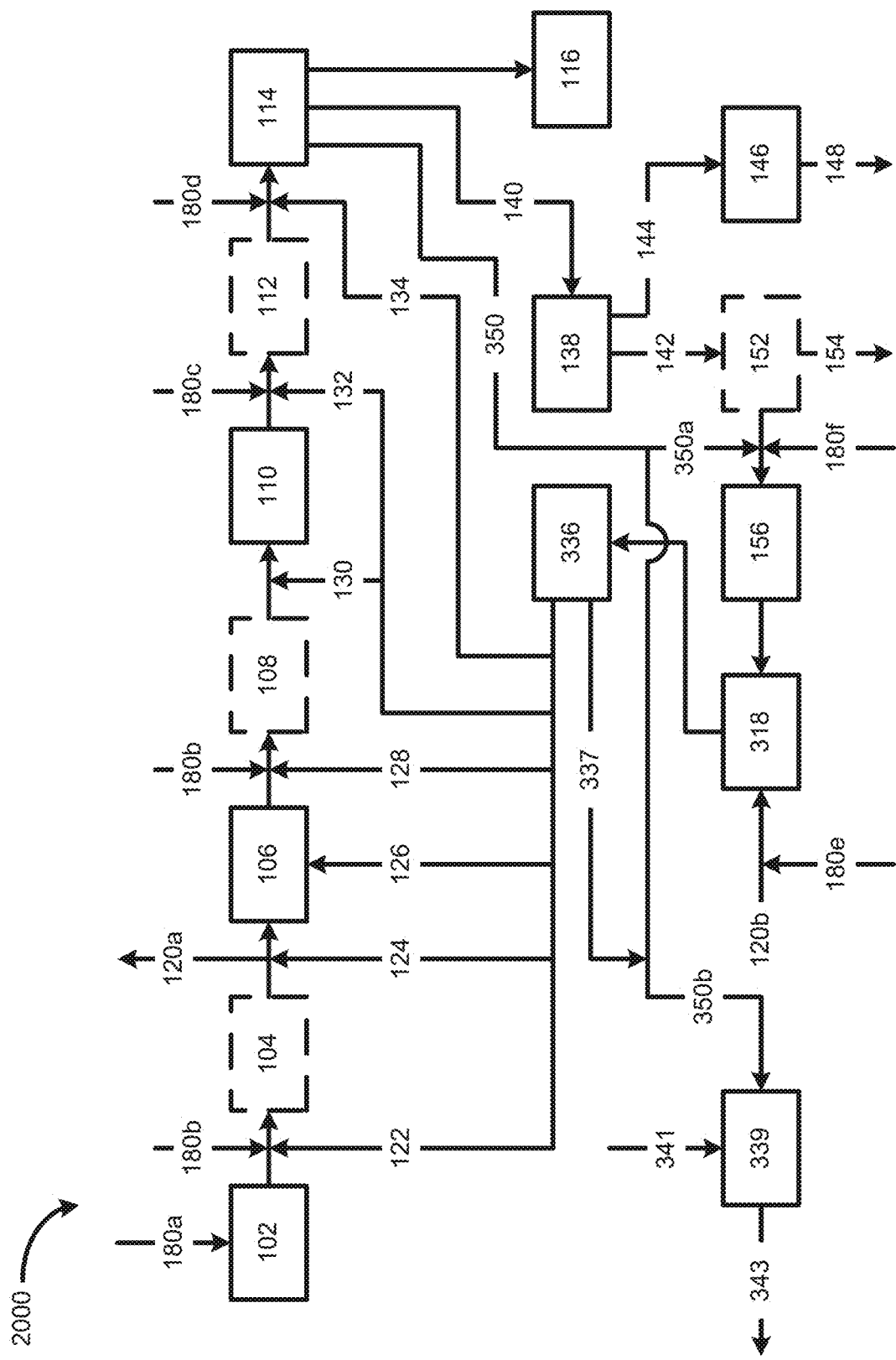
FIG. 20 is a schematic representation of a fuel burning facility which includes a system according to still another embodiment for practicing one method of the present invention.

Turning to FIG. 20, FIG. 20 illustrates a system 2000 according to yet another embodiment of the present invention. System 2000 differs from system 1900 of FIG. 4 in that it contains a one or more physical and/or chemical water treatment devices 156 located between either hydroclone 138 and SDE 318, or between secondary hydroclone 152 and SDE 318. As can be seen from FIG. 20, a secondary liquid waste and/or liquid waste stream that is generated by WFGD 114 via suitable conduits, ducts, pipes or conveying passages 350 and 350a sends a portion of the liquid waste and/or liquid waste stream from WFGD 114 to a conduit, duct, pipe or conveying passage upstream of the one or more physical and/or chemical water treatment devices 156 to be combined with the liquid waste from one, or both, of hydroclones 138 and 152. Additionally additive injection device 180f is not present in system 2000 as the one or more physical and/or chemical water treatment devices 156 can be designed to, if so desired, replace this function.

Figure 21:
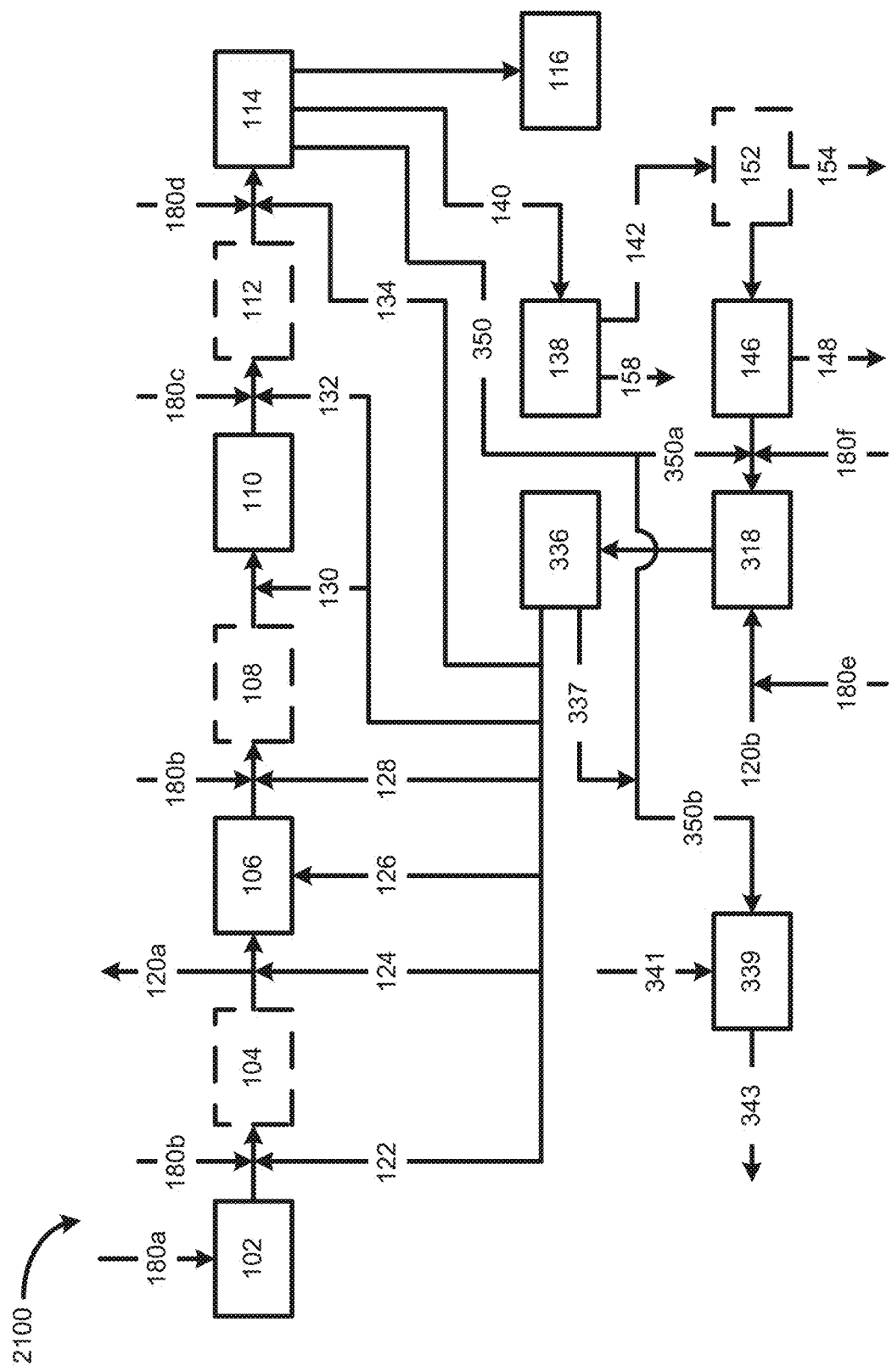
FIG. 21 is a schematic representation of a fuel burning facility which includes a system according to still another embodiment for practicing one method of the present invention.

Turning to FIG. 21, FIG. 21 illustrates a system 2100 according to yet another embodiment of the present invention. System 2100 differs from system 1900 of FIG. 19 in that hydroclone 138 supplies either one of the above high suspended solids content stream or the low suspended solids content stream to filter 146 that is now positioned between hydroclone 138 and SDE 318. Filter 146 is independently selected from the devices discussed above with regard to filter 146 of system 1900. Filter 146 of this embodiment operates in a similar manner to that discussed above with regard to system 1900 other than a portion of the material generated by filter 146 is passed on to SDE 318 for control, reduction and/or mitigation of any liquid therein via SDE 318. The solids content of such streams are in the ranges discussed above with regard to system 1900. The remaining high suspended solids content stream or the low suspended solids content stream from hydroclone 138 is, in this embodiment, supplied back to WFGD 114 via a suitable conduit, duct, pipe or conveying passage partially denoted by arrow 158. In another instance, system 2100 can further comprise a secondary hydroclone that is located in between hydroclone 138 and filter 146. In this embodiment, although positioned differently, secondary hydroclone operates in a manner identical to that of secondary hydroclone in system 1900.

Figure 22:
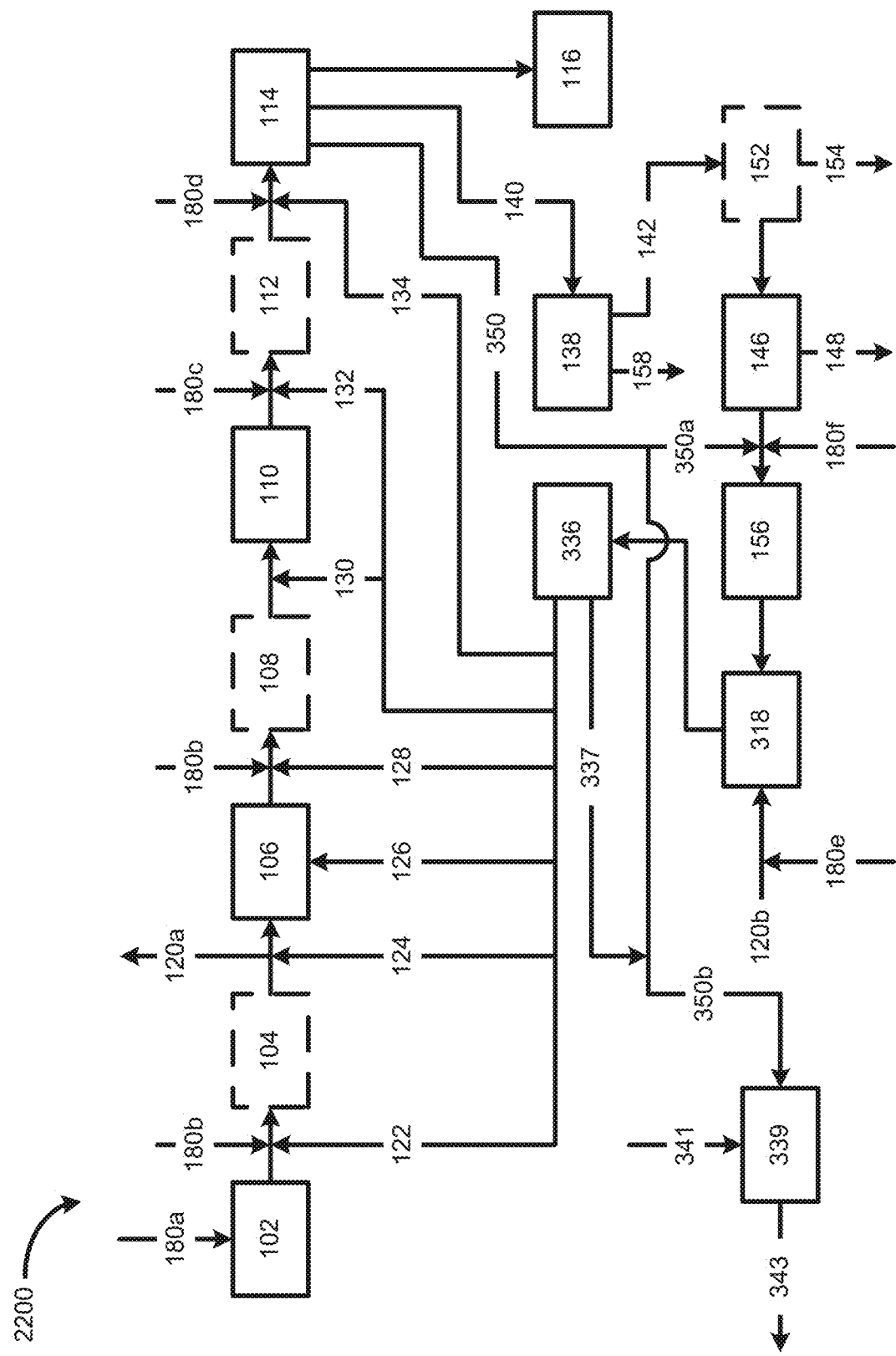
FIG. 22 is a schematic representation of a fuel burning facility which includes a system according to still another embodiment for practicing one method of the present invention.

Turning to FIG. 22, FIG. 22 illustrates a system 2200 according to yet another embodiment of the present invention. System 2200 differs from system 2100 of FIG. 21 in that it contains a one or more physical and/or chemical water treatment devices 156 located between filter 146 and SDE 318. As can be seen from FIG. 22, a secondary liquid waste and/or liquid waste stream that is generated by WFGD 114 via suitable conduits, ducts, pipes or conveying passages 350 and 350a sends a portion of the liquid waste and/or liquid waste stream from WFGD 114 to a conduit, duct, pipe or conveying passage upstream of the one or more physical and/or chemical water treatment devices 156 to be combined with the liquid waste from one, or both, of hydroclones 138 and 152 and the material generated by filter 146. Additionally additive injection device 180f is not present in system 2200 as the one or more physical and/or chemical water treatment devices 156 can be designed to, if so desired, replace this function.

Figure 23:
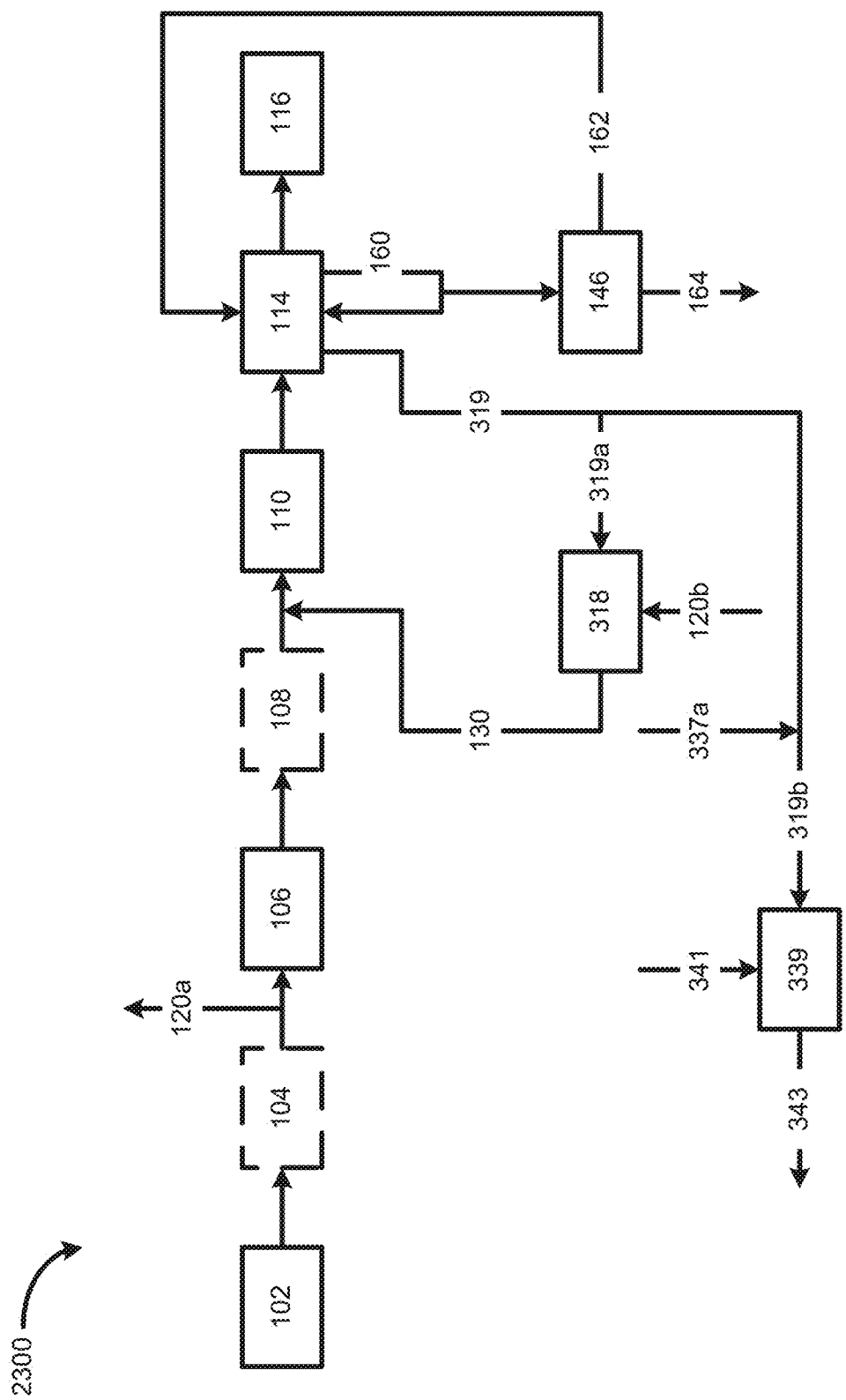
FIG. 23 is a schematic representation of a fuel burning facility which includes a system according to still another embodiment for practicing one method of the present invention.

Turning to FIG. 23, FIG. 23 illustrates a system 2300 according to yet another embodiment of the present invention. System 2300 differs from system 1600 of FIG. 16 in that it contains a circulation loop 160 that is designed to recirculate absorber recirculation tank (ART) solution from WFGD 114 so as to permit a portion thereof to be supplied to filter 146 where filter 146 separates this portion of the ART into a mother liquor that is returned to the WFGD via a suitable conduit, duct, pipe or conveying passage 162 and a gypsum product 164. In system 2300, the portion of the liquid waste and/or liquid waste stream that is supplied to SDE 318 via supply line 319a has a suspended solids, or total suspended solids, content as discussed above with regard to system 1600 of FIG. 16.

Regarding input and/or additive injection device 337a, input 337a is equivalent to supply line 337 described above except that the particulate material, or other material, supplied by this input can come from any suitable particulate collection device whether or not such device is located within system 2300 (e.g., particulate collection device 110), or outside of system 2300 (e.g., any other particulate collection device, or even a particulate matter that is collection at another location and supplied as an additive via input 337a). Such particulate matter for input 337a is not limited to just fly ash, but can be any particulate material that is collection by a particulate collection device. With regard to the particulate collection device that supplies the material for input 337a, such a device can be selected from any known device and/or system for removing particulate matter from a gas stream where such devices/systems include, but are not limited to, wet electrostatic precipitators (wet ESPs), dry electrostatic precipitators (dry ESPs), fabric filters (e.g., pulse jet fabric filters), etc.

Figure 24:
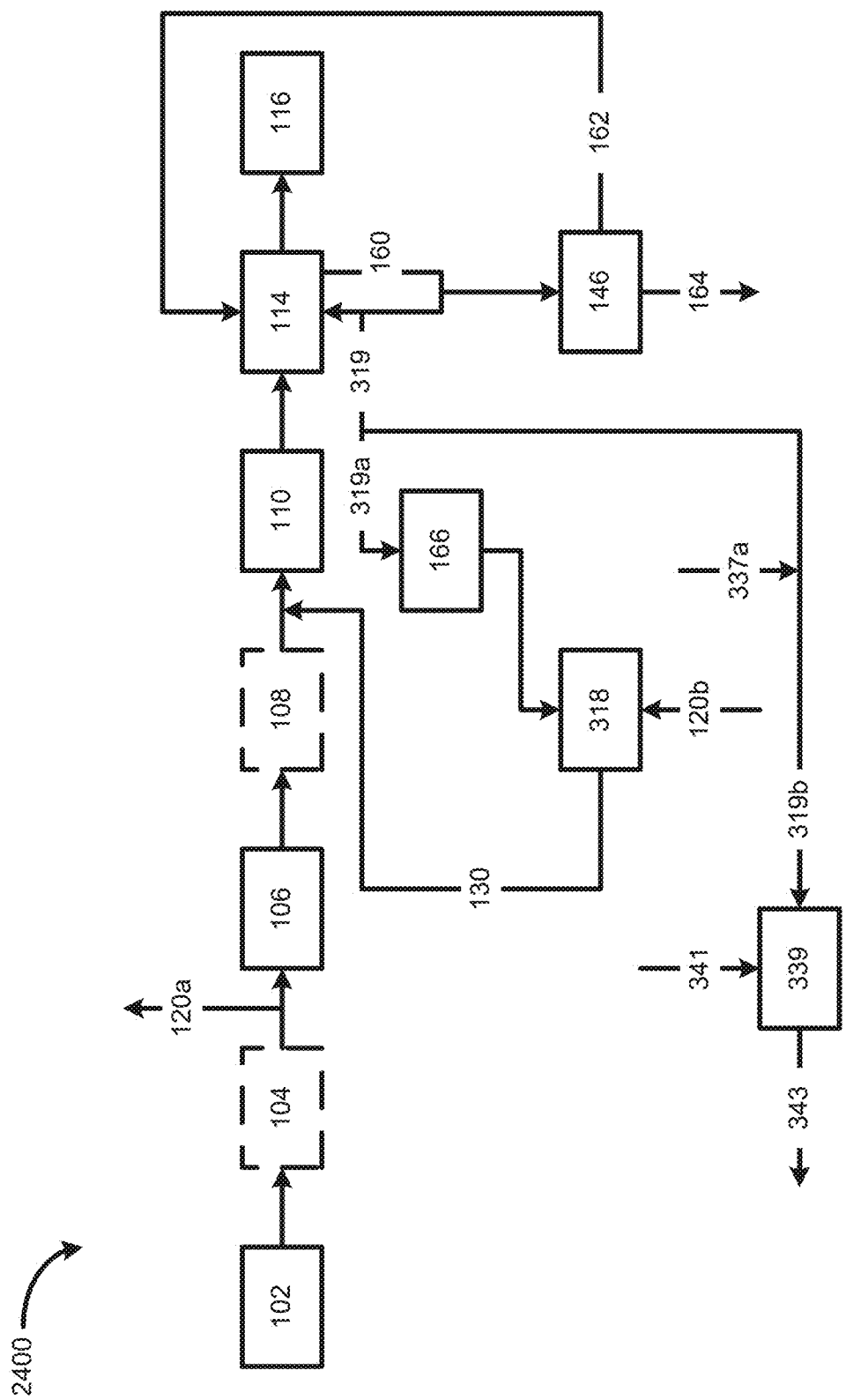
FIG. 24 is a schematic representation of a fuel burning facility which includes a system according to still another embodiment for practicing one method of the present invention.

Turning to FIG. 24, FIG. 24 illustrates a system 2400 according to yet another embodiment of the present invention. System 2400 differs from system 2300 of FIG. 23 in that it contains a drying unit feed tank 166 for storing liquid waste from WFGD 114. Additionally, as is illustrated in FIG. 24, the liquid waste and/or liquid waste stream for this embodiment comes from circulation loop 160 and not directly from WFGD 114, or even directly from the ART of WFGD 114. It should be noted that although not shown therein, drying unit feed tank 166 could optionally be present in any one or more of the embodiments of FIGS. 16 through 22.

Figure 25:
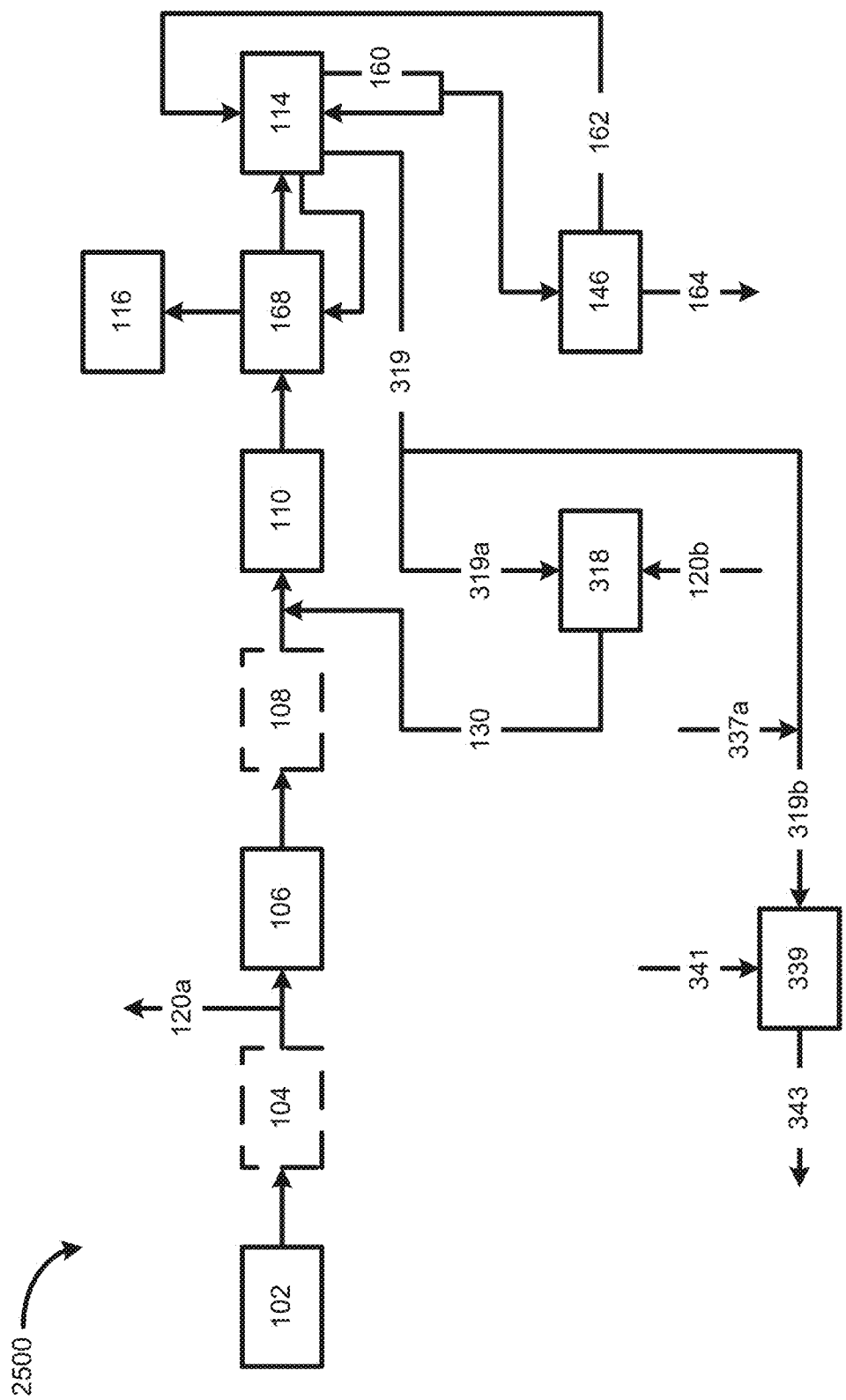
FIG. 25 is a schematic representation of a fuel burning facility which includes a system according to still another embodiment for practicing one method of the present invention.

Turning to FIG. 25, FIG. 25 illustrates a system 2500 according to yet another embodiment of the present invention. System 2500 differs from system 2300 of FIG. 23 in that it contains a heat exchanger 168 position between particulate control device 110 and WFGD 114. As can be seen from FIG. 25 heat exchanger 168 receives the flue gases, or combustion gases, output from WFGD 114 as well as permitting the main flow the flue gases, or combustion gases, upstream of WFGD 114 to pass there through so as to permit the desired movement of heat from one flue gas stream to the other. The nature of the heat exchanger of this embodiment is not critical so long as the device permits the transfer of heat from one flue gas stream to the other stream, or vice versa.

Turning to FIG. 26, FIG. 26 illustrates a system 2600 according to yet another embodiment of the present invention. System 2600 differs from system 2300 of FIG. 23 in that it contains a SDE particulate control device 336 downstream of SDE 318. SDE particulate control device 336 can be selected from those devices discussed above with regard to device 136 and/or 336 from other embodiments of the present invention. As can be seen from FIG. 26, system 2600 further contains one or more additive injection devices 180g, 180h, 180i and/or 180j located as illustrated in FIG. 26. These additive injection devices can be selected from the devices discussed above with regard to any of additive injection devices 180a through 180f and can inject any of the one or more additives discussed above, or in one embodiment, wet or dry hydrated lime ($Ca(OH)_2$) (that is in solution, slurry, suspension, and/or emulsion versus in some solid, particulate, powder and/or granular form). Furthermore, system 2600 also permits reinjection of the flue gases and/or combustion gases exiting SDE 318 and SDE particulate device 336 into a position between WFGD 114 and the remainder of any AQCS equipment and/or stack 116.

Turning to FIG. 27, FIG. 27 illustrates a system 2700 according to yet another embodiment of the present invention. System 2700 differs from system 2500 of FIG. 25 in that it contains a SDE particulate control device 336 downstream of SDE 318. SDE particulate control device 336 can be selected from those devices discussed above with regard to devices 136 and/or 336 from other embodiments of the present invention. As can be seen from FIG. 27, system 2700 further contains one or more additive injection devices 180g, 180h, 180i and/or 180j located as illustrated in FIG. 27. These additive injection devices can be selected from the devices discussed above with regard to any of additive injection devices 180a through 180e and can inject any of the one or more additives discussed above, or in one embodiment, slaked lime ($Ca(OH)_2$). Furthermore, system 2700 alternatively permits reinjection of the flue gases and/or combustion gases exiting SDE 318 and SDE particulate device 336 into a position 172 between WFGD 114 and one portion of heat exchanger 168 in lieu of injection point 130 of FIG. 25.

While not wishing to be bound to any one set of advantages and/or accomplishments, the embodiments of the present invention permit one to realize one or more of: (a) an ability to influence the chemical and/or physical properties of the powder, or other dried material, generated by the one or more SDEs 318 of the present invention; (b) an ability to influence the chemical and/or physical properties of the liquid waste and/or liquid waste stream that is supplied to one or more SDEs 318 of the present invention thereby also permitting, in at least some instances, control of the chemical and/or physical properties of the powder, or other dried material, generated by the one or more SDEs 318 of the present invention; and/or (c) an ability to influence the chemical and/or physical properties (e.g., particulate size, bulk density, the amount of bound and/or unbound water, hygroscopicity, etc.) of the landfill-bound material, be it liquid, slurry, suspension emulsion, dried material, or otherwise, that is produced by the one or more SDEs 318 powder, or other dried material, generated by the one or more SDEs 318. In another instance, the present invention permits one to realize and/or achieve recirculation of the dried product from the one or more SDEs 318 to any one or more desired injection devices and/or injection points including, but not limited to, any one or more of the injection devices and/or injection points 180*a* through 180*j* discussed above and/or any other desired injection point via any suitable injection device, or devices, regardless of whether or not such injection point and/or injection is/are specifically disclosed and/or discussed herein.

In still another instance, the present invention permits, in at least some of the embodiments disclosed herein, one to achieve a modification of, control of, and/or a change in at least one or more chemical and/or physical properties of at least a solution contained in the ART of a WFGD unit via the present invention's ability to control, reduce and/or mitigate one or more liquid wastes and/or liquid waste streams from a WFGD unit. In still yet another embodiment, the present invention can involve the use of one or more wet or dry injection steps and/or processes where one or more partially dry particulate materials, one or more dry particulate materials, and/or one or more wet particulate materials from one or more downstream devices and/or processes are injected into one or more upstream devices and/or processes in order to create and/or promote at least one of the following: agglomeration, achieve solubility, promote and/or enhance solubility and/or dissolvability, etc.

It should again be noted, that any of the systems of FIGS. 16 through 27 can be utilized to control, reduce and/or mitigate of any amount of liquid waste material drawn from any desired portion of WFGD unit 114 including, but not limited to, the absorber recirculation tank (ART) thereof. As discussed in detail above, such liquid waste material can contain either one, or both, of suspended solids and dissolved solids. In another embodiment, the systems of the present invention permit the control, reduction and/or mitigation of any amount of liquid waste material drawn from any desired portion of WFGD unit 114 including, but not limited to, the absorber recirculation tank (ART) thereof that contains both suspended solids and dissolved solids without requiring pre-treatment of such liquid waste material to remove any portion of, or all of, the suspended solids contained therein so as to make the remaining portion of such liquid waste material suitable for control, reduction and/or mitigation in one or more of SDEs 318 disclosed herein. While not wishing to be bound to any one advantage, the fact that the systems of the present invention permit, in some embodiments, the reduction and/or mitigation of a liquid waste material that contains both suspended solids and dissolved solids without first treating such liquid waste material to remove any portion of, or all of, the suspended solids contained therein permits the systems of the present invention to be simplified, to draw liquid waste material from more points in a given system as disclosed in FIGS. 16 through 27.

In one embodiment, the systems of the present invention are advantageous in that they permit control, reduce and/or mitigate of any amount of liquid waste material drawn from any desired portion of WFGD unit 114 where such waste has a high suspended solids, or total suspended solids, content. That is, having a suspended solids, or total suspended solids, content of between 5 percent by weight and about 60 percent by weight, or between about 6 percent by weight and about 57.5 percent by weight, or between about 7 percent by weight and about 55 percent by weight, or between about 8 percent by weight and about 52.5 percent by weight, or between about 9 percent by weight and about 50 percent by weight, or between about 10 percent by weight and about 47.5 percent by weight, or between about 11 percent by weight and about 45 percent by weight, or between about 12.5 percent by weight and about 42.5 percent by weight, or between about 15 percent by weight and about 40 percent by weight, or between about 17.5 percent by weight and about 37.5 percent by weight, or between about 20 percent by weight and about 35 percent by weight, or between about 22.5 percent by weight and about 32.5 percent by weight, or between about 25 percent by weight and about 30 percent by weight, or even about 27.5 percent by weight. Here, as well as elsewhere in the specification and claims, individual numerical values can be combined to form additional and/or non-disclosed ranges. Such locations where such waste streams having high total suspended solids, or suspended solids, content can be drawn from include, but are not limited to, a WFGD's absorber recirculation tank (ART), at least one primary hydroclone underflow, at least one filter feed tank, or any combination of two or more thereof, or even three or more thereof.

In another embodiment, the systems illustrated in FIGS. 16 through 27 are composed of a variety of components as described herein with the components shown in dashed lines being optional. As such, in one embodiment any one or more, two or more, three or more, or all four of such dashed components of any of FIGS. 16 through 27 are present. Alternatively, in another embodiment any combination of the various dashed components of any of FIGS. 16 through 27 are present.

As noted above, the systems of FIGS. 16 through 27 can operate such that the supply line 319 and/or 350 is split into two liquid waste portions and/or two liquid waste streams where the composition of such streams 319*a* and 319*b* and/or 350*a* and 350*b* are essentially the same. In other words, in this additional embodiment for the systems of FIGS. 16 through 27 it is not necessary to split liquid waste stream 319 and/or 350 into a low suspended solids/high dissolved solids slurry stream 319*a*/350*a* and a high suspended solids slurry stream 319*b*/350*b*.

In light of the above, in such an embodiment the total suspended solids, or suspended solids, content of streams 319*a* and 319*b* and/or 350*a* and 350*b* is between about 0.01 percent by weight and about 60 percent by weight, or between about 0.05 percent by weight and about 57.5 percent by weight, or between about 0.1 percent by weight and about 55 percent by weight, or between about 0.5 percent by weight and about 52.5 percent by weight, or between about 1 percent by weight and about 50 percent by weight, or between about 2.5 percent by weight and about 47.5 percent by weight, or between about 5 percent by weight and about 45 percent by weight, or between about 7.5 percent by weight and about 42.5 percent by weight, or between about 10 percent by weight and about 40 percent by weight, or between about 12.5 percent by weight and about 37.5 percent by weight, or between about 15 percent by weight and about 35 percent by weight, or between about 17.5 percent by weight and about 32.5 percent by weight, or between about 20 percent by weight and about 30 percent by weight, or between about 22.5 percent by weight and about 27.5 percent by weight, or even about 25 percent by weight.

It should be noted that with regard to another embodiment of the present invention, that all of the total suspended solids in the liquid waste and/or liquid waste stream that is supplied to SDE 318 for control, reduction and/or mitigation does not necessarily come directly from WFGD unit 114, rather any portion thereof can come indirectly from another device that is operatively connected to the WFGD unit 114 including, but not limited to, a hydroclone and/or some other type of gypsum concentrating device, these two liquid wastes and/or two liquid waste streams 319a and 319b and/or 350a and 350b can then be combined to yield a liquid waste and/or liquid waste stream that is supplied to SDE 318 having a total suspended solids content within any of the ranges stated above. Here, as well as elsewhere in the specification and claims, individual numerical values can be combined to form additional and/or non-disclosed ranges.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A system for controlling, reducing and/or mitigating the amount of liquid waste from, or derived from, a fuel-fired furnace and/or boiler, the system comprising:
   a fuel-fired furnace and/or boiler designed to burn at least one fuel to generate heat and flue, or combustion, gases;
   at least one particulate control device, wherein the particulate control device is located downstream of the furnace and/or boiler and is operatively connected to same;
   one or more WFGD units, wherein at least one of the one or more WFGD units is located downstream of the at least one particulate control device and is operatively connected to same;
   a liquid waste and/or liquid waste stream from the one or more WFGD units, wherein the liquid waste and/or liquid waste stream is split into two liquid waste portions and/or two liquid waste streams upstream of at least one drying unit, wherein the second portion of the liquid waste and/or liquid waste stream has a higher total suspended solids content than the first portion of the liquid waste and/or liquid waste stream, wherein the at least one drying unit is operatively connected to at least one of the one or more WFGD units and designed to receive the first portion of the liquid waste and/or liquid waste stream; and
   at least one mixing device, wherein the at least one mixing device is operatively connected to both the at least one drying unit and the at least one or more WFGD units and designed to receive a combination of the second portion of the liquid waste and/or liquid waste stream and at least one particulate matter from one or more particulate control devices,
   wherein the second portion of the liquid waste and/or liquid waste stream does not pass thru the drying unit,
   wherein the at least one drying unit is designed to control, reduce and/or mitigate the volume of liquid waste and/or liquid waste stream from at least one of the one or more WFGD units via the use of at least a portion of the flue, or combustion, gases generated from the furnace and/or boiler, and
   wherein the first portion of the liquid waste and/or liquid waste stream contains both a total suspended solids content in the range of about 0.01 percent by weight to about 60 percent by weight and a total dissolved content of about 2,500 ppm to about 250,000 ppm.

2. The system of claim 1, wherein the system further comprises an air heater, wherein the air heater is located downstream of the fuel-fired furnace and/or boiler and is operatively connected to same.

3. The system of claim 1, wherein the liquid waste and/or liquid waste stream is supplied from a WFGD absorber recirculation tank.

4. The system of claim 1, wherein the first portion of the liquid waste and/or liquid waste stream has a total suspended solids content of between about 5 percent by weight and about 60 percent by weight.

5. The system of claim 1, wherein the system further comprises at least one $NO_x$ control system or device.

6. The system of claim 5, wherein the system further comprises at least one SNCR system.

7. The system of claim 5, wherein the system further comprises at least one hot-side SCR located between the fuel-fired furnace and/or boiler and the air heater.

8. The system of claim 5, wherein the system further comprises at least one cold-side SCR between the air heater and the particulate control device.

9. The system of claim 1, wherein the system further comprises at least one secondary particulate control device located between the particulate control device and the WFGD.

10. The system of claim 1, wherein the system further comprises at least one WFGD recirculation loop, wherein the liquid waste and/or liquid waste stream supplied to the at least one drying unit that is supplied from the at least one WFGD recirculation loop is supplied to a spray dryer evaporator, a spray dryer absorber, or other type of specific drying device.

11. The system of claim 1, wherein the system further comprises at least one additive injection device for injecting at least one additive.

12. The system of claim 11, wherein the at least one additive is selected from one or more powdered activated carbons, one or more brominated powdered activated carbons, one or more modified and/or unmodified phyllosilicates, lime, slaked lime ($Ca(OH)_2$), one or more anti-caking and/or powdering additives, cement kiln dust, lime kiln dust, fly ash, or any combination of two or more thereof.

13. The system of claim 1, wherein the liquid waste and/or liquid waste stream has a total dissolved solids content of between about 5,000 ppm and about 200,000 ppm.

14. The system of claim 1, wherein the mixing device is a pug mill, a mixing tank, cement mixer, static mixer, batch mixer, drum mixer, and any combinations of two or more, three or more, or even four or more thereof.

15. The system of claim 1 wherein a dried salt is produced in the drying unit and the second portion of the liquid waste and/or liquid waste stream resolvates the dried salt downstream of the drying unit.

16. A method for controlling, reducing and/or mitigating the amount of liquid waste from, or derived from, a fuel-fired furnace and/or boiler, the method comprising the steps of:

supplying a fuel-fired furnace and/or boiler designed to burn at least one fuel to generate heat and flue, or combustion, gases;

supplying at least one particulate control device, wherein the particulate control device is located downstream of the furnace and/or boiler and is operatively connected to same;

supplying one or more WFGD units, wherein at least one of the one or more WFGD units is located downstream of the at least one particulate control device and is operatively connected to same;

supplying at least one drying unit, supplying a liquid waste and/or a liquid waste stream from the one or more WFGD units, wherein the liquid waste and/or liquid waste stream is split into two portions and/or two liquid waste streams upstream of the at least one drying unit wherein the second portion of the liquid waste and/or liquid waste stream has a higher total suspended solids content than the first portion of the liquid waste and/or liquid waste stream, wherein the at least one drying unit is operatively connected to at least one of the one or more WFGD units and receives the first stream of the liquid waste and/or liquid waste stream; and supplying at least one mixing device, wherein the at least one mixing device is operatively connected to both the at least one drying unit and the at least one or more WFGD units and designed to receive a combination of the second stream of the liquid waste and/or liquid waste stream and at least one particulate matter from one or more particulate control devices, wherein the at least one drying unit controls, reduces and/or mitigates the volume of liquid waste and/or liquid waste stream from the WFGD via the use of at least a portion of the flue, or combustion, gases generated from the furnace and/or boiler, and wherein the first stream of the liquid waste and/or liquid waste stream contains both a total suspended solids content in the range of about 0.01 percent by weight to about 60 percent by weight and a total dissolved content of about 2,500 ppm to about 250,000 ppm.

17. The method of claim 16, wherein the method further comprises the step of:

supplying an air heater, wherein the air heater is located downstream of the fuel-fired furnace and/or boiler and is operatively connected to same.

18. The method of claim 17, wherein the liquid waste and/or liquid waste stream is supplied from a WFGD absorber recirculation tank.

19. The method of claim 18, wherein the first stream of the liquid waste and/or liquid waste stream has a total suspended solids content of between about 5 percent by weight and about 60 percent by weight.

20. The method of claim 19, wherein the method further comprises the step of supplying at least one $NO_x$ control system or device.

21. The method of claim 20, wherein the $NO_x$ control system or device is at least one SNCR system.

22. The method of claim 20, wherein the $NO_x$ control system or device is at least one hot-side SCR located between the fuel-fired furnace and/or boiler and the air heater.

23. The method of claim 20, wherein the $NO_x$ control system or device is at least one cold-side SCR between the air heater and the particulate control device.

24. The method of claim 20, wherein the method further comprises supplying at least one secondary particulate control device located between particulate control device and the WFGD.

25. The method of claim 24, wherein the method further comprises the step of supplying a WFGD with at least one WFGD recirculation loop, wherein the liquid waste and/or liquid waste stream supplied to the at least one drying unit that is supplied from the at least one WFGD recirculation loop is supplied to a spray dryer evaporator, spray dryer absorber, or any other type of specific drying device.

26. The method of claim 25, wherein the method further comprises the step of supplying at least one additive injection device for injecting at least one additive.

27. The method of claim 26, wherein the at least one additive is selected from one or more powdered activated carbons, one or more brominated powdered activated carbons, one or more modified and/or unmodified phyllosilicates, lime, slaked lime ($Ca(OH)_2$), one or more anti-caking and/or powdering additives, cement kiln dust, lime kiln dust, fly ash, or any combination of two or more thereof.

28. The method of claim 27, wherein the first stream of the liquid waste and/or liquid waste stream has a total dissolved solids content of between about 5,000 ppm and about 200,000 ppm.

29. The method of claim 28, wherein the mixing device is a pug mill, a mixing tank, cement mixer, static mixer, batch mixer, drum mixer, and any combinations of two or more, three or more, or even four or more thereof.

30. The method of claim 16 wherein the drying unit produces a salt and the second stream of the liquid waste and/or liquid waste stream resolvates the salt downstream of the drying unit.

* * * * *